United States Patent [19]

Pahis

[11] Patent Number: 5,423,298
[45] Date of Patent: Jun. 13, 1995

[54] ROTARY INTERNAL COMBUSTION ENGINE

[76] Inventor: Nikolaos S. Pahis, 8 Alpert Dr., Vernon, Conn. 06066

[21] Appl. No.: 120,557

[22] Filed: Sep. 14, 1993

[51] Int. Cl.$^6$ ............................................. F02B 53/00
[52] U.S. Cl. .................... 123/243; 123/244; 418/237; 418/159
[58] Field of Search ............... 123/243, 244; 418/159, 418/237, 242, 254

[56] References Cited

U.S. PATENT DOCUMENTS

| | | | |
|---|---|---|---|
| 43,642 | 7/1864 | Jaques | 418/237 |
| 710,977 | 10/1902 | Holman | 418/237 |
| 872,234 | 11/1907 | Henry | 418/237 |
| 1,820,009 | 8/1931 | Blackmer | 418/237 |
| 1,983,034 | 12/1934 | Hutchison | 418/242 |
| 3,186,385 | 6/1965 | Walker | 123/244 |
| 3,387,565 | 6/1968 | Mezzetta | 418/237 |
| 4,299,097 | 11/1981 | Shank et al. | 418/159 |

FOREIGN PATENT DOCUMENTS

2321081 11/1974 Germany ........................... 418/237

*Primary Examiner*—Michael Koczo

[57] ABSTRACT

A rotary internal combustion engine including a plurality of variable compression ratio rotating combustion chambers or alternatively stationary combustion chambers, a multi-piston movable assembly or alternatively a multi-sector movable assembly, a multi-sector stationary assembly or alternatively multi-piston stationary assembly with means for effecting ignition or alternatively for injecting fuel into the combustion chambers. The combustion chambers are formed by the multi-sector stationary assembly and the multi-piston movable assembly such that each of the pistons is located radially of the engine's pre-definable center axis. The stationary assembly, the movable assembly and the pistons of the movable assembly are cooperatively associated one with another so that the movable assembly is capable of being made to undergo rotating motion about the engine's center axis in a circular path about the stationary assembly. Motion is imparted to the movable assembly by virtue of the forces produced during combustion in the combustion chambers acting upon the pistons which project outwardly above the rotor of the movable assembly in the area between the stationary assembly and the movable assembly, when the rotating combustion chambers are in the expansion stage.

45 Claims, 35 Drawing Sheets

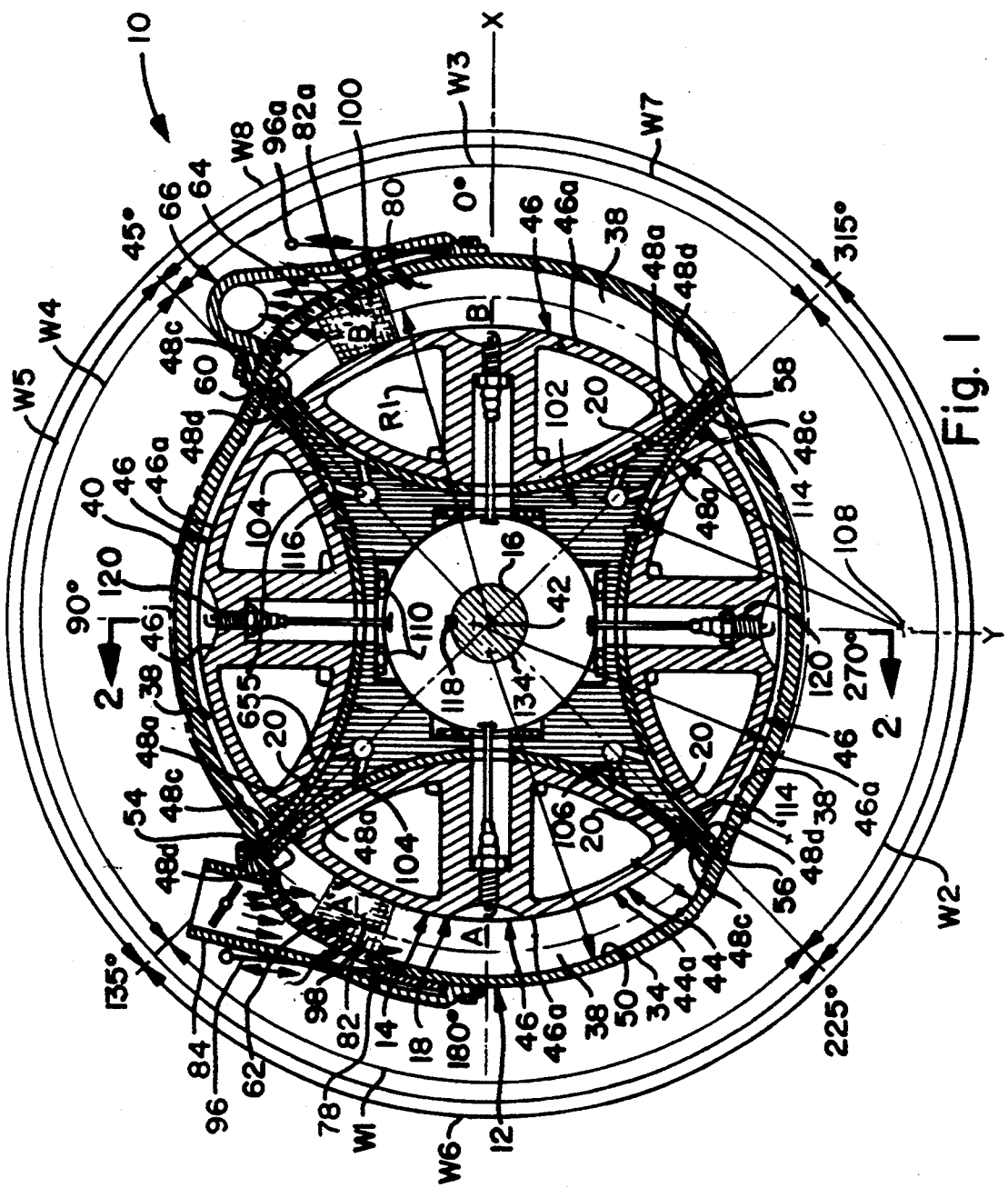

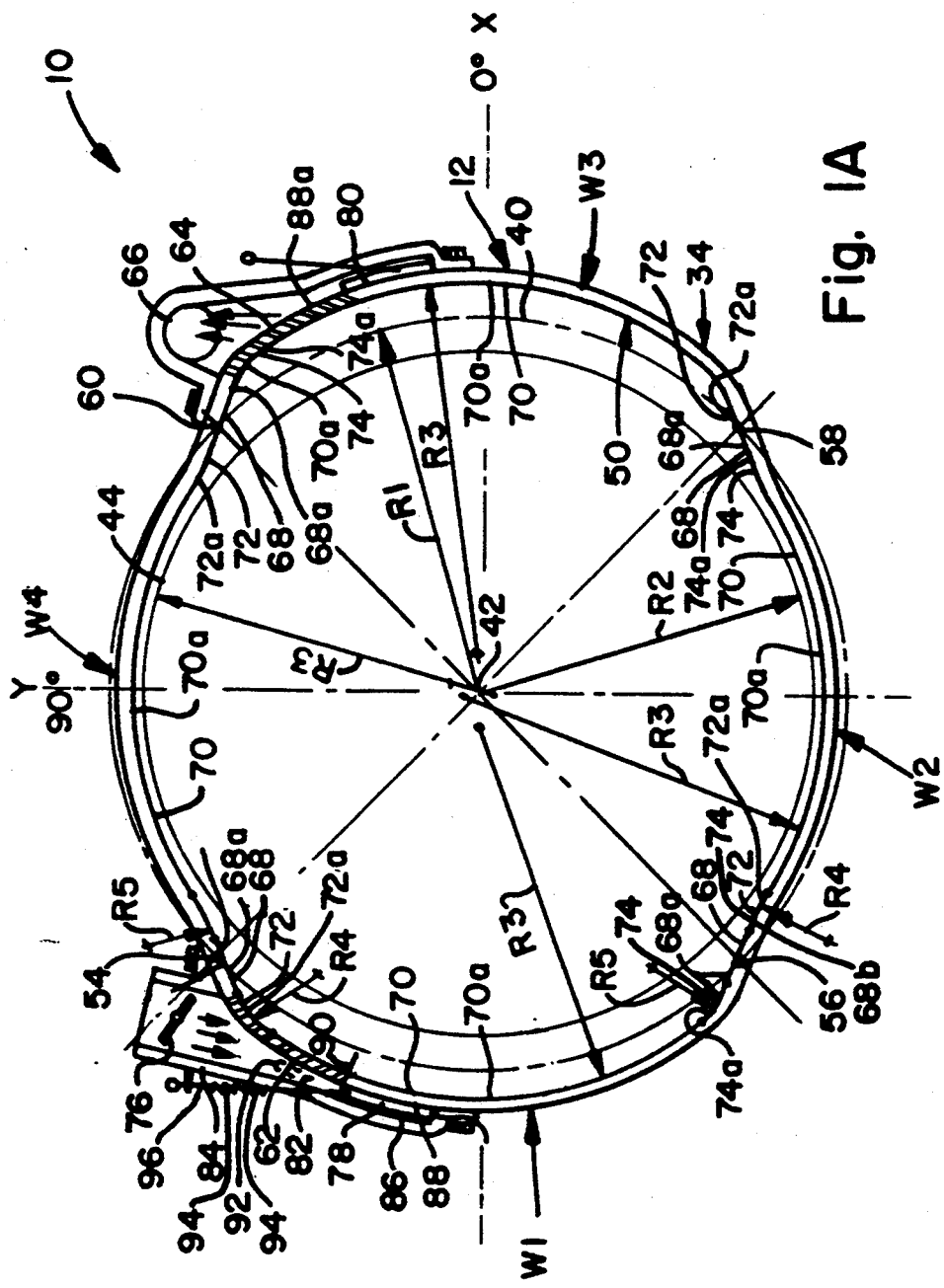

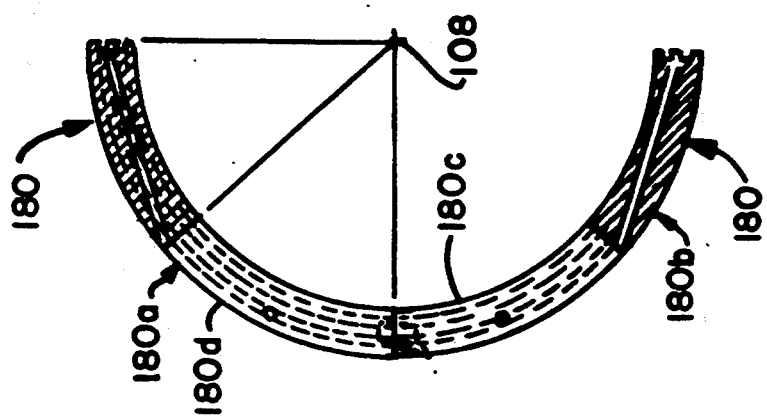
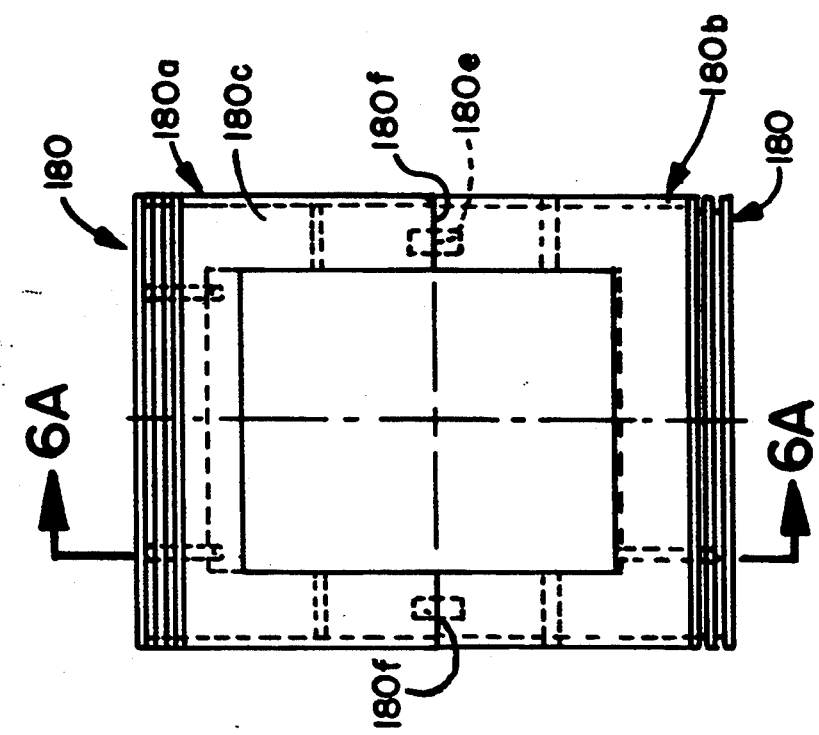

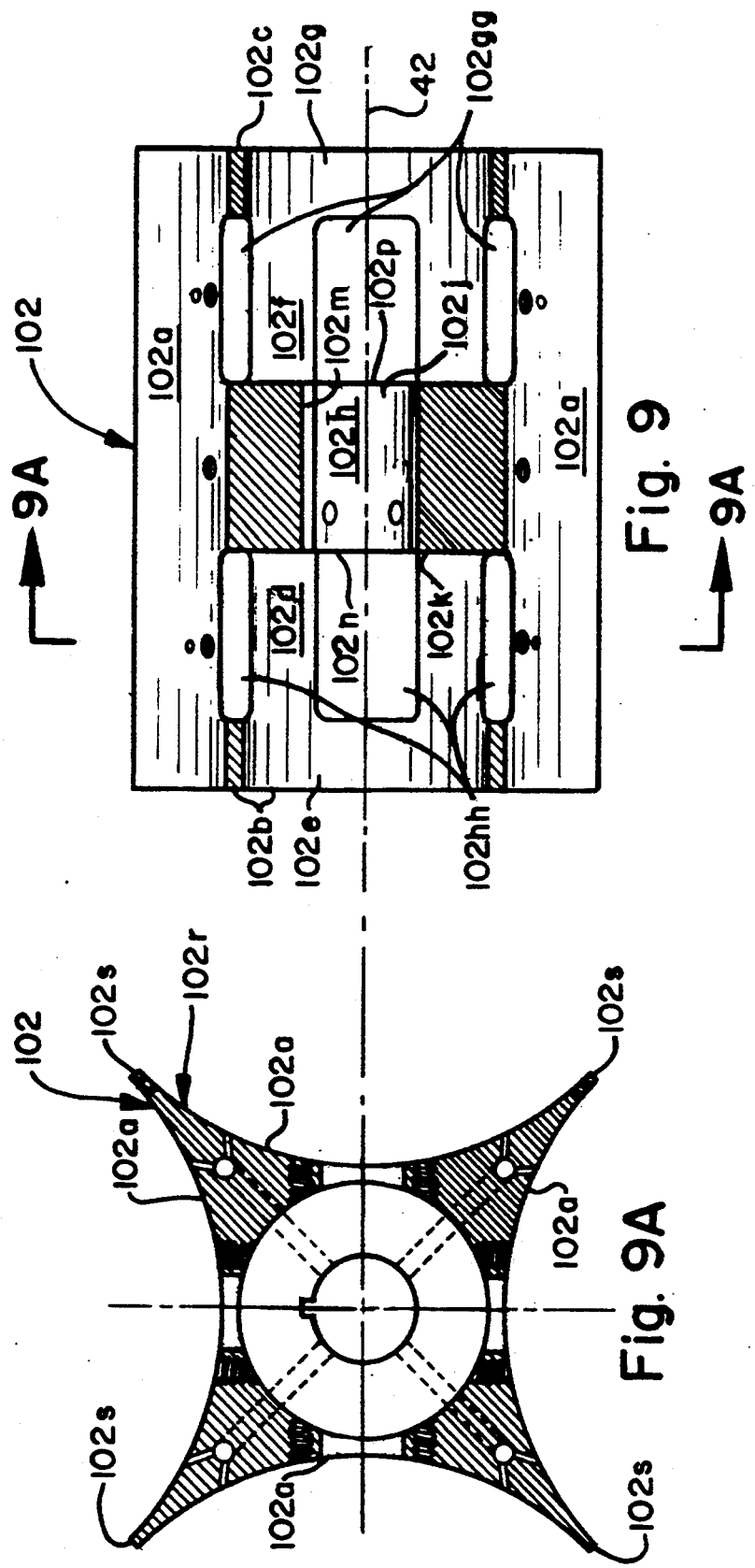

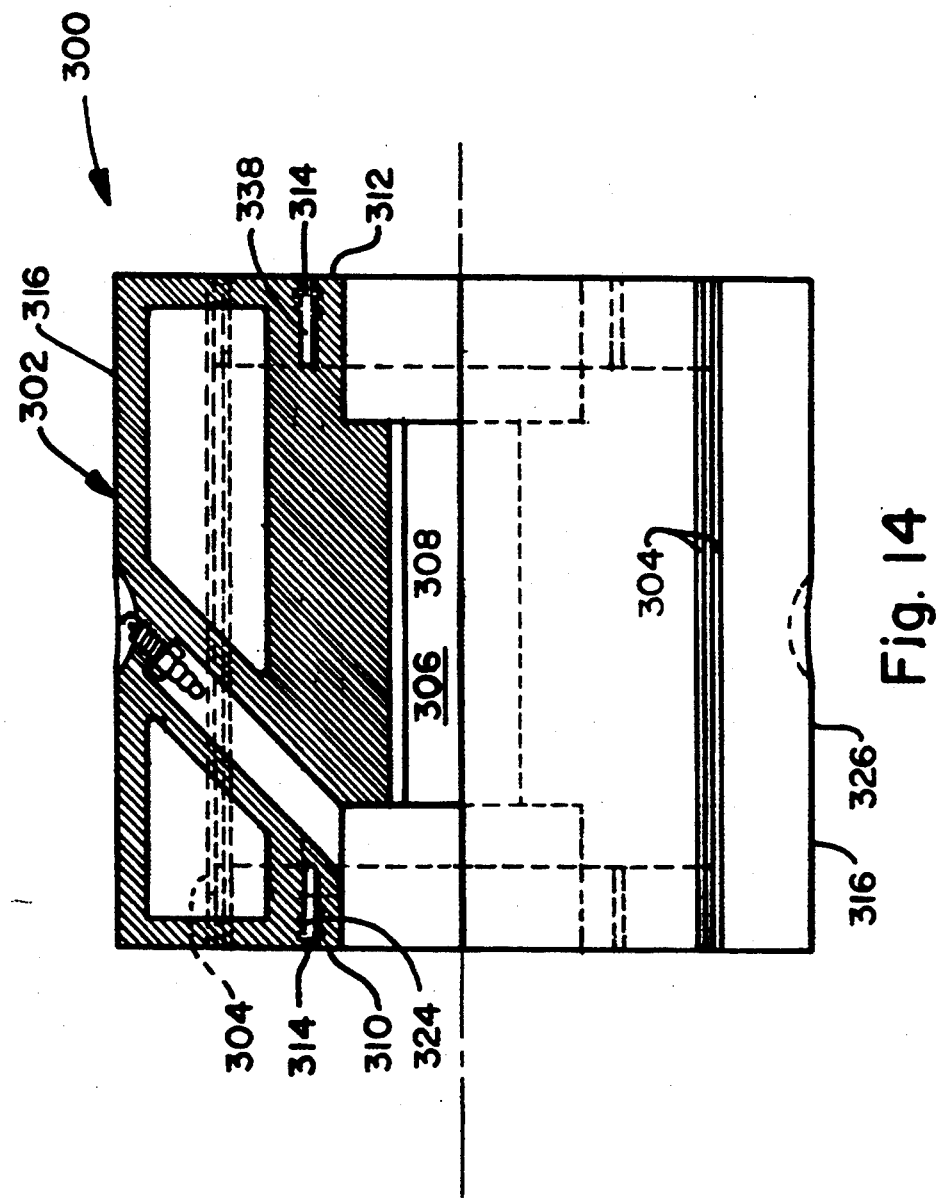

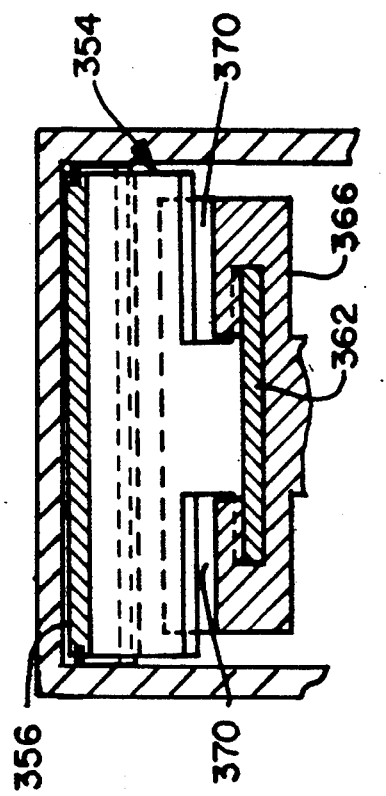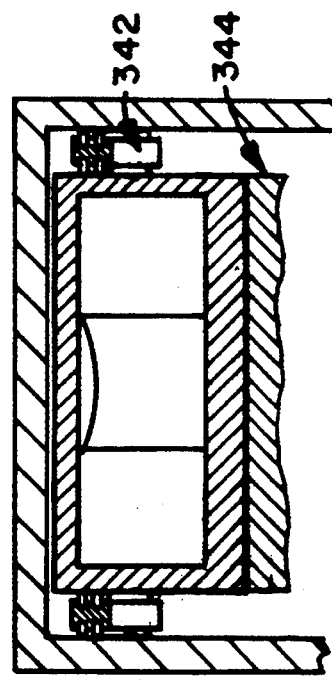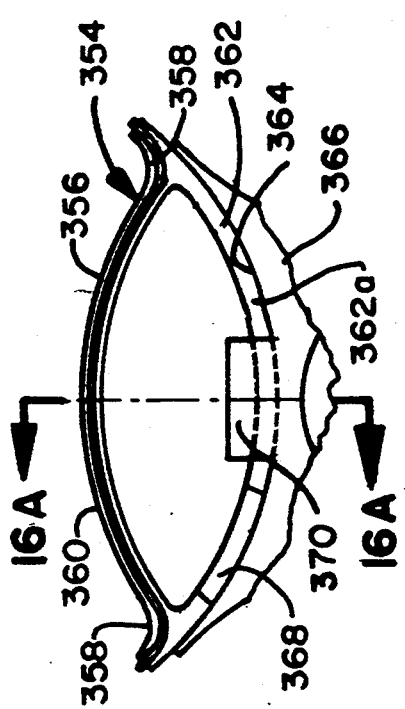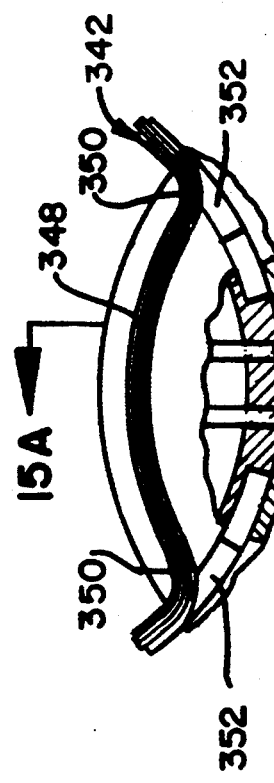
Fig. 16A
Fig. 15A
Fig. 16
Fig. 15

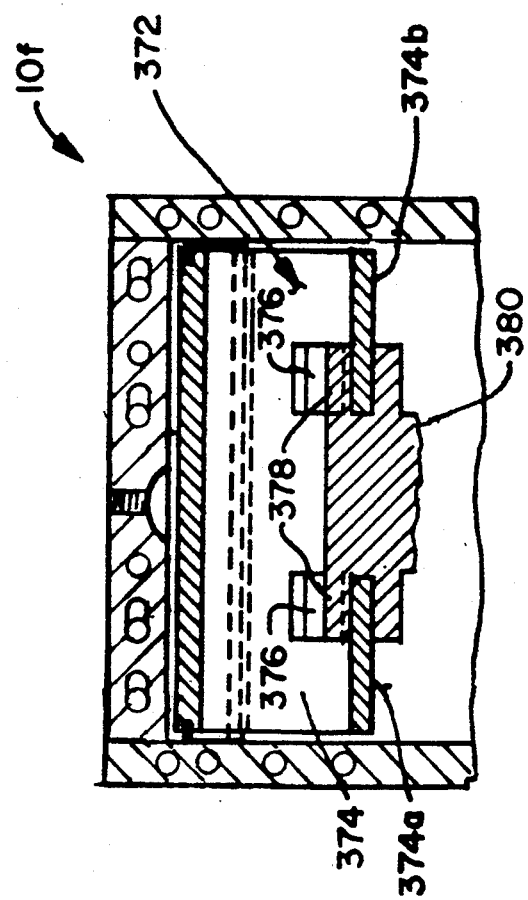
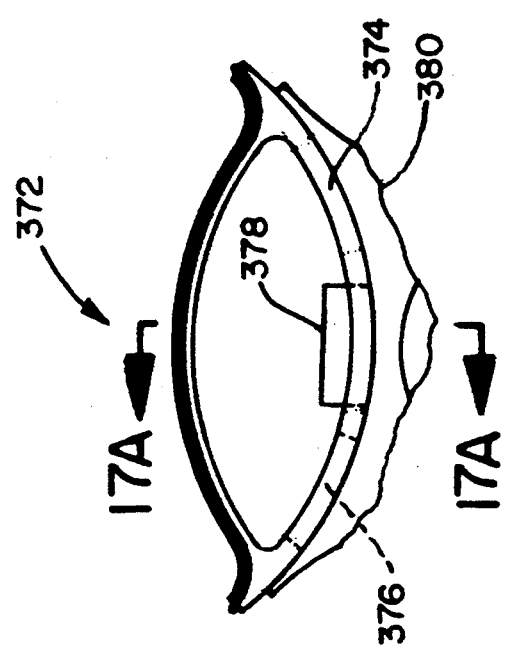

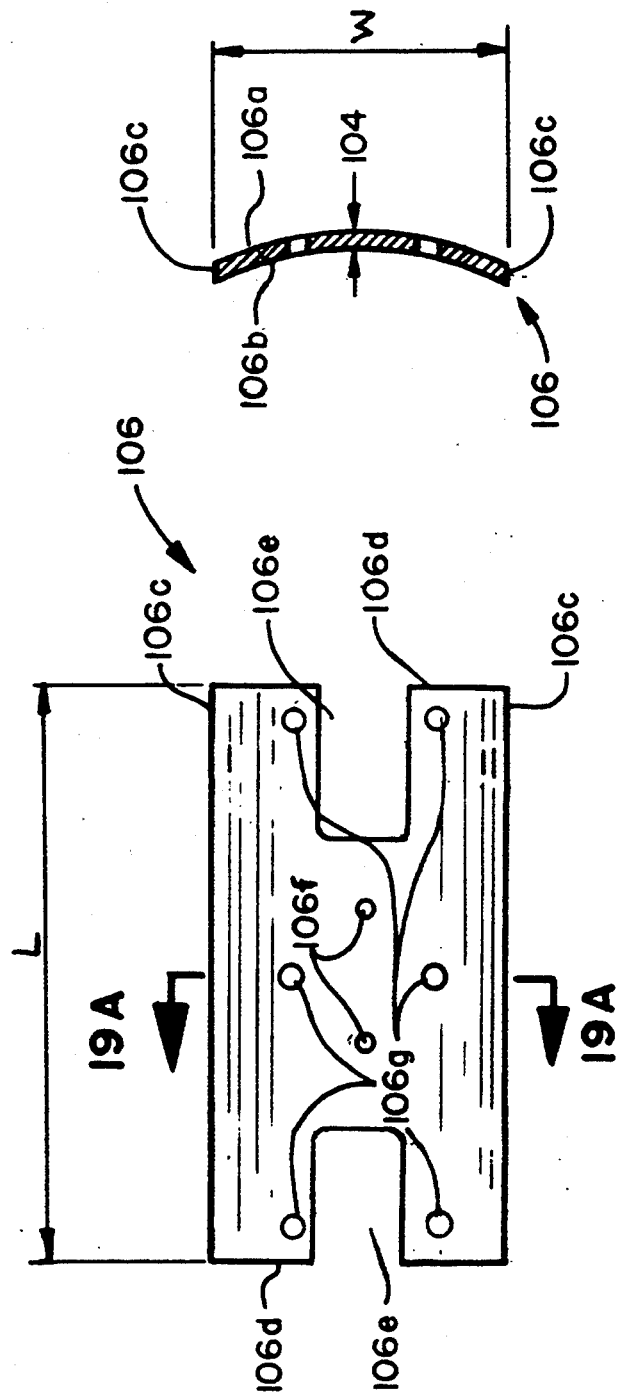

ROTARY INTERNAL COMBUSTION ENGINE

BACKGROUND OF THE INVENTION

This invention relates to a rotary internal combustion engine and more specifically to a rotary internal combustion engine comprising a rotating assembly with at least four cylindrical segment type oscillating pistons, mounted on the outer periphery of a rotating rotor or alternatively to the sides of the rotating rotor, a stator body which is divided into at least four sectors that are required for purposes of achieving the four combustion stages of a combustion cycle i.e., intake, compression, expansion and exhaust. Namely, there is provided an internal combustion engine in which the combustion chambers are formed between the rotating assembly and the stationary assembly and with the oscillating pistons being embodied in the movable assembly or alternatively in the stationary assembly. Ignition means or alternatively fuel injection means, which are provided for each combustion chamber via the movable assembly or alternatively via the stator assembly, are used to ignite the gas mixture whereby the gas pressure generated by the combustion gases is used to rotate the movable assembly that provides the continuous circular motion which in turn can be employed to rotate a power output shaft.

It has long been known in the prior art to provide internal combustion engines embodying different types of construction capable of providing different kinds of performance. A prior art form of internal combustion engine suitable for use in a variety of different type of applications is that illustrated in U.S. Pat. No. 4,951,615, which issued on Aug. 28, 1990, to the inventor of the present application. U.S. Pat. No. 4,951,615 is directed to an internal combustion engine which embodies a motion-conversion mechanism that is designed to convert the oscillating motion of a rotor assembly into a continuous circular motion which in turn is suitable for use for purposes of imparting rotation to a power output shaft. In accordance with the teaching of U.S. Pat. No. 4,951,615, the motion-conversion mechanism thereof is characterized in that a circular-type externally toothed gear which is mounted on a power output shaft engages the teeth of a teethed segment gear such that they are in constant engagement. The teethed segment gear is mounted on a slidable gear carrier which is supported in mounted relation in an opening provided in a rotor frame for slidable movement therewithin between a first position and a second position. The rotatable power output shaft is mounted for rotation on bearing means which are fixedly mounted on the engine's stator.

Another prior art form of internal combustion engine suitable for use in a variety of different types of applications is that illustrated in U.S. Pat. No. 4,434,757 which issued on Mar. 6, 1884. U.S. Pat. No. 4,434,757 is directed to a rotary internal combustion engine comprising a stator having an enclosed chamber. The chamber is defined by a pair of opposing side walls and a peripheral wall extending therebetween. A rotor is displaced within the chamber and is mounted for rotation by a shaft extending between the side walls. The rotor includes at least one arm projecting radially from the shaft and a rotator member pivotally mounted on the end of the arm by a pivot pin. The rotator member has a working surface which spans between the side walls and has leading and trailing surfaces in contact with the peripheral wall thereby defining a combustion chamber. The rotary internal combustion engine further comprises means for introducing air into the chamber. This means includes at least one outer passage which is rotatable within the chamber and opens radially, with respect to the shaft, into the chamber.

Although internal combustion engines constructed in accordance with the teaching of the aforementioned patent are capable of providing adequate performance, a need has nevertheless been evidenced for improvement to be made thereto. One such improvement which is deemed to be needed resides in the need to be able to increase the power output that one is normally capable of realizing from a rotary internal combustion engine of conventional construction. Namely, there exists a need to realize an increase in the power output of the rotary internal combustion engine by virtue of maximizing the utilization of the expended gases that are generated during the combustion which takes place in the combustion chamber of the rotary internal combustion engine.

Another such improvement which is deemed to be desirable resides in the need to be able to maximize the expansion of the combustible gases in order to achieve the concomitant benefits that flow therefrom.

Yet a further such improvement which is deemed to be desirable resides in the need to be able to attain a better continuous gas seal of the combustion chamber from that which one is normally capable of achieving in a rotary internal combustion engine that is of conventional construction.

Still another such improvement which is deemed to be desirable resides in the need to improve the lubrication of the internal combustion engine.

Still yet, a further such improvement which is deemed to be desirable resides in the need to be able to complete at least one time within one revolution of the rotating assembly all four combustion stages in each of the combustion chambers; namely, intake, compression, expansion, and exhaust.

Still a further such improvement which is deemed to be desirable resides in the need to be able to increase the power output of the internal combustion engine by altering the compression ratio of the engine without altering the ratio between the air and the fuel that is supplied to the engine.

Another such improvement which is deemed to be desirable resides in the need to be able to burn in the internal combustion engine a variety of combustible fuels such as hydrogen, methanol, gasoline, etc., by varying the compression ratio.

Further still, another such improvement which is deemed to be desirable resides in the need to be able to downsize the engine of the rotary internal combustion engine.

Still a further such improvement which is deemed to be desirable resides in the need to be able to improve the ignition system of the rotary internal combustion engine.

Another such improvement which is deemed to be desirable resides in the need to be able to increase in multiples of four the number of combustion chambers in order to provide for a smoother running of the rotary internal combustion engine.

To thus summarize a need has been evidenced in the prior art for a new and improved four stage rotary internal combustion engine which is either valveless or which embodies valves.

It is, therefore, an object of the present invention to provide a new and improved stator assembly suitable for use in an internal combustion engine for purposes of effecting the formation of the four combustion stages; namely, intake, compression, expansion and exhaust.

It is a further object of the present invention to provide such a stator assembly which is particularly suited for use in a rotary internal combustion engine which is characterized in that it is possible therewith to realize an increase in the power output of the rotary internal combustion engine by virtue of decreasing the size of the inlet sector in comparison to the expansion sector thereby maximizing the utilization of the expended gases that are generated during the combustion which takes place in the combustion chamber of the rotary internal combustion engine, a function which presently is fulfilled by an expensive turbocharger.

It is another object of the present invention to provide such a stator assembly with a surface on which the sealing rings of the oscillating pistons slide and which is located at a variable distance from the engine's center axis such as to render it possible therewith to effect the execution of the four stages of combustion; namely, the inlet, compression, expansion, and exhaust stages.

It is an object of the present invention to provide a new and improved stator assembly wherein the oscillating segment type pistons are located below the stator portions thereby minimizing the gas force acting upon them.

Still a further object of the present invention is to provide such a stator assembly that is particularly suited for use in a valveless rotary internal combustion engine which is characterized in that it is possible therewith to increase the volume of the gases trapped in the inlet sector in order to alter the compression ratio of the combustible gases, which in turn is essential for the acceleration of the engine.

Another object of the present invention is to provide an improved movable assembly wherein the oscillating segment type pistons are mounted below the rotor portions, thereby preventing the oscillating pistons from escaping the rotor assembly, and further, to minimize the gas forces acting on the oscillating pistons thereby permitting them to move freely.

A further object of the present invention is to provide an improved movable assembly wherein oscillating segment type pistons are provided that are independent from each other and that are operative to effect the sealing and lubrication of the rotary internal combustion engine.

A further object of the present invention is to provide an improved rotary internal combustion engine which renders it possible to have continuous firing and completion of all four combustion stages within one revolution of the movable assembly.

Another object of the present invention is to provide a new and improved rotor assembly which is either valveless or which embodies valves and which is suitable for use in an internal combustion engine for purposes of functioning as the gas inlet and gas outlet of the engine.

It is an object of the present invention to provide such a rotary internal combustion engine which renders it possible to locate the rotating assembly, either internally or externally, relative to the engine's stator body.

Yet a further object of the present invention is to provide such a rotary internal combustion engine that is characterized in that it is possible therewith to have a simultaneous combustion of two opposite combustion chambers on the same rotating assembly thereby minimizing the thrust force acting on the engine's rotating shaft thereby and reducing the vibration of the engine.

Further still another object of the present invention is to provide such a rotary internal combustion engine which is characterized in that it is possible therewith to maximize the gas opening for purposes of reducing the resistance of the exhaust gases.

Still another object of the present invention is to provide a rotary internal combustion engine which is characterized in that it is possible therewith to regulate the size of the inlet sector in order to alter the compression ratio of the rotary internal combustion engine.

Another object of the present invention is to provide a rotary internal combustion engine which is characterized in that it is possible therewith to regulate the size of the outlet sector in order to maximize the forces generated by the combustible gases.

Yet another object of the present invention is to provide a rotary internal combustion engine which is characterized in that it is possible therewith to burn a variety of combustible fuels.

Last but not least it is an object of the present invention to provide a rotary internal combustion engine that is either valveless or that embodies valves and that is inexpensive to fabricate, economical to operate, small in size, and smooth and clean to run.

SUMMARY OF THE INVENTION

In accordance with the present invention, a plurality of cylindrical segment type oscillating pistons are provided which are particularly suited for use in an internal combustion engine of the type that includes a plurality of combustion chambers, a plurality of ignition means or alternatively injecting means, a primary inlet throttle, one or more secondary fluid inlet throttles, one or more primary fluid exhaust throttles, a movable assembly and a stationary assembly. More specifically, the subject oscillating piston type cylindrical segments or alternatively conical segments are employed in the internal combustion engine to transfer the forces, which are generated from the combustible gases, to a rotating assembly. Moreover, the combustion chambers of the internal combustion engine, which embody a substantially cylindrical segmented configuration, are formed between the outer surface of the rotating rotor. The inner side of the oscillating piston type cylindrical segments are mounted for oscillation either on the outer periphery or to the sides of the rotating assembly or on the stator assembly. The surfaces of the two side members, which are exposed to the gases, form part of the stator (stationary) assembly and the contoured peripheral surface either of the stator or of the rotating rotor. The combustion chambers are located radially and/or axially about the engine's center axis. The movable assembly, which is mounted for rotation on a rotating shaft, embodies a rotor assembly with four, or a multiple of four, oscillating piston type cylindrical segments equally spaced around the rotor's outer periphery so as to be thereby able to project inwardly or outwardly thereof depending on the position of the rotor. The shaft itself is supported for rotation on bearing means that are provided on the sides of the stationary assembly. The stator assembly embodies a contoured body with four, or a multiple of four, sectors as well as both means for altering the fluid inlet volume and means for altering the fluid exhaust volume of the internal combustion engine. The oscillating type cylindrical segments as well as the movable assembly and the stationary assembly of the internal combustion engine are cooperatively associated one with the other such that the movable assembly is capable of being made to undergo a rotating motion about the aforementioned center axis of the internal combustion engine so as to thereby move in a circular path. Motion is imparted to the movable assembly as a result of the forces, which are produced during combustion in the combustion chambers, acting on the oscillating piston type cylindrical segments when the latter are projecting outwardly in the space between the rotating assembly and the stationary assembly during the expansion stage. The circular motion of the movable assembly can be employed for purposes of rotating a power output shaft.

BRIEF DESCRIPTION OF THE DRAWINGS

FIG. 1 is a side elevation view partially in section of an internal combustion engine, which embodies a rotating rotor assembly provided with oscillating pistons and which is supported for rotation in a stator assembly, constructed in accordance with the present invention;

FIG. 1A is a schematic side elevation view partially in section of the internal combustion engine of FIG. 1, constructed in accordance with the present invention;

FIG. 6 is a side elevation view of a third embodiment of oscillating piston of an internal combustion engine, constructed in accordance with the present invention;

FIG. 6A is a cross-sectional view of the third embodiment of the oscillating piston of the internal combustion engine depicted in FIG. 6, taken substantially along the line 6A—6A in FIG. 6, constructed in accordance with the present invention;

FIG. 9 is a cross-sectional side elevation view of the rotor frame assembly of an internal combustion engine, constructed in accordance with the present invention;

FIG. 9A is a cross-sectional view of the rotor frame assembly depicted in FIG. 9, taken substantially along the line 9A—9A in FIG. 9, constructed in accordance with the present invention;

FIG. 14 is a side elevation view partially in section of a second embodiment of the rotor of an internal combustion engine, constructed in accordance with the present invention;

FIG. 15 is a side elevation view of a fourth embodiment of the oscillating piston of an internal combustion engine, constructed in accordance with the present invention;

FIG. 15A is a cross-sectional view of the fourth embodiment of the oscillating piston of the internal combustion engine depicted in FIG. 15, taken substantially along the line 15A—15A in FIG. 15, constructed in accordance with the present invention;

FIG. 16 is a side elevation view of a fifth embodiment of the oscillating piston of an internal combustion engine, constructed in accordance with the present invention;

FIG. 16A is a cross-sectional view of the fifth embodiment of the oscillating piston of the internal combustion engine depicted in FIG. 16, taken substantially along the line 16A—16A in FIG. 16, constructed in accordance with the present invention;

FIG. 17 is a side elevation view of a sixth embodiment of the oscillating piston of an internal combustion engine, constructed in accordance with the present invention;

FIG. 17A is a cross-sectional view of the sixth embodiment of the oscillating piston of the internal combustion engine depicted in FIG. 17, taken substantially along the line 17A—17A in FIG. 17, constructed in accordance with the present invention;

FIG. 19 is a plan view of the rotor spacer of an internal combustion engine, constructed in accordance with the present invention;

FIG. 19A is a cross-sectional view of the rotor spacer of the internal combustion engine depicted in FIG. 19, taken substantially along the line 19A—19A in FIG. 19, constructed in accordance with the present invention;

DESCRIPTION OF THE PREFERRED EMBODIMENTS

Figure 2:
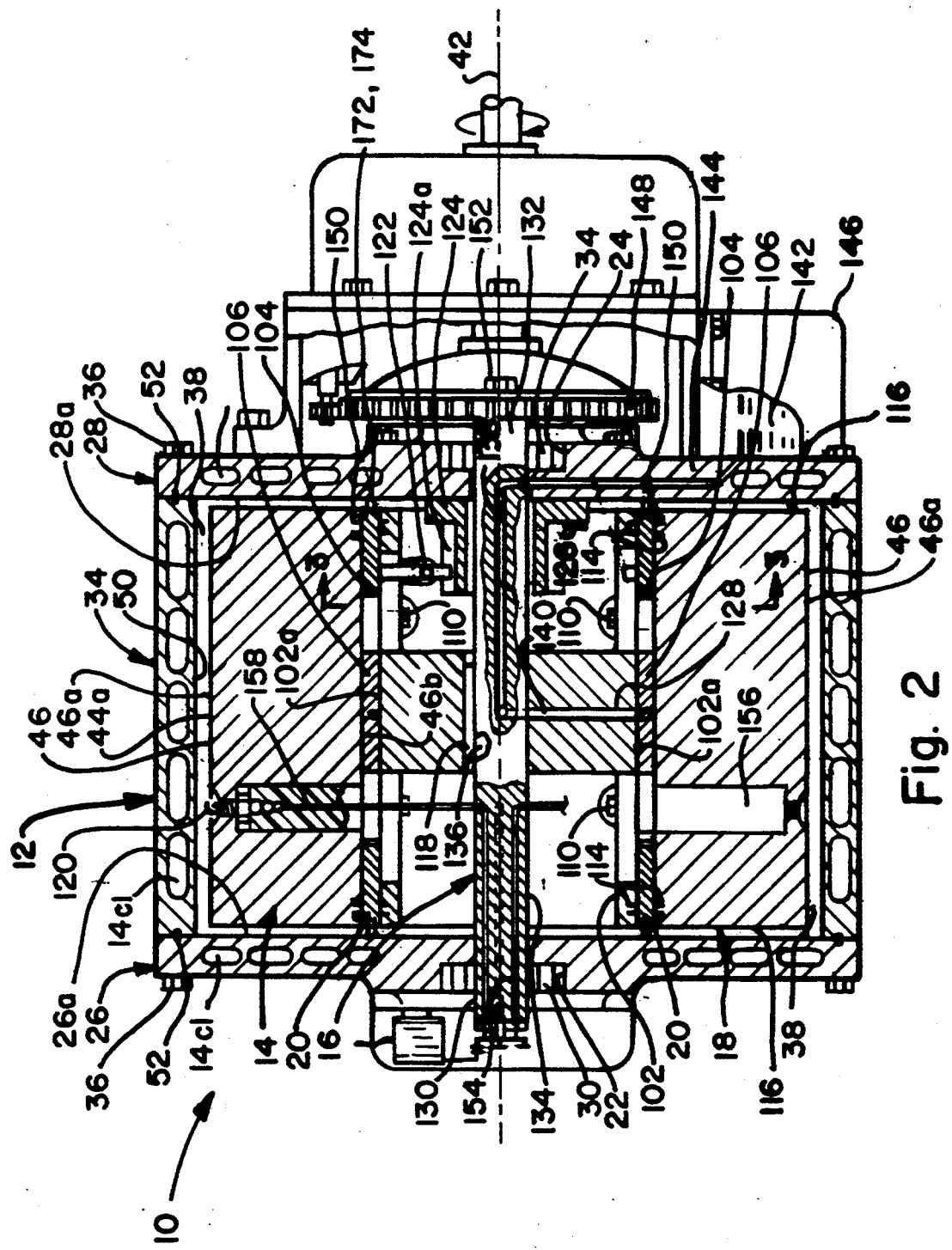
FIG. 2 is a cross-sectional view of the internal combustion engine depicted in FIG. 1, taken substantially along the line 2—2 in FIG. 1, constructed in accordance with the present invention.
Figure 3:
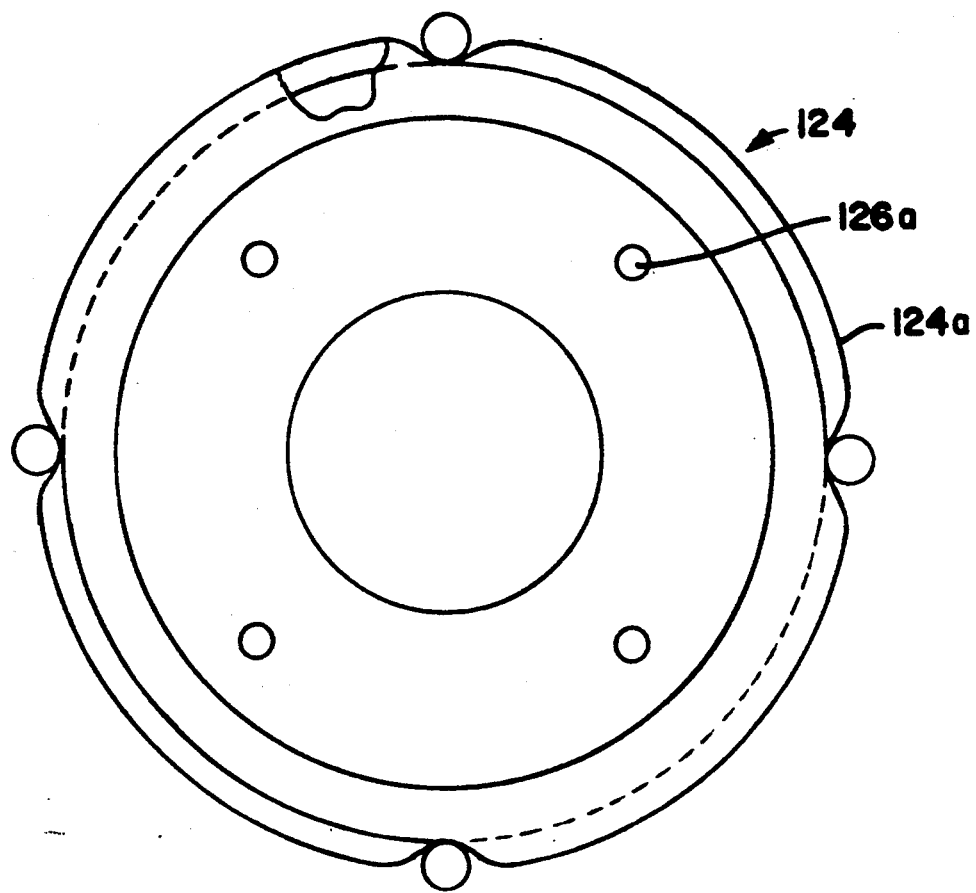
FIG. 3 is a partial side elevation view of the internal combustion engine depicted in FIG. 2, taken substantially along the line 3—3 in FIG. 2, constructed in accordance with the present invention.
Figures 4, 4B:
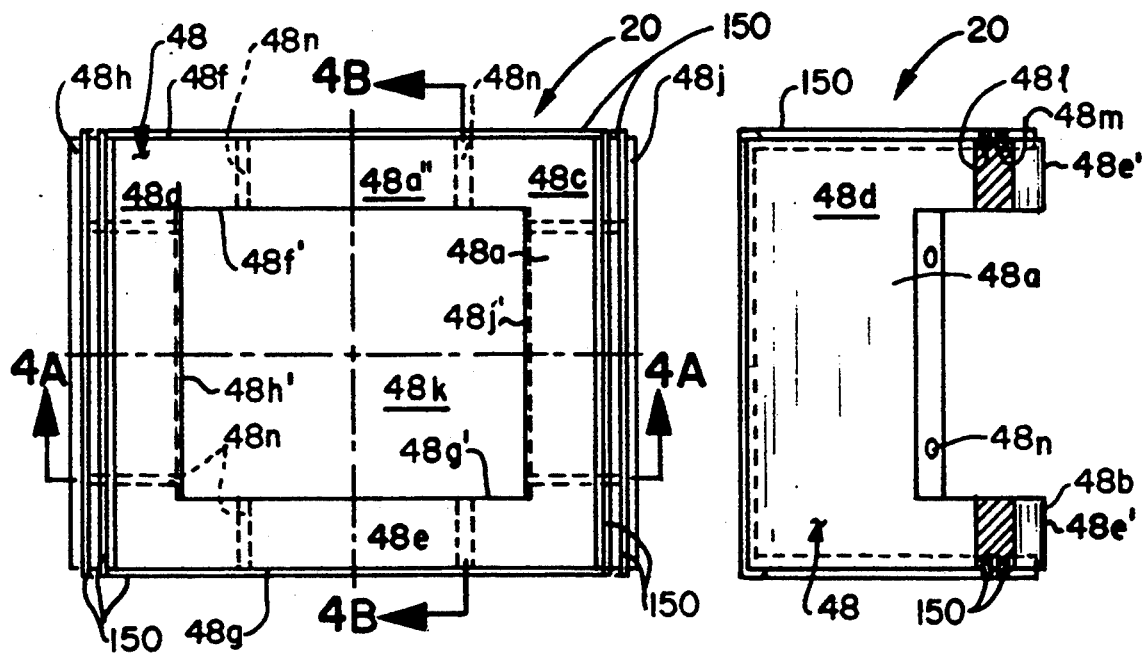
FIG. 4 is a plan view of the oscillating piston of an internal combustion engine constructed in accordance with the present invention.
FIG. 4B is a cross-sectional side elevation view of the oscillating piston depicted in FIG. 4, taken substantially along the line 4B—4B in FIG. 4, constructed in accordance with the present invention.
Figure 4A:
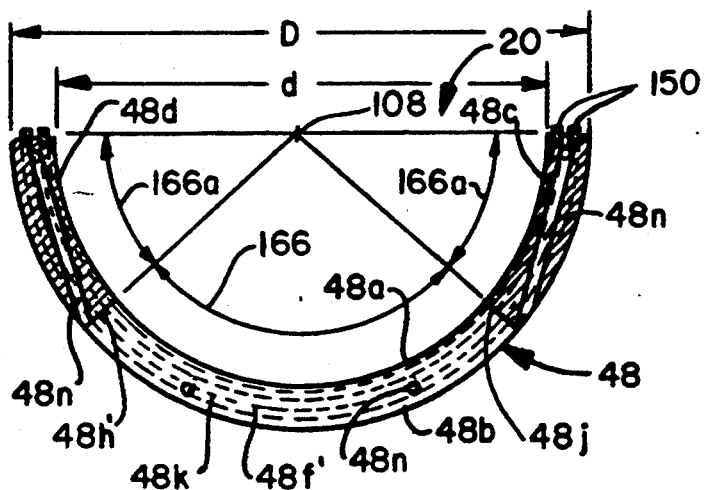
FIG. 4A is a cross-sectional view of the oscillating piston depicted in FIG. 4, taken substantially along the line 4A—4A in FIG. 4, constructed in accordance with the present invention.
Figure 4D:
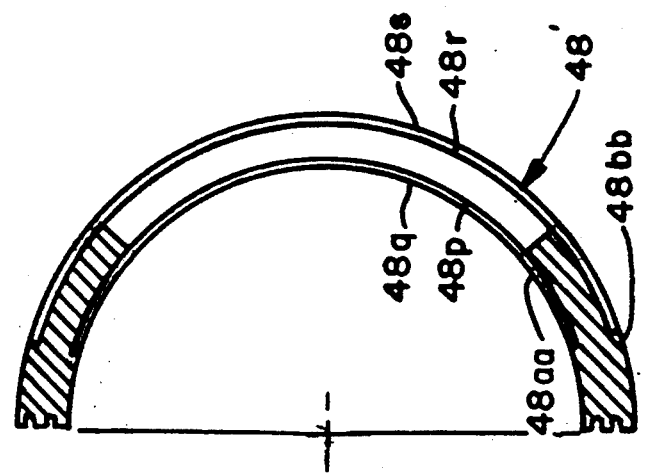
FIG. 4D is a cross-sectional view of the second embodiment of the oscillating piston depicted in FIG. 4C, taken substantially along the line 4D—4D in FIG. 4C, constructed in accordance with the present invention.
Figure 4C:
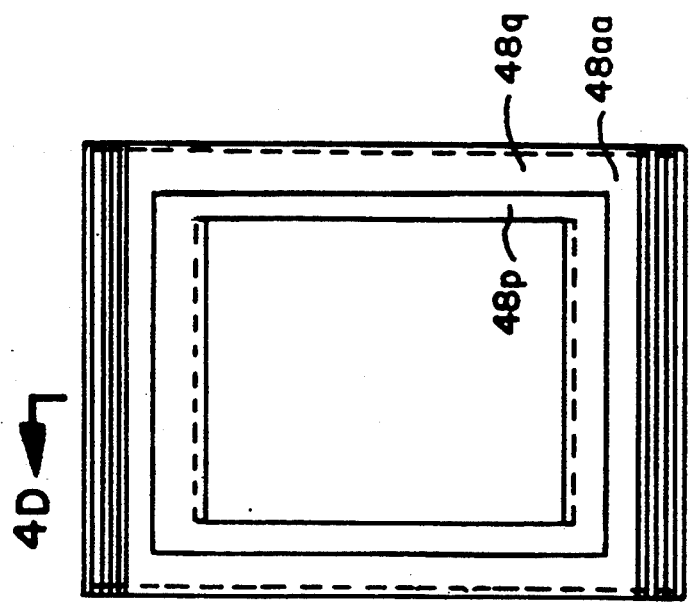
FIG. 4C is a plan view of a second embodiment of the oscillating piston of an internal combustion engine constructed in accordance with the present invention.

Referring now to the drawing and more particularly to FIGS. 1, 1A and 2 thereof, there is depicted therein an internal combustion engine, generally designated by the numeral 10, which embodies a stator assembly generally designated by the numeral 12, a movable assembly generally designated by the numeral 14, a rotatable shaft that comprises a portion of the movable assembly 14 and is generally designated by the numeral 16, a rotor assembly that comprises a portion of the movable assembly 14 and is generally designated by the numeral 18 and four oscillating piston-type assemblies that also comprise a portion of the movable assembly 14 and are each generally designated by the numeral 20. The rotor assembly 14 is mounted for rotation on the rotatable shaft 16, which is supported for rotation in openings 22 and 24 of the side members 26 and 28 of the stator assembly 12 by means of bearing means 30 and 32. The side members 26 and 28 are fastened on the contoured member 34 of the stator assembly 12 by means of fastening means 36.

The internal combustion engine 10 includes four substantially identical rotatable combustion chambers of variable volume that in terms of configuration comprise substantially cylindrical segment portions, the latter being denoted therein by the reference numeral 38. The rotatable combustion chambers 38 are positioned equally and independently around the area which is formed with mid-periphery 40 offset from the center axis 42 of the internal combustion engine 10 on the radius R1. As best understood with reference to FIGS. 1, 1A and 2 of the drawing, the substantially cylindrical segment portions, i.e., combustion chambers 38, consist of essentially the volume which lies between the rotor's outer periphery 44, substantially smooth cylindrical surface 44a of rotor assembly 18, the inner smooth and flat surfaces 26a and 28a of the side members 26 and 28, the inner smooth, contoured peripheral surface generally designated by the numeral 50 of contoured member 34 of the stator assembly 12 and divided by the inner smooth cylindrical surface portions 48c and 48d of each of the oscillating piston type assemblies 20.

Continuing with the description of the cylindrical combustion chamber-like segment portions 38 of the rotary internal combustion engine 10, all four combustion chamber-like segment portions 38 are independent of each other but yet three of their sides are formed by common surfaces. These common surfaces are the inner smooth contoured peripheral surface 50 of the contoured member 34 of the stator assembly 12 and the inner smooth flat surfaces 26a and 28a, which are parallel to each other, of the side members 26 and 28 of the stator assembly 12. To this end, each of the combustion chamber-like segment portions 38 is confined between the common inner smooth, contoured peripheral surface 50 of member 34 of stator assembly 12, the common smooth, flat surfaces 26a and 28a, which are perpendicular to each other, of side members 26 and 28 and which extend perpendicular to the center axis 42 of stator assembly 12, the independent outer cylindrical surface 46a of the cylindrical portion 46 and the two inner smooth cylindrical end surface portions 48c and 48d of the inner smooth cylindrical surface 48a of each of the oscillating pistons-like segments 48.

Continuing with reference to FIGS. 1, 1A and 2 of the drawing, as illustrated therein the stator assembly generally designated by the numeral 12 embodies a variable depth inverted U-shape configuration, comprised mainly of the contoured peripheral member 34 and the cylindrical segment side members 26 and 28, which are fastened to the contoured member 34 by means of fastening means 36. The side members 26 and 28 and the contoured member 34 of stator assembly 12 can be formed as one unit (not shown) without departing from the essence of the invention so as to thereby eliminate the need for sealing means 52 between the contoured member 34 and the side members 26 and 28, which may otherwise enable gas to escape or leak from the combustion chamber-like segment portions 38.

A description will now be set forth herein of the U-shape configured peripheral member 34 of the stator assembly 12 of the rotary internal combustion engine 10. There is a need to establish the conditions for each of the four combustion chamber-like segment portions 38 of the internal combustion engine 10 in order that the four combustion stages can be accomplished in one complete 360 degree revolution; namely, that of intake, compression, expansion and exhaust can be accomplished in a fashion similar to that of a four stroke oscillating internal combustion engine. By way of explanation, it is to be understood that the stator assembly 12 is divided along the axes X and Y in four equal 90° degree arcs or sectors W1, W2, W3 and W4. W1 is the inlet sector, W2 is the compression sector, W3 is the expansion sector and W4 is the exhaust sector. Each of the combustion chamber-like segment portions 38 realizes its maximum potential with respect to the four combustion stages when it is positioned fully within each of the aforementioned arc sectors W1, W2, W3 and W4. Therefore, the maximum potential of the intake stage is realized at the time when each of the combustion chamber-like segment portions 38 is positioned between 135° degrees and 225° degrees, which is the arc sector W1. The maximum potential of the compression stage is realized at the time when each of the combustion chamber-like segment portions 38 is positioned between 225° degrees and 315° degrees, which is the arc sector W2. The maximum potential of the expansion stage is realized at the time when each of the combustion chamber-like segment portions is positioned between 315° degrees and 45° degrees, which is the arc sector W3. Finally, the maximum potential of the exhaust stage is realized at the time when each of the combustion chamber-like segment portions 38 is positioned between the 45° degrees and 135° degrees which is the arc sector W4.

Continuing with the description of the stator assembly 12, the stator assembly 12 is further divided into four equal regions W5, W6, W7 and W8, with each of these regions being equal to 180° degrees. These regions are the following: intake region W5, compression region W6, expansion region W7 and exhaust region W8. Each of these regions W5, W6, W7 and W8 comprises a segment of the stator assembly 12 that is exposed to or affected by the gases during the performance of each of the four stages of combustion, namely, intake, compression, expansion, and exhaust. Further each of these regions W5, W6, W7 and W8 includes two 90° degree portions of the W1, W2, W3 and W4 sectors. The beginning of each stage of combustion marks the beginning of a particular one of the regions W5, W6, W7 and W8. Likewise, the completion of each stage of combustion marks the end of that particular one of the regions W5, W6, W7 and W8. As such each of the regions W5, W6, W7 and W8 is shared with two stages of combustion; namely, the preceding and the following stage of combustion. Each of the sectors W1, W2, W3 and W4 is shared by two of the regions W5, W6, W7 and W8 as well, consequently the regions W5, W6, W7 and W8 overlap.

The intake region W5 starts at 45° degrees and ends at 225° degrees. The compression region W6 starts at 135° degrees and ends at 315° degrees. The expansion region W7 starts at 225° degrees and ends at 45°. The exhaust region starts at 315° degrees and ends at 135° degrees.

The description of the stator assembly 12 will now be completed. For this purpose reference will be had again to the FIGS. 1, 1A, 2, as well as to the FIGS. 7, 7A, 8 and 8A of the drawing. Each of the four sectors W1, W2, W3 and W4 has a first end and a second end. The numeral 54 identifies the first end of sector W1 and the second end of sector W4. The numeral 56 identifies the second end of sector W1 and the first end of sector W2. The numeral 58 identifies the second end of sector W2 and the first end of sector W3. The numeral 60 identifies the second end of sector W3 and the first end of sector W4. All of the sectors W1, W2, W3 and W4 are suitably positioned so as to interconnect one with the other on the mid-periphery 40 which is formed at the mid-radius R1 which in turn has its center located at the center axis 42 of the internal combustion engine 10. Two of the sectors, i.e., the inlet sector W1 and the expansion sector W3, project above the mid-periphery 40, while the two other sectors, i.e., the compression sector W2 and the exhaust sector W4, are recessed below the mid-periphery 40, the latter being formed with mid-radius R1. Part of the inlet sector W1 at the first end 54 thereof has a plurality of small perforations, i.e., holes 62, provided therein to permit fluids or the gases of combustion to enter the inlet sector W1 in order to fill the void created by suction when the oscillating piston-type assemblies 20 of the movable assembly 14 pass by the perforations, 62. Similarly, part of the outlet sector W3 at the second end 60 thereof has a plurality of perforations, i.e., holes 64, provided therein to permit the gases of combustion to exit into the atmosphere through the exhaust manifold 66 of the internal combustion engine 10. The sectors W1, W2, W3 and W4 comprise the three arc sections 70, 72 and 74 as well as two of the segments 68b of straight part 68. Arc section 70 is formed at a variable radii R3, with the radii R3 preferably being equal to the rotor's outer peripheral radius R2 plus a suitable clearance and with the center of formation offset from the center axis 44 of internal combustion engine 10 equal to the linear travel of the piston 48 from the first position to the second position. The two small arc section 72 and 74 are formed at a radius R4 and R5, respectively, which may be made to be either the same radius or a variable radius without departing from the essence of the present invention. Arc sections 70, 72, and 74 as well as the straight part 68 each have a first end and a second end. Reiterating, the continuous smooth contoured peripheral surface 50 of the contoured member 34 of the stator assembly 12 of the rotary internal combustion engine 10 is formed by the inner segments 68a of the four transitional straight portions 68 and by the inner surfaces 72a of the four transitional arc sections 72, which each have a radius of formation R4, as well as by the inner surfaces 74a of the four additional transitional arc section 74, which each have a radius of formation R5, and finally by the inner surfaces 70a of the four main arc sections 70, which each have a radius of formation R3. Radius R3 may be made to be the same as radius R2. Starting from point X=0° and moving counterclockwise, the second end of the straight part 68 is connected to the first end of the first arc section 72 and the second end of the arc portion 72 is connected to the first end of the first arc section 70. Continuing, the second end of the arc section 70 is connected to the first end of the arc section 74 and the second end of arc 74 is connected to the first end of the straight part 68, etc.

The size of the perforated area 62 of the inlet sector W1 greatly affects the output of the rotary internal combustion engine 10. This is because the volume ratio between the sector W1 and W3 determines the performance of the dynamic output that can be extracted from the combustion gases.

With further regard to the description of the stator assembly 12 as illustrated in FIGS. 1, 1A, 2, 7, 7A, 8 and 8A of the drawing, the stator assembly 12 also embodies a primary gas inlet throttle 76, a secondary gas inlet throttle 78 and an exhaust gas throttle 80. The primary inlet throttle 76, which is similar to that employed in internal combustion engines of conventional construction, is operative to control the fluid flow within the inlet manifold 84 of the rotary internal combustion engine 10. The secondary gas inlet throttle 78 is provided for the purpose of increasing the compression ratio of the rotary internal combustion engine 10 thereby increasing the engine's power output, which is essential for purposes of accomplishing acceleration of the engine. By way of illustration, the secondary inlet throttle 78 is positioned in an inlet cavity 82 of the inlet manifold 84 and is slidably retained by means of retaining means 86 so as to be capable of variable sliding movement on surface 88 of the contoured member 34 of stator assembly 12 between a first position 90 and a second or last position 92 thereof located above the inlet perforations 62 for purpose of effecting the volume of the fluids which are trapped within the inlet sector W1. In a normal setting the secondary inlet throttle 78 of the internal combustion engine 10 with the assistance of a spring 94 or any other conventional flexible or retractable means is made to rest at the first position 90, i.e., towards the compression sector W2 thereby exposing the total area of the inlet perforations 62, particularly in a demanding condition when additional force is required such as during acceleration. The secondary inlet throttle 78 with the assistance of the throttle wire 96 or any conventional retrieving means capable of being operated manually or by any other known conventional method is withdrawn towards the exhaust sector W4 in a second position 92 thereby trapping additional combustion gases for the purpose of affecting the compression ratio. When the demand diminishes, the secondary inlet throttle 78 retracts to the first position 90. The primary outlet throttle 80 of the rotary internal combustion engine 10 is provided for the purpose of increasing the expansion stroke or stage thereby increasing the engine's power output. By way of illustration, the primary outlet throttle 80 is positioned in the outlet cavity 82a of the gas outlet manifold 66 and is slidably retained by means of restraining means 86a so as to be capable of variable sliding movement on surface 88a of the contoured member 34 of stator assembly 12 between a first position 90a and a second position 92a thereof located above the outlet perforations 64 for purposes of effecting the discharge of the combustible gases which are trapped in the combustion chamber 38. In a normal setting the primary outlet gas throttle 80 of the internal combustion engine 10 with the assistance of a spring 94a or any other conventional flexible or retractable means is made to rest at the first position 90a, i.e., the total area of the outlet perforations 64, particularly in a demanding condition such as during acceleration or when the amount of combustible fuel is being varied. This is accomplished with the assistance of throttle wire 96a or any conventional retrieving means capable of being operated manually or by any known conventional method. The primary outlet throttle 80 is withdrawn toward the exhaustion sector W4 in the direction of the engine's rotation to a second position 92a thereby delaying the gas exhaustion for further expansion beyond the normal expansion, which is denoted by the letter B, in the additional area denoted in the drawing with the letter B'. The secondary inlet throttle 78 and the primary outlet throttle 80 may vary in shape, yet their function is the same, which is to increase the functional gas volume trapped in the inlet or outlet sectors. Conventional internal combustion engines are known to be constructed so as to have fixed compression ratios. As such when an additional instant demand of power is required such as during acceleration etc., additional fuel has to be provided thereby upsetting the air/fuel ratio with the increased chance of polluting the environment by virtue of the contaminants exiting from the conventional forms of internal combustion engines under such circumstances. In contrast to the methods employed heretofore, the use of the secondary inlet throttle 78 provides a means for generating additional power instantly by altering the compression ratio of the internal combustion engine 10 while yet maintaining the air/fuel ratio constant thereby achieving complete combustion. In addition, the first position 90 of the secondary inlet throttle 78 of the rotary internal combustion engine 10 is capable of being adjusted, i.e., can be repositioned in order to affect the compression ratio thus allowing the rotary internal combustion engine 10 to burn combustible gas which require a different compression ratio.

The description and the mode of operation of the movable assembly 14 follows. For this purpose reference will be had to FIGS. 1, 1A, 2, 4, 4A, 4B, 5, 5A, 5B, 9, 9A, 9B, 19 and 19A of the drawing. The movable assembly 14 is comprised mainly of a rotor assembly 18, a rotor shaft 16 and four oscillating piston-type assemblies 20. Each oscillating piston-type assembly 20 is movably mounted between the rotor portion 46 and a rotor frame 102 of the rotor assembly 18. More specifically, each oscillating piston-type assembly 20 is located in a space 104 which is maintained by means of spacer 106 between cylindrical surface portions 102a of rotor frame 102 and cylindrical surface portion 46b of the rotor portion 46 for oscillating movement therewithin between a first clockwise position and a second counterclockwise position assisted with spring type means 655 and with the center 108 of oscillation located externally of the engine's mid-periphery. The rotor portion 46 is fixedly mounted on the rotor frame 102 through the use of mounting means such as bolts 110 or any other conventional form of mounting means which pass through openings 112 provided for this purpose in rotor portion 46, and the spacers 106 so as to thereby be bolted on rotor frame 102. Between the oscillating piston-type assembly 20 and the rotor portion 46 are sealing means 114 that are provided for the purpose of preventing the combustible gases from escaping from the combustion chamber-like segment portions 38.

Continuing with the description of the movable assembly 14, reference will be had for this purpose to FIGS. 1, 1A, 2, 3, 9 and 9A of the drawing. The rotor frame 102 which comprises the main component of rotor assembly 18 embodies a cylindrical type configuration and, which has the center thereof at the center axis 42 of the rotary internal combustion engine 10, has a plurality of inner and outer surfaces. Two of the outer surfaces 102b and 102c thereof which form the ends of rotor frame 102, and which are flat, smooth and parallel to each other, are positioned so as to be perpendicular to the engine's center axis 42 and adjacent to the flat surfaces 26a and 28a of side members 26 and 28 of the stator assembly 12 of the rotary internal combustion engine 10. Three inner cylindrical surfaces, i.e., 102d of opening 102e, 102f of opening 102g and 102h of opening 102j, are located in the rotor hub 102k of rotor frame 102. The rotor assembly 18 of movable assembly 14 and the side members 26 and 28 of stator assembly 12 of rotary combustion engine 10 are provided with anti-friction spaces 116. The inner cylindrical surface 102j of opening 102k has a slot or conventional key-way 102m formed to accept a conventional key 118 which is used to fixedly mount the rotor frame 102 on rotor shaft 16. The second inner cylindrical surface 102f of opening 102g is provided with four openings or ports 102gg, which are equally spaced on its periphery. The openings or ports 102gg provide access to the ignition means or alternate fuel injection means 120 of each of the combustion chamber-like segment portions 38 of the rotary internal combustion engine 10. The third inner cylindrical surface 102d of the cylindrical opening 102h is provided with four openings 102hh, one for each of the oscillating piston-type assemblies 20. The four openings 102hh permit the oscillating piston attachments 122 to engage the outer smooth contoured peripheral surface 124a, of the cylindrical contoured member 124, which is located in the cavity provided by opening 102h and which is fixedly mounted on the inner surface 26a of the side member 26 of stationary assembly 12 by means of mounting means 126. Two additional inner surfaces 102n and 102p, which are flat and which are located perpendicular to the engine's center axis 42, define the extremities of rotor hub 102k. All three inner openings 102g, 102h and 102j have as their center axis the axis 42 of rotary internal combustion engine 10.

Continuing with the description of the rotor frame 102 of rotor assembly 18, there are two different types of interconnected cylindrical surface segments that form the outer surface 102r of rotor frame 102 which is comprised of a total of eight cylindrical segments. Four of which are the inverted cylindrical surface segments 102a which are interconnected to the remaining four cylindrical surface segments 102s. The inverted cylindrical surface segments 102a, which are equally spaced about the engine's center axis 42, have two ends, with each of those ends being connected to the rotor frame surface portions 102s so as to thereby form the outer surface 102r of the rotor frame 102. Cylindrical surface portions 102s, which are part of the rotor's outer peripheral surface 18, are formed with the same radius R1. The cylindrical surface segments 102a are preferably formed with the same radius which forms the outer cylindrical surface 48b of oscillating piston 48.

A description of the power output shaft, i.e., the engine's rotatable shaft 16, will next be had herein. For this purpose, reference will be had to FIGS. 1, 1a, and 2. The rotatable power output shaft 16, on which is fixedly mounted by means of key 118 the engine's rotating rotor frame 102, which is cylindrical in shape and is supported for rotation on both ends 130 and 132 of bearing means 30 and 32, has as its center the engine's center axis 42. On the outer smooth cylindrical surface 134 of shaft 16, which is parallel to center axis 42, is formed a keyway 136 with which the key 118 is employed to mount the rotor frame 102 of rotor assembly 14. On one side of the cylindrical surface 134 of rotating shaft 16 there is located the opening 140 that is used to transport anti-friction fluid 142 via opening 128 of rotor frame 102 to various movable assemblies of rotor assembly 18 such as pistons 48 and piston ring assembly 150. The anti-friction fluid 142 enters the opening 128 of rotor frame 102 through the tunnel 138, which is preferably located in the center of shaft 16 and which is connected to the oil pan 146 by means of the tunnel 144 located in the side member 26. At the end 130 of the shaft 16 the flywheel 148 is fixedly mounted by mounting means such as bolt 152. The other end 132 of shaft 16 has formed therein a hole 154 that leads to the openings 156, which are used to provide access to the ignitors 120 for the electric wires or fuel transport tubes 158.

Continuing with the description of the movable assembly 14, reference will be had for this purpose to FIGS. 1, 2, 9, 19A and 19B of the drawing. Between the rotor frame 102 and rotor portions 46 there are spacers 106. Each spacer 106 is a cylindrical segment which has an inner cylindrical surface 106b, an outer cylindrical surface 106a and flat end surfaces 106c and 106d. The thickness 104 thereof is equal to the space between the cylindrical surface 102a of the rotor frame and the cylindrical surface 46b of the rotor portion. The thickness 104 of the spacer 106 is equal to that of the oscillating piston 48 plus a suitable clearance to permit the oscillating piston 48 to oscillate freely between a first position 160, which is the maximum to which the oscillating piston 48 projects above the engine's mid-periphery 40 and a second position 162, which is the minimum to which the oscillating piston 48 retracts below the engine's mid-periphery 40. Through the cylindrical surfaces 106a and 106b of spacer 106 there are formed a number of openings, such as the openings 106e which provide access to the ignition means or alternatively to the fuel injection means 120 of the internal combustion engine 10 as well as enable the means of oscillating piston assisting means 122 to pass therethrough in order to engage the contoured surface 124a of the stationary contoured member 124. The openings 106f essentially receive therewith the dowel pins 164 which locate the rotor portion 46 on rotor frame 102, and the openings 106g are provided to permit the fasteners 110 to pass therethrough in order to fixedly mount the rotor portion 46 on the rotor frame 102.

A description will now be set forth herein of the oscillating piston assemblies 20 of the movable assembly 14 of the rotary internal combustion engine 10. For this purpose reference will be had to FIGS. 1, 2, 4, 4A and 4B of the drawing. The main component of each of the oscillating piston assemblies 20 is the oscillating piston 48, which is cylindrical in configuration and which has an inner smooth cylindrical surface 48a and an outer smooth cylindrical surface 48b that are parallel to each other. In addition, each oscillating piston 48 has two other surfaces 48f and 48g, which are flat and smooth and which extend parallel to each other and to the flat surfaces 26a and 28a of the side members 26 and 28 of the rotary internal combustion engine 10. The distance between the surfaces 26a and 28a of the stator assembly 12 is equal to the distance to the surfaces 48f and 48g plus an anti-friction clearance or space 116. There are two more surfaces 48h and 48j which also extend parallel to each other and to the engine's center axis 42. Preferably in the center of the cylindrical surfaces 48a and 48b there is provided a square opening 48k which exists between the surfaces 48f', 48g', 48h' and 48j' which are flat and extend parallel to each other. The surfaces 48h' and 48j' also extend parallel to the engine's center axis 42. The distance between the parallel surfaces 48f' and 48g' of the oscillating piston 48 is equal to the distance between the parallel surfaces 106d of the rotor spacer 106 plus a suitable clearance required for free movement of the oscillating piston 48 between a first position and a second position. The distance between the parallel surfaces 48h' and 48j' is equal to the distance between the parallel surfaces 106c of the rotor spacer 106 shown in FIGS. 19 and 19A plus the maximum traveling or oscillating motion of the oscillating piston 48 with an additional suitable clearance being provided to avoid collision between the oscillating piston 48 and the rotor spacer 106. Conventional sealing rings and oil rings 150, partially cylindrical segments and partially rectangular, which form part of the oscillating piston assembly 48, are located in the grooves 48l and 48m for sealing around the oscillating piston 48. Anti-friction fluid 142 provided to the piston assemblies 20 is farther advanced through the openings 48n of the pistons 48 into the space between the movable assembly 14 and the stationary assembly 12. The anti-friction fluid then is applied or spread evenly with the assistance of the piston rings 150 on surfaces 26a, 28a of the stator side members 26 and 28 and on the contoured surface 50 of the stator's contoured member 34, for the purpose of reducing the friction between the piston rings 150 and the stator assembly 12 when the movable assembly is in motion.

Continuing with the explanation of the rotary internal combustion engine 10a, reference will be had to the FIGS. 1A, 1B, 9, 9A and 10. The internal combustion engine 10, presently shown in FIG. 1, is the type which embodies four oscillating pistons 48 which have the oscillating center 108 spaced 90° degrees apart and in an equal distance from the engine's center axis 42. The oscillating centers 108 of oscillating pistons 48 are located externally to the engine's mid-periphery 40, thereby positioning the pistons farther away from the engine's center axis 42 in order to increase the center part of rotor frame 102 to be used for the openings 102e and 102g and to provide access to the ignition or alternatively fuel injection means 120. Unlike the internal combustion engine 10 shown in FIG. 1, which embodies four oscillating pistons 48, the internal combustion engine 10a shown in FIG. 10 embodies eight oscillating pistons 48. The oscillating pistons 48 of internal combustion 10a are spaced apart evenly in a peripheral way at 45° degrees apart and at an equal distance from the engine's center axis 42. The oscillating center 108a of oscillating pistons 48 of rotary internal combustion engine 10a are internal to the engine's mid-periphery 40a. More specifically, the oscillating centers 108a of the eight oscillating pistons 48 are in the center of cords 170. Each cord 170 is equal to a distance between two intersecting points 172 45° degrees apart measured on mid-periphery 40a. The distance 170 between the points 172 which are 45° degrees apart is also equal to the outside diameter D of the oscillating piston 48 shown in FIG. 4A, plus a suitable clearance required therein to avoid friction between the oscillating pistons 48 when the engine is in motion.

A description will now be set forth herein for the remainder of the rotor cylindrical portion 46. For this purpose reference will be had to the FIGS. 1A, 5, 5A and 5B of the drawing. Each cylindrical portion 46 which is fixedly mounted on rotor frame 102 with means for mounting such bolts 110 that engage the threaded openings 112 located in surface 46b, is employed to restrain the oscillating pistons 48 from escaping the movable assembly 14 due to the centrifugal forces generated during the rotation of the movable assembly 14. Furthermore, the rotor portion 46 is employed to absorb the forces generated by the gases during combustion in the combustion chambers thereby minimizing the thrust pressure exerted on oscillating piston 48. Rotor portion 46 is comprised of the area between two flat and parallel to each other surfaces 46f and 46g and two cylindrical and parallel to each other surface segments 46a and 46b. Cylindrical surface segment 46a which is part of the rotor's outer cylindrical surface has a concave surface 46j intended to protect the ignition or alternatively fuel injection means 120. In each of the concave surfaces 46j there is a threaded opening 46d in which there is fixedly mounted the ignitor or alternatively fuel injection means 120. On cylindrical surface 46b of rotor portion 46, which is typical of the oscillating piston cylindrical surface 48a, there are grooves 46k all around its extremities, formed for the purpose of accepting conventional gas sealing means 150 to prevent the combustible gases from escaping the combustion chambers 38 as well as to minimize the leaks of anti-friction fluid 142 into combustion chambers 48. Threaded opening 46d is linked to the rotor's inner cylindrical opening 102hh by a larger opening 46m for the purpose of accessing the ignitor or alternate fuel injection means 120.

A description will now be set forth herein of the third embodiment of the oscillating piston 180 of the movable assembly 14 of the rotary internal combustion engine 10. For this purpose reference will be had to FIGS. 6 and 6A of the drawing. The oscillating piston 180 is cylindrical in configuration and has an inner and an outer cylindrical surface 180c and 128d. Oscillating piston 180 is constructed in a similar fashion as oscillating piston 48 shown in FIG. 4 of the drawing, and is divided into oscillating piston sections 180a and 180b. Piston sections 180a and 180b which are movably mounted on the rotor assembly 14 are kept together by mounting means which are located in openings 180e along surfaces 180f but can also be alternatively joined together fixedly by means for mounting such as by being welded thereto.

Figure 7:
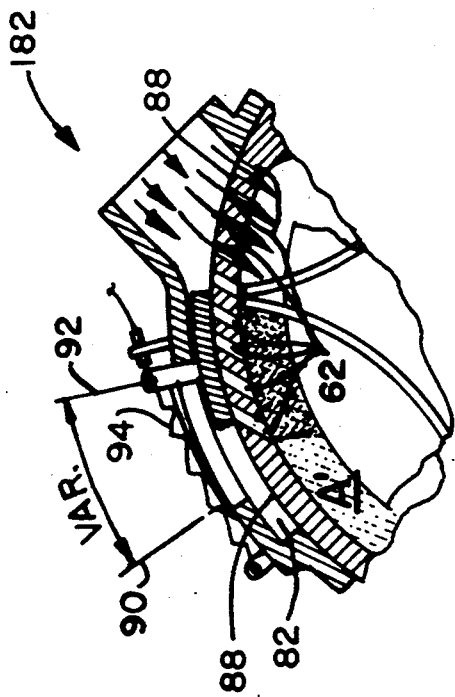
FIG. 7 is a partial side elevation view in section of a secondary inlet flow control mechanism or throttle which is supported for movement above the stator inlet ports of an internal combustion engine depicted in a first position, constructed in accordance with the present invention.
Figure 7A:
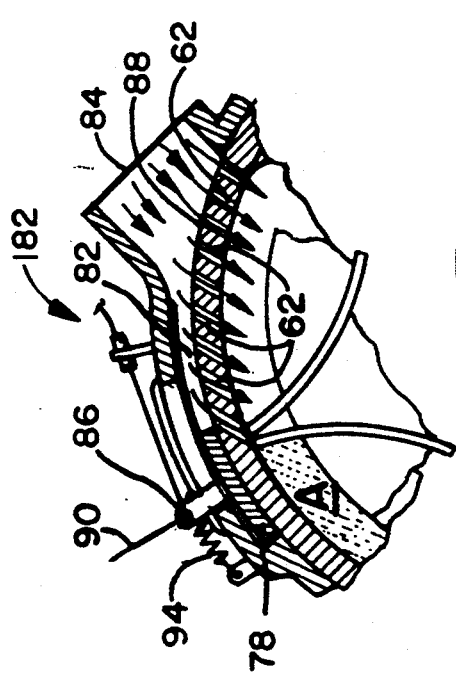
FIG. 7A is a partial side elevation view in section of a secondary inlet flow control mechanism or throttle which is supported for movement above the stator inlet ports of an internal combustion engine depicted in a second position, constructed in accordance with the present invention.

Reference will be had now to FIG. 7 and 7A of the drawing. There is depicted therein an inlet gas control mechanism 182 which is located on the external surface of the contoured member 34 of stator assembly 12, with the secondary gas inlet throttle 78 which is used to control or increase the gas volume trapped in the inlet sector W1 of the internal combustion engine 10 by an area denoted by the letter A' in addition to an initial gas volume shown by an area denoted with the letter A. By way of illustration, the secondary inlet throttle 78 slidably moves above perforations 62 from a first position 90 to a second position 92 and infinite positions in between, to cover or uncover the perforations 62 of the inlet sector W1, thereby affecting the compression ratio in the compression sector W2 of the internal combustion engine 10. The use of the secondary inlet throttle 78 provides the means for generating additional power instantly by altering the compression of the internal combustion engine 10 while yet the air/fuel ratio remains constant thereby achieving complete and predictable combustion. In addition, the first or initial position 90 of the secondary inlet throttle 78 can be relocated permanently, for the purpose of altering the compression ratio in the compression sector W2 and effectively permit the use for combustion, of a variety of known combustible fuels that require a different ignition pressure.

Figure 8:
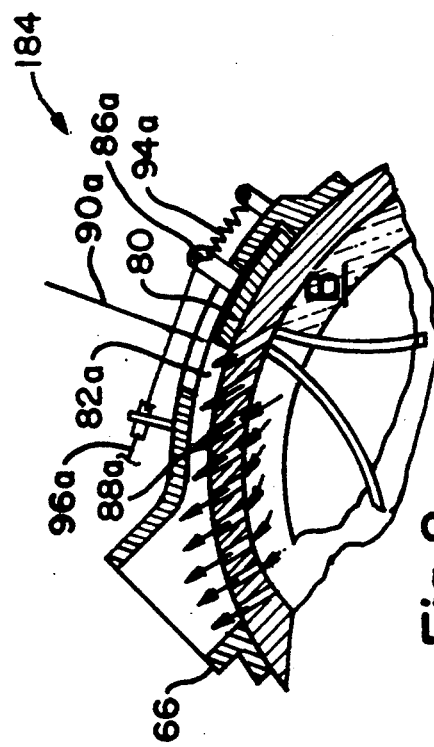
FIG. 8 is a partial side elevation view in section of a primary outlet flow control mechanism or throttle which is supported for movement above the outlet ports of the stator assembly of an internal combustion engine depicted in a first position, constructed in accordance with the present invention.
Figure 8A:
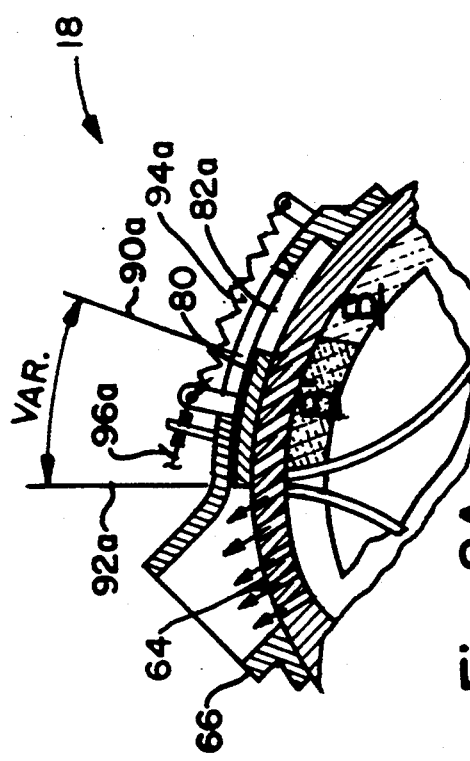
FIG. 8A is a partial side elevation view in section of a primary outlet flow control mechanism or throttle which is supported for movement above the outlet ports of the stator assembly of an internal combustion engine depicted in a second position, constructed in accordance with the present invention.

A description will be set forth of FIGS. 8 and 8A. There is depicted therein the outlet flow control mechanism 184 located on the external surface of the contoured member 34 of stator assembly 12. The outlet flow control mechanism 184 comprises a primary or exhaust gas throttle 80 which operates in a similar fashion as the secondary inlet throttle 78. Gas throttle 80 is capable of sliding above perforations 64 with the assistance of throttle wire 92a, or any conventional retractable means required for movement, from a first position 90a to a second position 96a and in any position in between and return back to the first position 90a for the purpose of extending the expansion of the combustible gases in the expansion sector W3 by an additional volume shown by the area denoted by the letter B' beyond the normal volume shown by the area denoted by the area B.

Continuing with the description of FIGS. 9 and 9A of the drawing, there is depicted therein the rotor frame 102 of the movable assembly 14, shown with the opening 102h for the rotatable shaft 16 and the openings 102gg and 102hh to access the ignition means and means for assisting the pistons for oscillation and the cylindrical surfaces 102a where the oscillating pistons assemblies 20, the rotor portions 46 and the spacers 106 are nesting.

Figure 10:
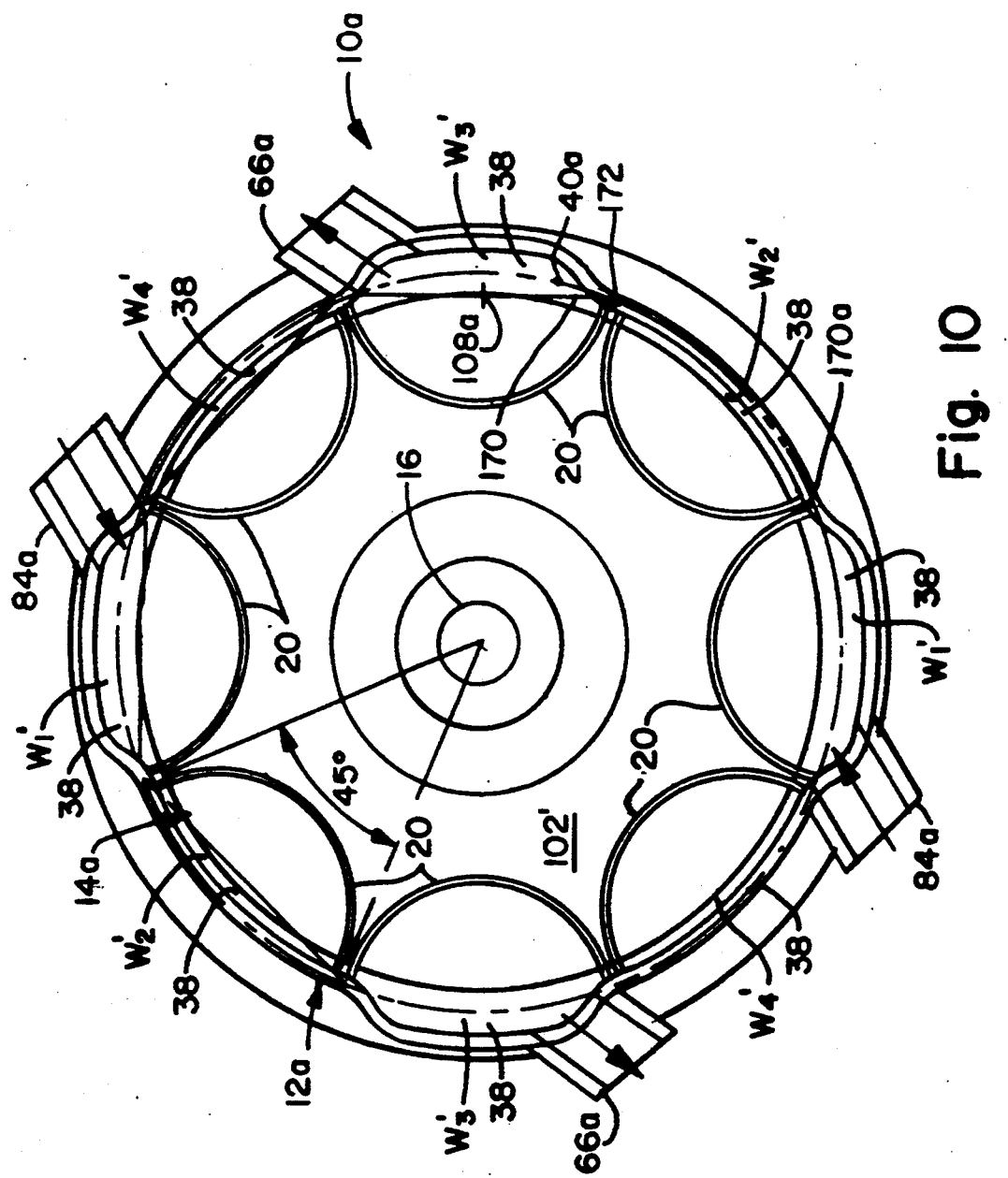
FIG. 10 is a schematic side elevation view of a second embodiment of the inlet manifolds, the outlet manifolds and oscillating piston of the internal combustion engine, constructed in accordance with the present invention.

Continuing with a description of the rotary internal combustion engine 10a, for this purpose reference will be had to FIG. 10 of the drawing. FIG. 10 is a schematic side elevation view of a second embodiment of a rotary internal combustion engine 10a constructed in accordance with the present invention. The internal combustion engine 10a generally comprises eight rotating combustion chambers 38 formed radially about the engine's center axis 42 between the multi-piston movable assembly 14a and the multi-sector stator assembly 12a in a way similar to the description of FIG. 1 of the drawing. On movable assembly 14a are movably mounted for oscillation between a first position and a second position, eight oscillating piston assemblies 20. Oscillating piston assemblies 20a, are equally spaced about the engine's center axis 42 with their oscillating center 108a located internally of the engine's mid-periphery 40a, on the center of the cord D', with D' being equal to a 45° degree cord measured on mid-periphery 40a. The outer diameter D of the oscillating pistons assembly 20 is equal to the cord D' minus a clearance 170a required between oscillating pistons 20 to avoid friction. The multi-sector stator assembly 12a embodies two inlet sectors W1' with their inlet perforations (not shown) and the inlet manifold 84a, two compression sectors W1', two expansion sectors W3' with their outlet perforations and the outlet manifolds 66a and two cleaning sectors W4'. Therefore, the rotary internal combustion 10a described in FIG. 10 of the drawings, is of the multi-firing type, which has two opposite combustion chambers 38 fired simultaneously. The simultaneous firing of the two opposing combustion chambers 38 minimizes the thrust forces applied on rotable shaft 16, and reduces the vibration generated during combustion in the combustion chambers of the rotary internal combustion engine 10a.

Figure 11:
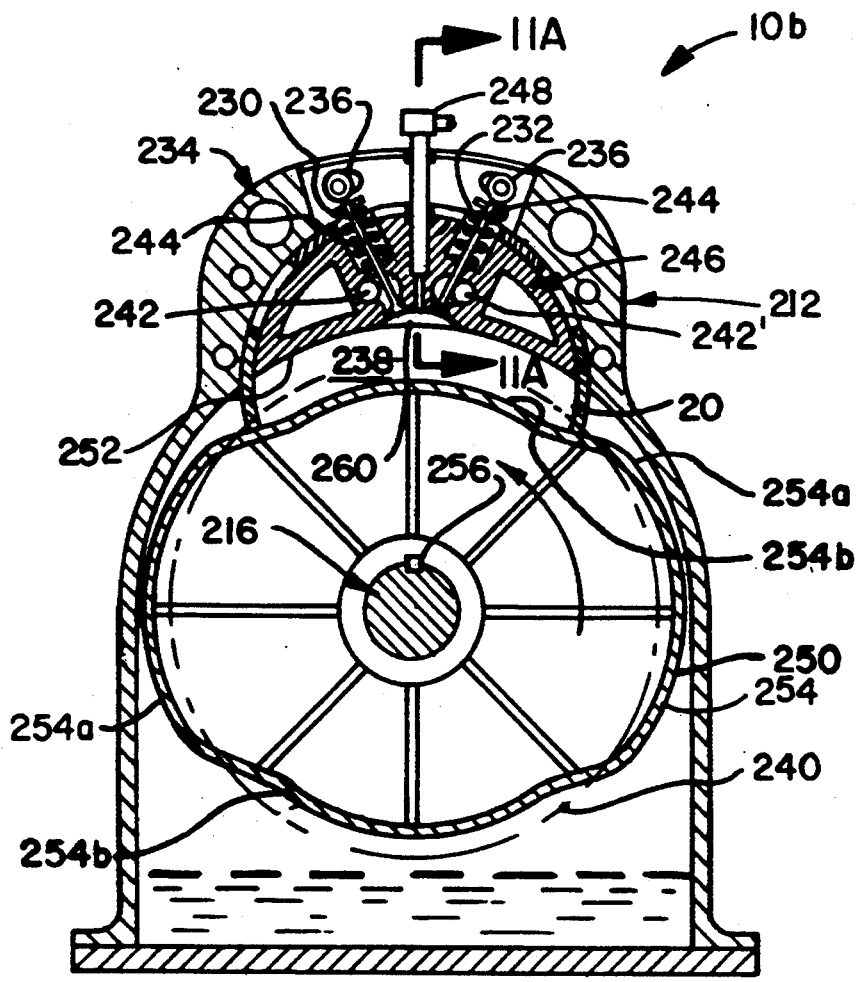
FIG. 11 is a side elevation view partially in section of a third embodiment of the inlet and outlet valves of an internal combustion engine embodying an oscillating piston, constructed in accordance with the present invention.
Figure 11A:
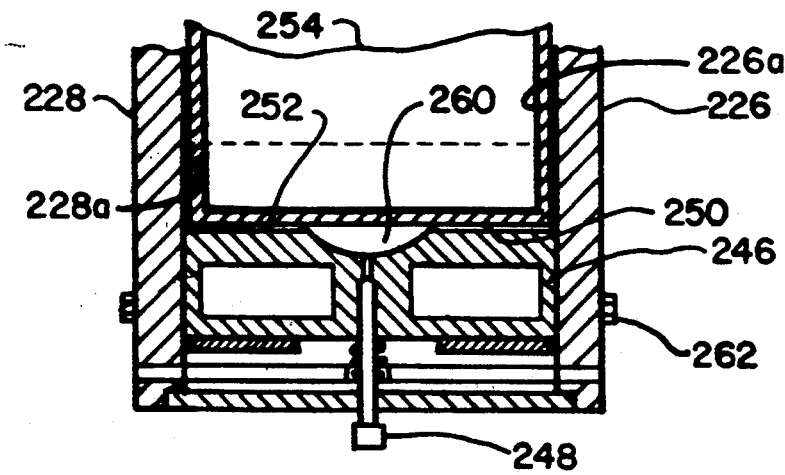
FIG. 11A is a partial side elevation view in section of the third embodiment depicted in FIG. 11, taken substantially along the line 11A—11A in FIG. 11, constructed in accordance with the present invention.

Continuing with the description of a rotary internal combustion engine 10b, reference will be had to FIGS. 11 and 11A of the drawing. FIG. 11 is a side elevation view of a third embodiment of an internal combustion engine 10b constructed in accordance with the present invention embodying a single combustion chamber 238, the inlet and the outlet valves 230 and 232 respectively and the cylindrical portion 246. The oscillating piston 20 is movably mounted for oscillation on stator body 212 with means for mounting between the cylindrical portion 246 and the stator member 234. The valves 230 and 232, which are of conventional construction, are synchronized to open with the assistance of means for opening such as cam shafts 236 and close with the assistance of means for closing such as conventional springs 244. The inlet valve 230 permits the combustible gases to enter the combustion chamber 238 through the inlet port 242 and valve 232 permits the combusted gases to exit the combustion chamber 238 through the exhaust port 242'. Ignition or alternatively fuel injection means 248 which are fixedly mounted on cylindrical portion 246 extend from the outer side of the engine into an inner concave surface 260 of cylindrical surface 252. The stationary combustion chamber 238, is formed between the cylindrical surface 252 of the cylindrical portion 246, the contoured peripheral surface 250 of the rotating rotor 254 and the inner flat and smooth surfaces 226a and 228a of the side members 226, 228 of the internal combustion engine 10b. The contoured peripheral surface 250 of rotating rotor 254, which is fixedly mounted for rotation on the rotatable shaft 216 with mounting means such as shaft key 256, is constructed in a similar manner as the contoured peripheral surface 50 shown in FIG. 1 of the drawing. Two surface portions 254a of the contoured surface 250 project above the mid-periphery 240 and two surface portions 254b recede below the mid-periphery 240. FIG. 11A which is a partial section taken along line 11A—11A in FIG. 11, shows the cylindrical portion 246 fixedly mounted between stator side members 226 and 228 with means for mounting 262.

Figure 12A:
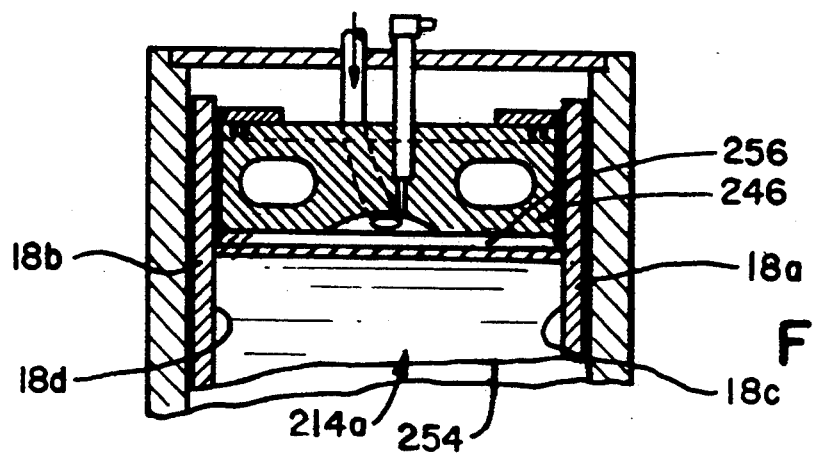
FIG. 12A is a partial side elevation view in section of the fourth embodiment depicted in FIG. 12, taken substantially along the line 12A—12A in FIG. 12, constructed in accordance with the present invention.
Figure 12:
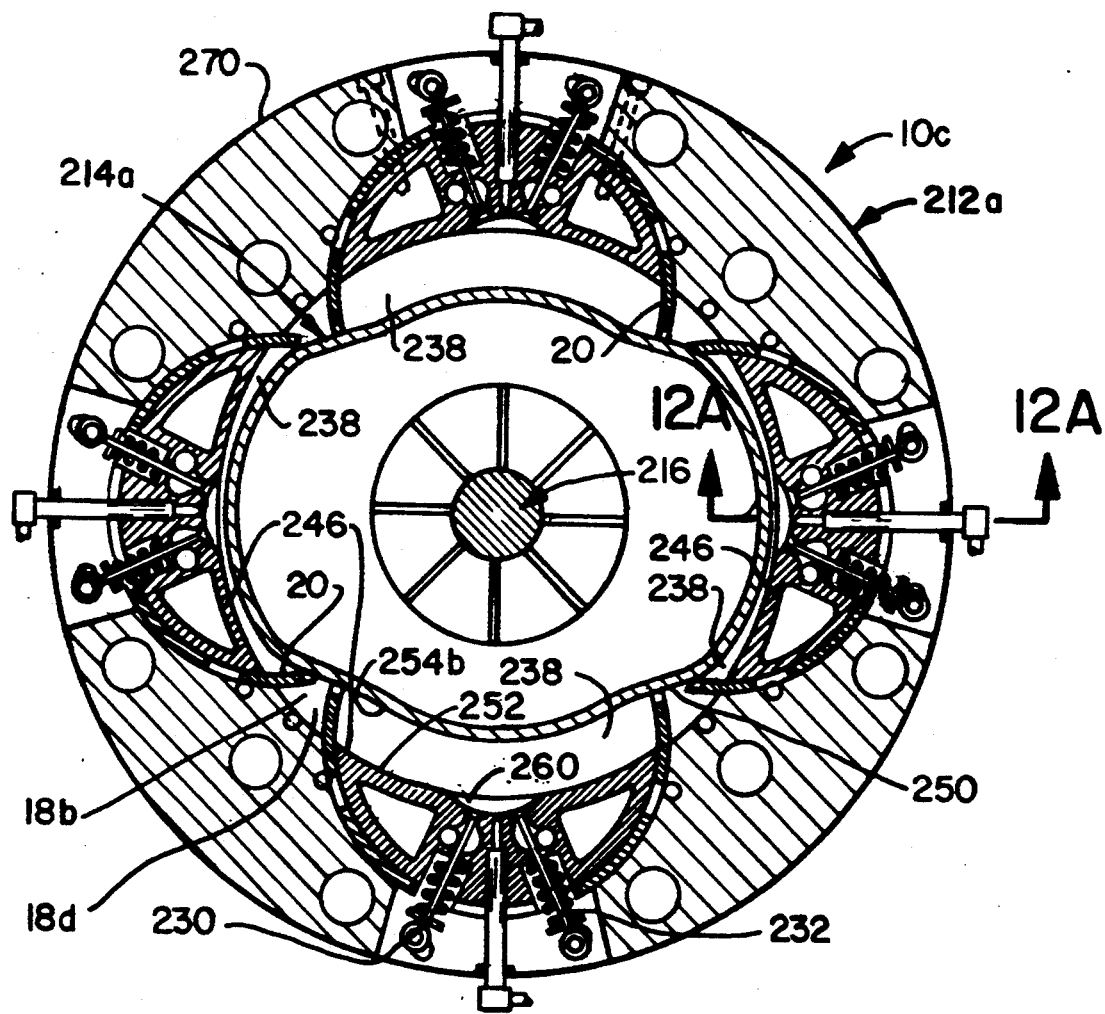
FIG. 12 is a side elevation view partially in section of a fourth embodiment of the inlet and outlet valves of an internal combustion engine embodying an oscillating piston, constructed in accordance with the present invention.

Reference will be had now to FIGS. 12 and 12A of the drawing. FIG. 12 is a sectional side elevation view of a fourth embodiment of an internal combustion engine 10c constructed in accordance with the present invention. FIG. 12A is a partial sectional view taken along the line 12A—12A in FIG. 12. Internal combustion engine 10c embodies a plurality of inlet valves 230, outlet valves 232, cylindrical portions 246, oscillating piston assemblies 20 as part of a stator assembly 212a, the stationary combustion chambers 234 and the rotating assembly 214a with rotor 254 mounted on rotor shaft 216. The internal combustion engine 10c, which is constructed in a similar manner as rotary internal combustion engine 10b shown in FIG. 11, embodies four equal stationary combustion chambers 238 rather than one as shown in the embodiment 10b. The combustion chambers 238 are formed between the rotor's contoured surface 250, the cylindrical surface 252 of cylindrical potion 246 and the inner smooth and flat cylindrical surfaces 18c and 18d of the two side members 18a and 18b which are fixedly mounted on the sides of the rotating rotor 254. The rotating assembly 214a is typical of the rotating assembly of the third embodiment of the internal combustion engine 10b.

Figure 13:
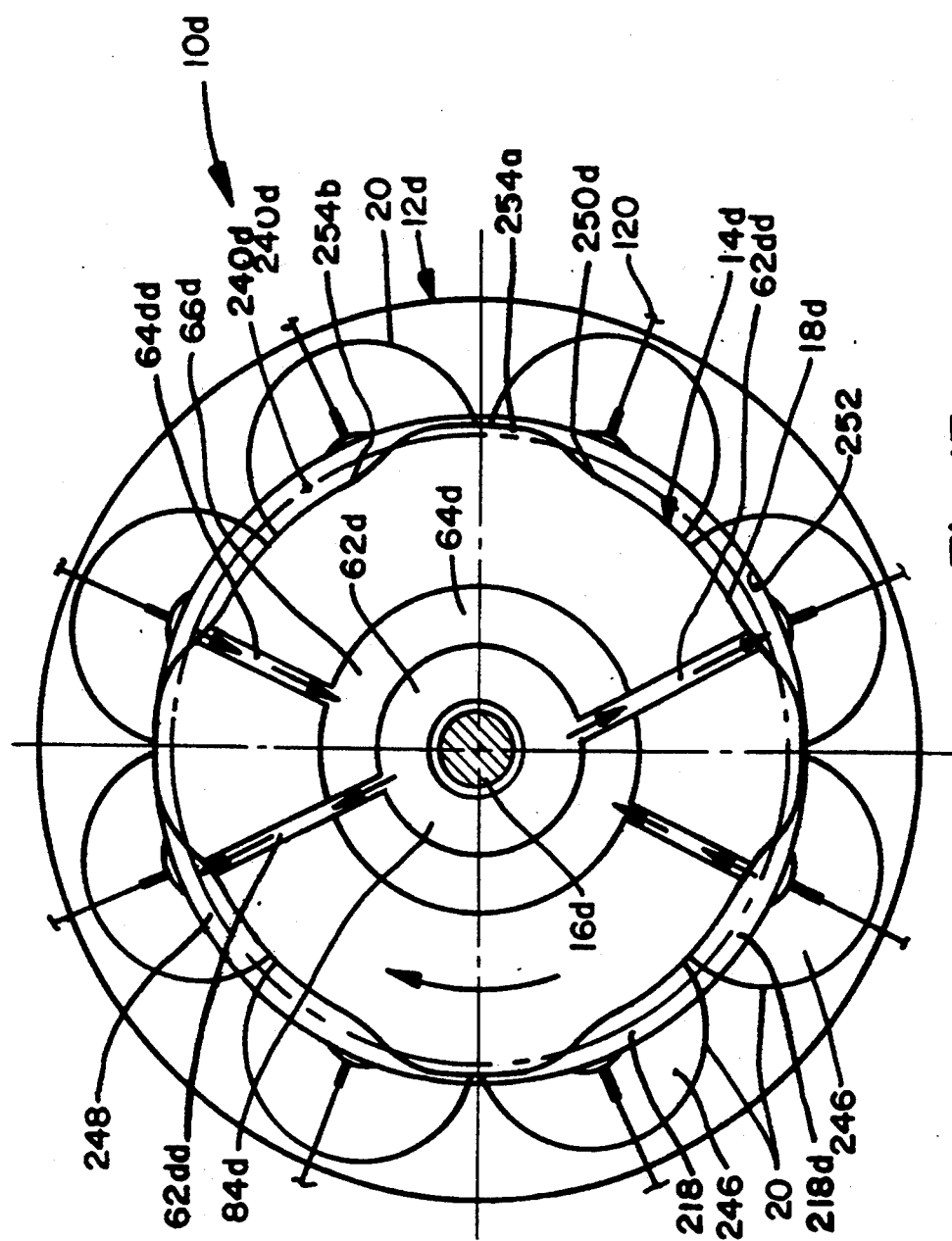
FIG. 13 is a side elevation view partially in section of the fifth embodiment of the inlet and outlet valves of an internal combustion engine embodying an oscillating piston, constructed in accordance with the present invention.

Continuing with a description of FIG. 13 of the drawing, FIG. 13 is a schematic representation of a side elevation of a fifth embodiment of an internal combustion engine 10d constructed in accordance with the present invention. The stationary assembly 12d embodies the plurality of oscillating piston assemblies 20, the cylindrical portions 246 and the ignition or alternatively fuel injection means 120, and is constructed in a similar manner as that shown in FIG. 11 of the drawing. The movable assembly 14d embodies a rotor 18d mounted fixedly with means for mounting on the rotatable power shaft 16d. The rotating rotor 18d along its center embodies two concentric manifolds, an inlet manifold 62d and an outlet manifold 64d, located between the rotating shaft 16d and the rotating rotor 18d. Combustible gases from inlet manifold 62d enter the combustion chamber 248 through inlet ports 62dd and exit the combustion chamber 248 to the outlet manifold 64d through outlet ports 64dd after the combustion has been completed. The contoured surface 250d of rotating rotor 18d is constructed in a similar manner as of that of the third embodiment shown in FIG. 11 embodying a plurality of surface segments 254a that project above the mid-periphery 240d and a plurality of surface segments 254b that recede below mid-periphery 240d. The combustion chambers 248, which are stationary, are formed between the contoured peripheral surface 250d of rotating rotor 18d, the cylindrical surface 252 of cylindrical portion 246, part of the inner cylindrical surface of oscillating piston 20 and the flat smooth parallel to each other surfaces 218d of the engine's side members 218.

Figure 14A:
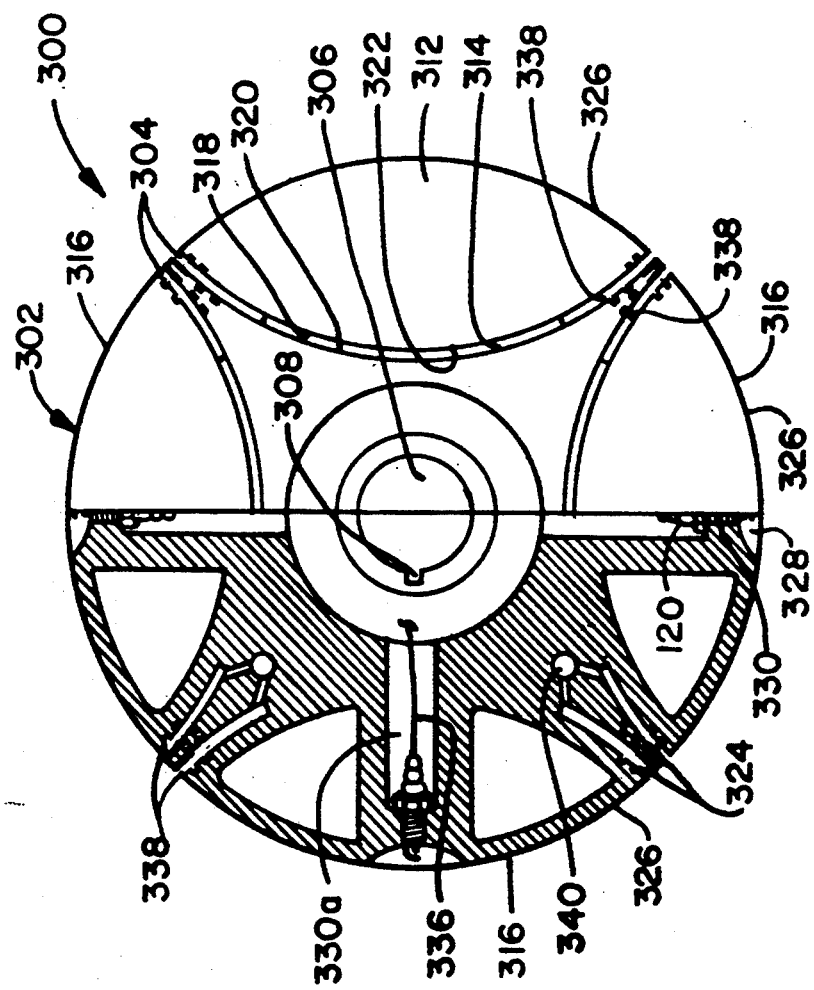
FIG. 14A is an end view partially in section of the second embodiment of the rotor depicted in FIG. 14 of an internal combustion engine, constructed in accordance with the present invention.

A description will now be set forth herein of the second embodiment of the rotating rotor of the internal combustion engine. For this purpose reference will be had to FIGS. 14 and 14A of the drawing where there is depicted the rotor 300 that is constructed in accordance with the present invention. Unlike the rotor assembly 18 of the movable assembly 14 depicted in FIGS. 1 and 2 which is comprised of the cylindrical portions 46 shown in FIGS. 5, 5A and 5B, the spacer 106 shown in FIGS. 19 and 19A and the rotor frame 102 shown in FIGS. 9 and 9A of the drawing, the rotor 300 is one solid unit. Rotor 300 is a cylindrical body with an outer smooth cylindrical surface 302 interrupted with grooves 304, an inner cylindrical opening 306 with a conventional keyway 308 used for mounting on a rotating power output shaft (not shown) and two end flat surfaces 310 and 312 which are perpendicular to the outer cylindrical surfaces 302 which also are interrupted with grooves 314. Rotor grooves 304 and 314 form a continuous ring space 338 in which there is placed for oscillating movement between a first position and a second position the oscillating type pistons 180. The rotor-like portions 316 of the rotor 300 projecting above the rotor-like spacers 318 which in turn project above the smooth cylindrical surface 320 of the rotor 300. The rotor portions 316 have an inner smooth cylindrical surface 322 crafted with grooves 324 for the purpose of accepting sealing means (not shown) and an outer smooth cylindrical surface 326 which is a portion of the rotor's cylindrical surface 302. On each of the cylindrical surface portions 326 there is a concave surface 328 with a threaded opening 330 in which are mounted the ignition or alternatively fuel injection means 120. An opening 330a connecting the concave surface threaded opening 330 to the inner cylindrical opening 306 is used as an opening for ignition wires or alternatively fuel injection line means 336. To avoid excessive friction between the oscillating pistons 180 and the rotor cylindrical surfaces 320 and 332 anti-friction fluid means are provided in the cylindrical type space 338 through the opening 340 which leads into inner cylindrical surface 306 of the rotor 300.

Continuing with the description of the rotary combustion engine, for this purpose reference will be had to FIGS. 15 and 15A of the drawing. There is therein depicted the fourth embodiment of the piston 342 of the rotary internal combustion engine constructed in accordance with the present invention, shown mounted on a rotating rotor 344 for oscillating movement between a first and a second position. Oscillating piston 342 comprises two cylindrical type segments 348, four cylindrical segments 350 and two cylindrical segments 352 forming one unit. The cylindrical segments 352 of oscillating piston 342 are placed between the rotor 344 and the sides of the stator assembly (not shown) for the purpose of restricting the combustible gases accumulating between the rotor and the stator assembly.

Reference now will be had to FIGS. 16 and 16A of the drawing, where there is depicted a fifth embodiment of the oscillating piston 354 of the rotary internal combustion engine constructed in accordance with the present invention. Oscillating piston 354 is an embodiment comprised of an outer portion 356 and an inner cylindrical segment 362 which slides on a cylindrical surface 364 of rotating rotor 366. The outer portion 356, which is fully exposed to combustible gases, is comprised of two cylindrical segments 358 and a cylindrical, segment 360. The cylindrical segment 362 of oscillating piston 354 has two side cuts 368 facing outwards and opposite to each other, used for mounting on rotor 366. By positioning the cuts 368 over the clips 370 of rotor 366 and pressing towards the center of the rotor then rotating the oscillating piston 354 to the right, the wider part 362a of the cylindrical segment 362 passes under the rotor clips 370 for the purpose of restraining the oscillating pistons on the rotating rotor 366.

Continuing with the description of the rotary combustion internal engine, for this purpose reference will be had to FIGS. 17 and 17a of the drawing. There is depicted a sixth embodiment of the piston 372 used in a rotary internal combustion engine denoted with a general numeral 10f. Oscillating piston 372 is constructed and mounted in a similar manner as is the oscillating piston 354 shown in FIGS. 16 and 16A except that the inner portion 374 formed from two opposing cylindrical segments 374a, 374b has cuts 376 located inwards and rotor clips 378 of the rotor 380 facing outwards for the purpose of mounting the oscillating pistons 372 on the rotating rotor 380 of rotary internal combustion engine 10f.

Figure 18:
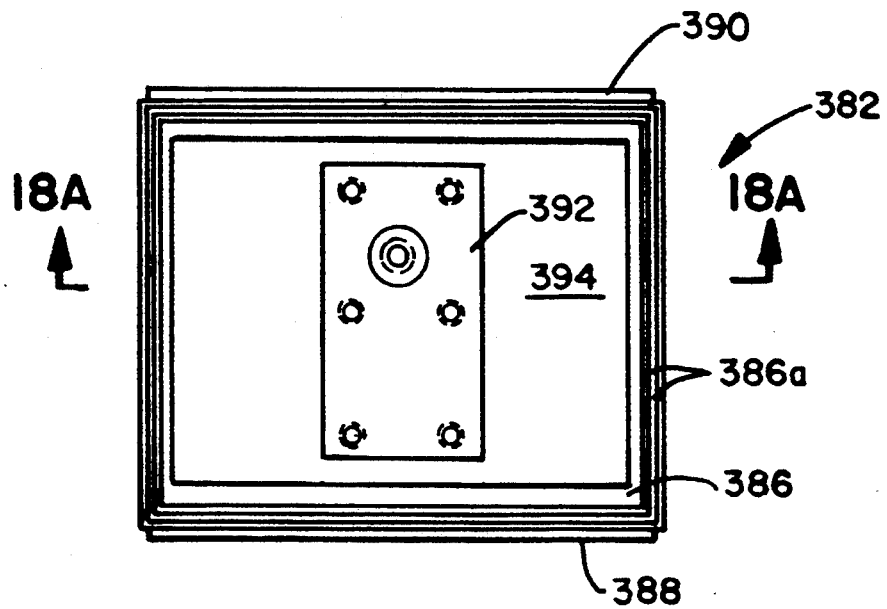
FIG. 18 is an inner view of a second embodiment of the rotor portion of an internal combustion engine, constructed in accordance with the present invention.
Figure 18A:
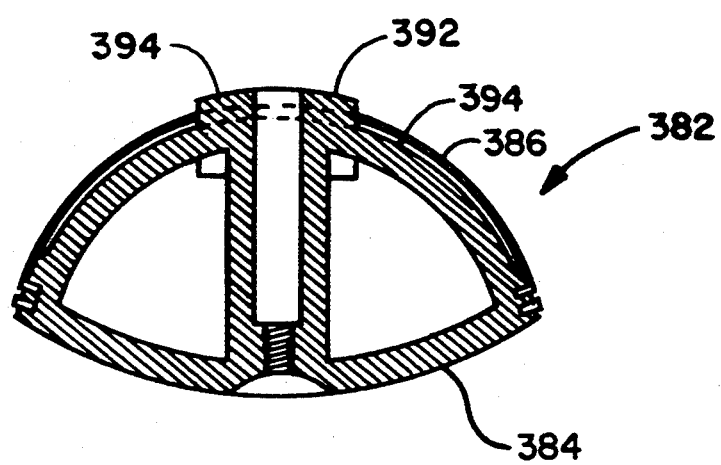
FIG. 18A is a cross-sectional view of the second embodiment of the portion of the internal combustion engine depicted in FIG. 18A, taken substantially along the line 18A—18A in FIG. 18, constructed in accordance with the present invention.

A description will now be set forth herein of the second embodiment of the rotor portion of the rotary internal combustion engine, and for this purpose reference will be had to FIGS. 18 and 18a of the drawing. The rotor portion denoted with the general numeral 382 which is constructed in accordance with the present invention is a combination of the rotor portion 46 shown in FIGS. 5, 5A, and 5B and the spacer 106 shown in FIGS. 19 and 19a of the drawing. Unlike the first embodiment of the rotor portion 46 and the spacer 106 which are two different parts, the rotor portion 382 is one unit. The rotor portion 382 is confined between an outer smooth cylindrical surface segment 384, an inner cylindrical surface segment generally denoted with the numeral 386 and two side flat surfaces 388 and 390 which are parallel to each other and perpendicular to the cylindrical surface segments 384 and 386. The inner cylindrical surface segment 386 has grooves 386a for sealing means (not shown), similar to the ones described in rotor portion 46. A part of the inner cylindrical surface segment 386 of rotor portion 382 is covered by an extended member 392 serving as a spacer, similar to the spacer 46 shown in FIG. 9 of the drawing. Another part of the cylindrical surface 386 denoted with the numeral 394 recedes for the purpose of reducing the friction between the oscillating piston and the rotor portion 382.

A description will now be set forth of the remainder of the rotor spacer 106 of the rotary internal combustion engine 10. For this purpose reference will had to the FIGS. 19 and 19A of the drawing. Spacer 106 is used to provide the necessary clearance between the rotor frame 102 and rotor portion 46 shown in FIGS. 1 and 2 of the drawings for the oscillating piston assembly 20 thereby permitting the oscillating piston assembly 20 to oscillate between a first position and a second position.

Figure 5:
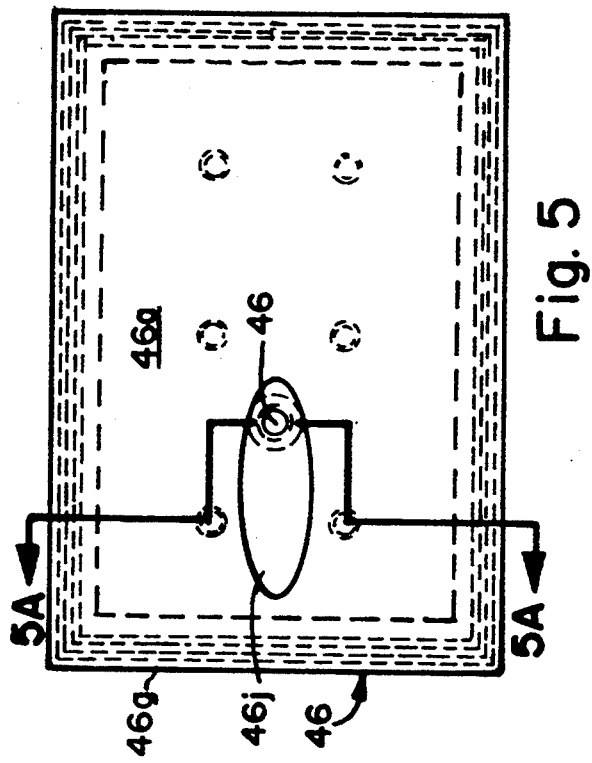
FIG. 5 is an outer or top view of the rotor portion of an internal combustion engine, constructed in accordance with the present invention.
Figure 5B:
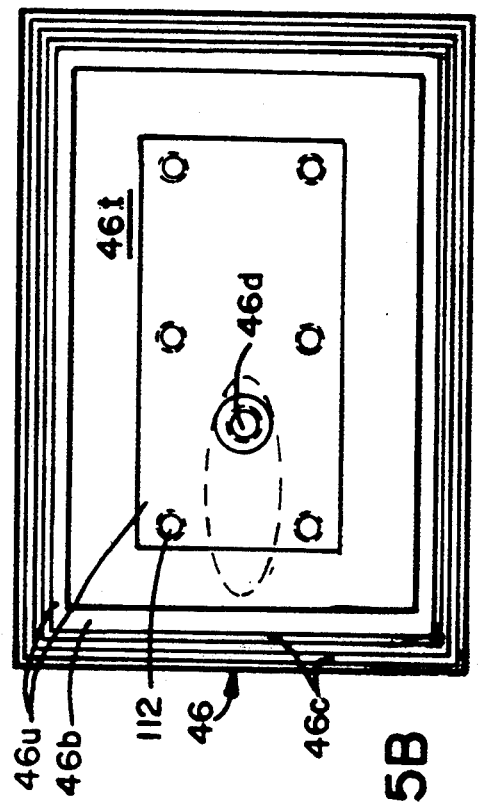
FIG. 5B is an inner or bottom view of the rotor portion of an internal combustion engine, constructed in accordance with the present invention.
Figure 5A:
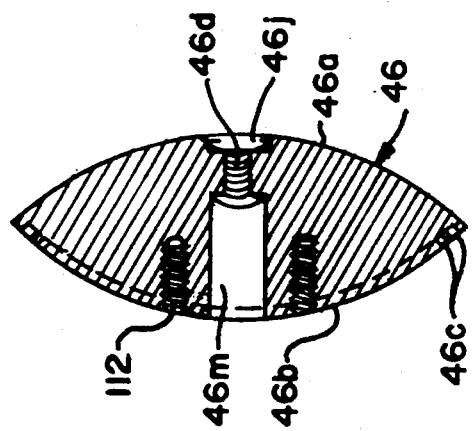
FIG. 5A is a cross-sectional side elevation view of the rotor portion of the internal combustion engine depicted in FIG. 5, taken substantially along the line 5A—5A in FIG. 5, constructed in accordance with the present invention.
Figure 20:
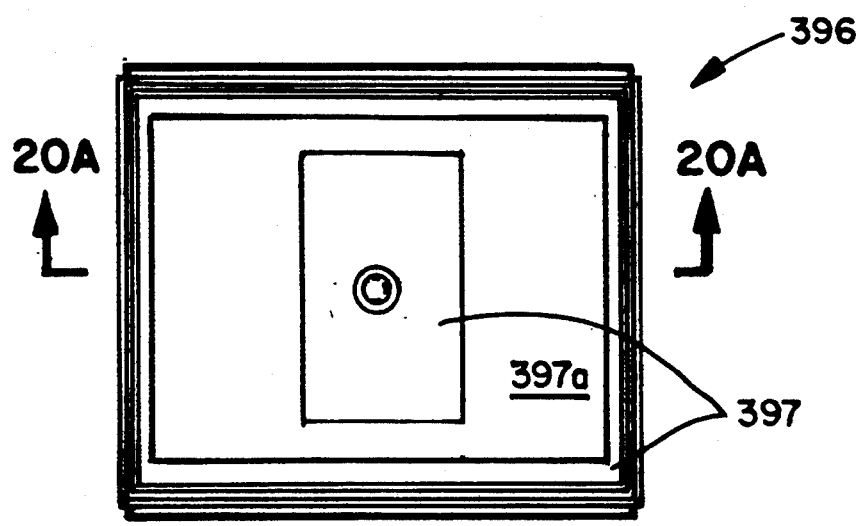
FIG. 20 is an inner view of a third embodiment of the rotor portion of an internal combustion engine, constructed in accordance with the present invention.
Figure 20A:
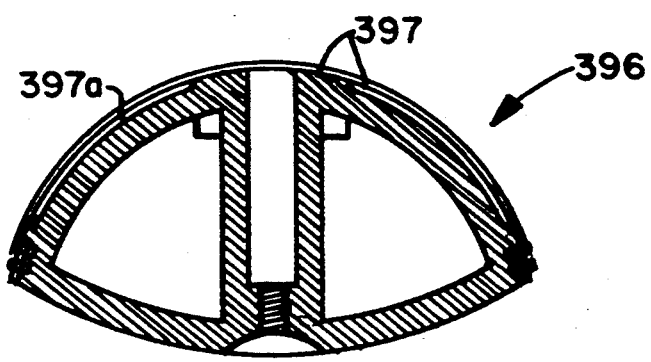
FIG. 20A is a cross-sectional view of the third embodiment of the rotor portion of the internal combustion engine depicted in FIG. 20A, taken substantially along the line 20A—20A in FIG. 20, constructed in accordance with the present invention.

Reference will be had now to FIGS. 20 and 20A of the drawing for a description of a third embodiment of the rotor portion 396. Rotor portion 396 is constructed in accordance with the present invention and in a similar manner as rotor portion 46 which is shown in FIGS. 5, 5A and 5B of the drawing, with the exception that a part 397a of the inner cylindrical surface segment 397 recedes, for the purpose of reducing the friction between rotor portion 396 and the oscillating piston similar to the one shown in FIGS. 4, 4A and 4B of the drawing.

Figure 21:
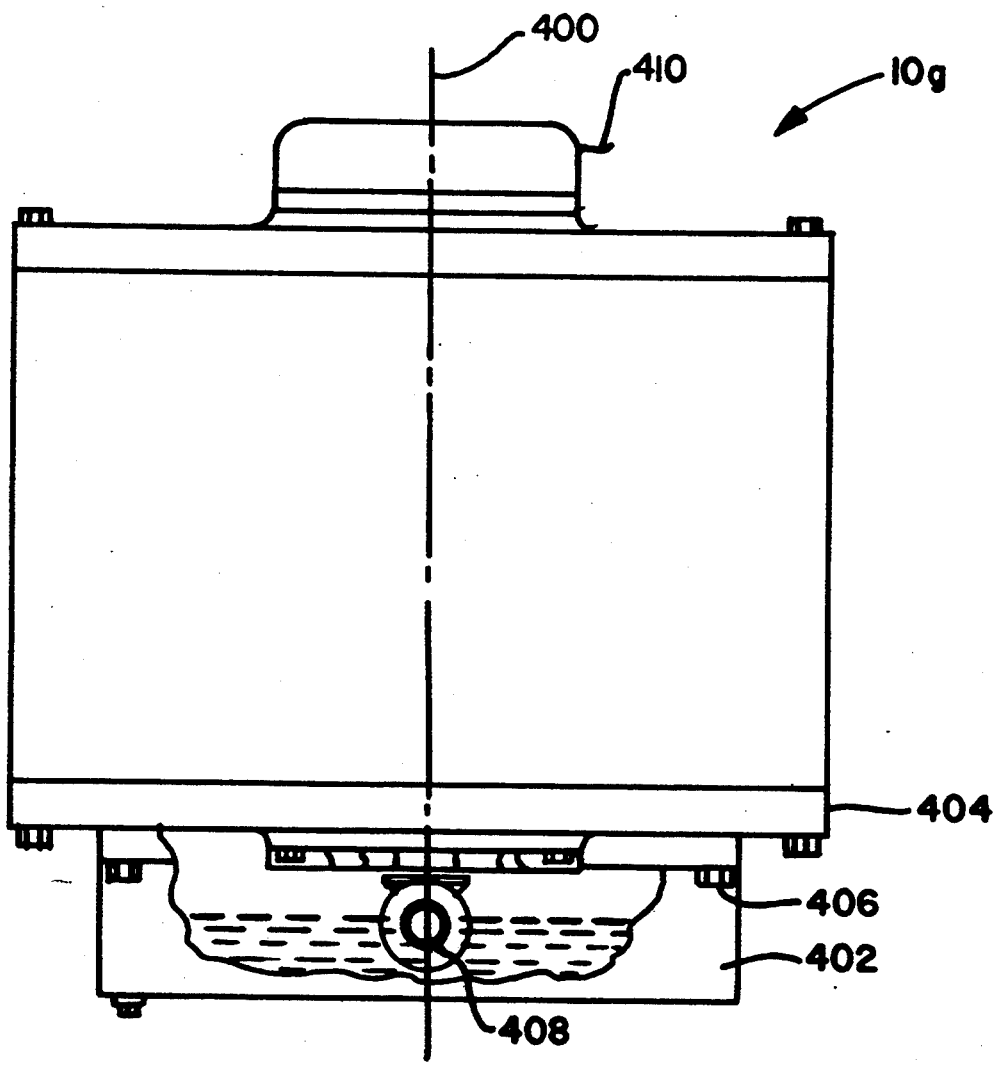
FIG. 21 is a partial elevation view, partially in section, of a seventh embodiment of the oil pan, the output power shaft and the ignition or alternate fuel injection means of an internal combustion engine, constructed in accordance with the present invention.

Continuing with the description of the rotary internal combustion engine, for this purpose reference will be had to FIG. 21 of the drawing wherein the rotary internal combustion engine is denoted generally by the numeral 10g. There is depicted therein a partial elevational view of a seventh embodiment of the rotary internal combustion engine 10g constructed in accordance with the present invention, depicted with rotating axis 400 in a vertical position and with oil pan 402 at the lower part of the engine mounted on the engine's stator 404 by mounting means 406. The power output shaft 408 lies within the oil pan. With oil pan 402 being at the bottom of the engine and distribution means or alternatively fuel supplying distribution means 410 located at the top of the rotary internal combustion engine, the drainage of the anti-friction fluids is simplified by using gravitational forces.

Figure 22:
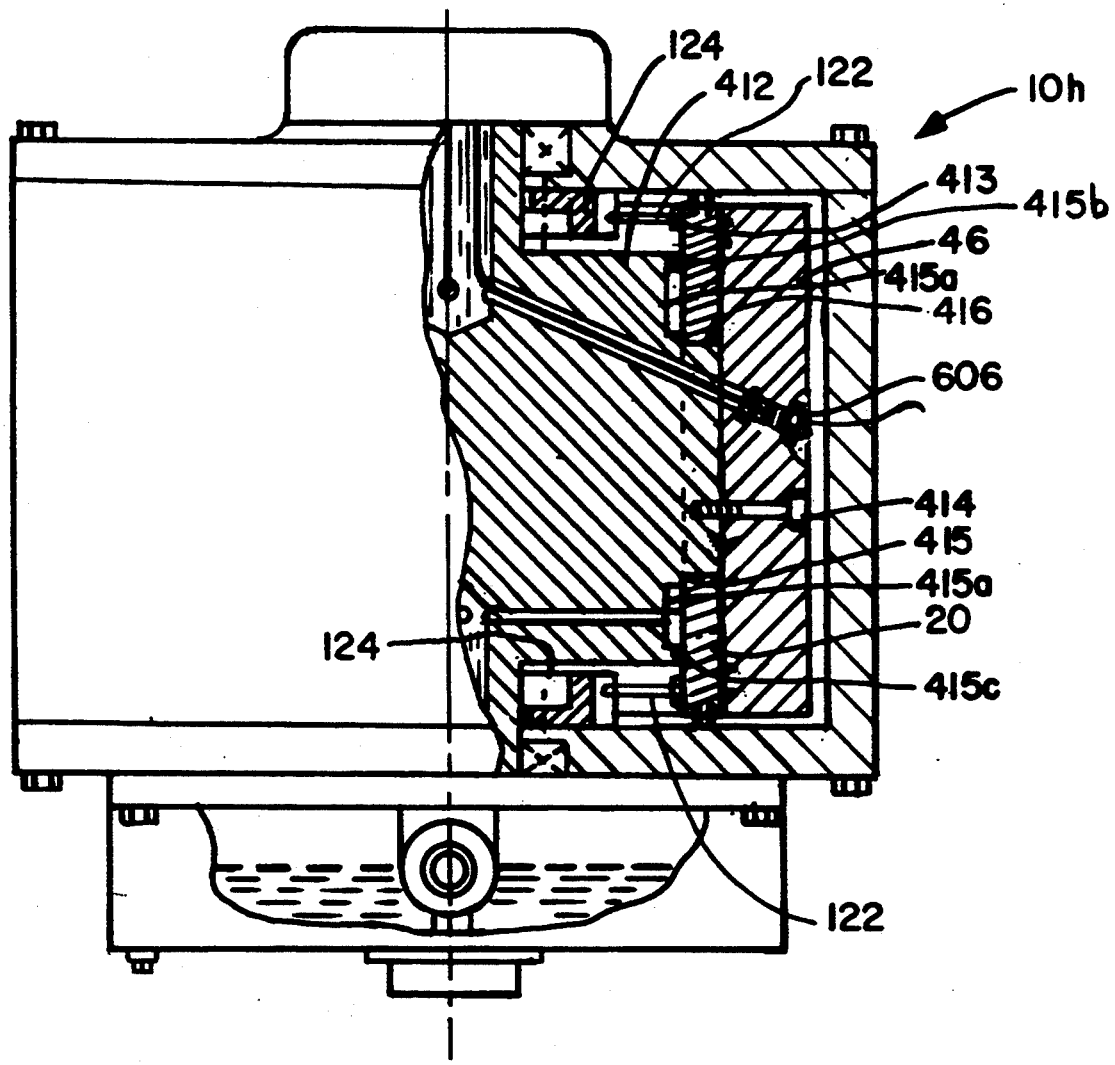
FIG. 22 is a partial elevation view, partially in section, of an eighth embodiment of the rotor, the rotor portion and the piston assisting mechanism of an internal combustion engine, constructed in accordance with the present invention.

Reference will be had now to FIG. 22 of the drawing. There is depicted therein an elevational view partially in section of an eighth embodiment of rotary internal combustion engine 10h of the rotating rotor 412. The rotating assembly comprises the rotor portions 46, the cylindrical segment oscillating piston assembly 20 and the second embodiment of a uni-frame 412, in which the rotating shaft, the rotor frame and the rotor spacer are an integral unit. The portion 416 of uni-frame 412 which rises above the cylindrical surface segment 415 functions as a spacer, thereby providing the necessary space between the cylindrical surface segment 415 of uni-frame 412 and the rotor portion 46 for the oscillating piston assembly 20 to be able to oscillate freely between a first and a second position. A part of each of the cylindrical surface segments 415 of uni-frame 412, denoted by the numeral 415a, is receded for the single purpose of minimizing the friction between the outer cylindrical surface of the oscillating piston 46 and the cylindrical surface 413 of uni-frame 412. Grooves 415b are formed at the extremities of the cylindrical surfaces 415 to accept conventional sealing means 415c.

From FIG. 1 through the FIG. 22 of drawing, it can be seen that the predominant position of the center axis of the oscillating cylindrical segment type piston, relative to the engine's center rotating axis, which are parallel to each other, greatly influences the construction of the oscillating piston and the rotary internal combustion engine as a whole.

Figure 23:
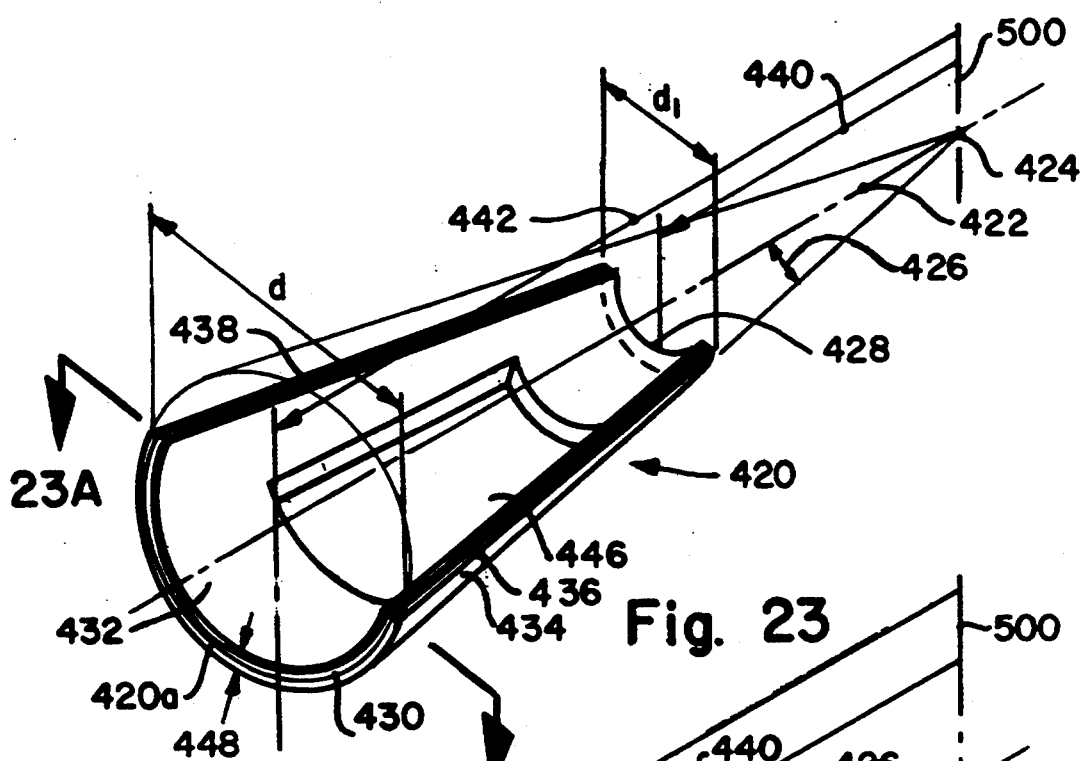
FIG. 23 is an isometric view of a seventh embodiment of the oscillating piston of an internal combustion engine, constructed in accordance with the present invention.
Figure 23A:
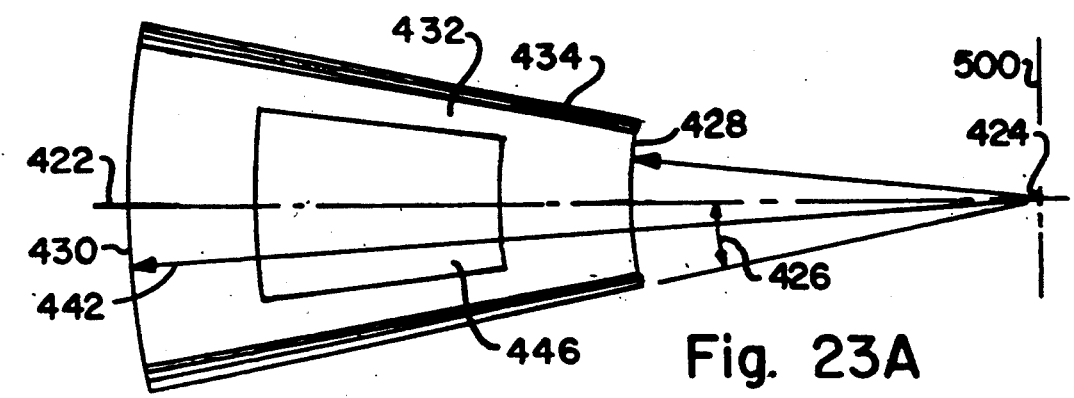
FIG. 23A is a top view of the seventh embodiment of the oscillating piston depicted in FIG. 23, taken substantially along the line 23A—23A in FIG. 23, constructed in accordance with the present invention.
Figure 27:
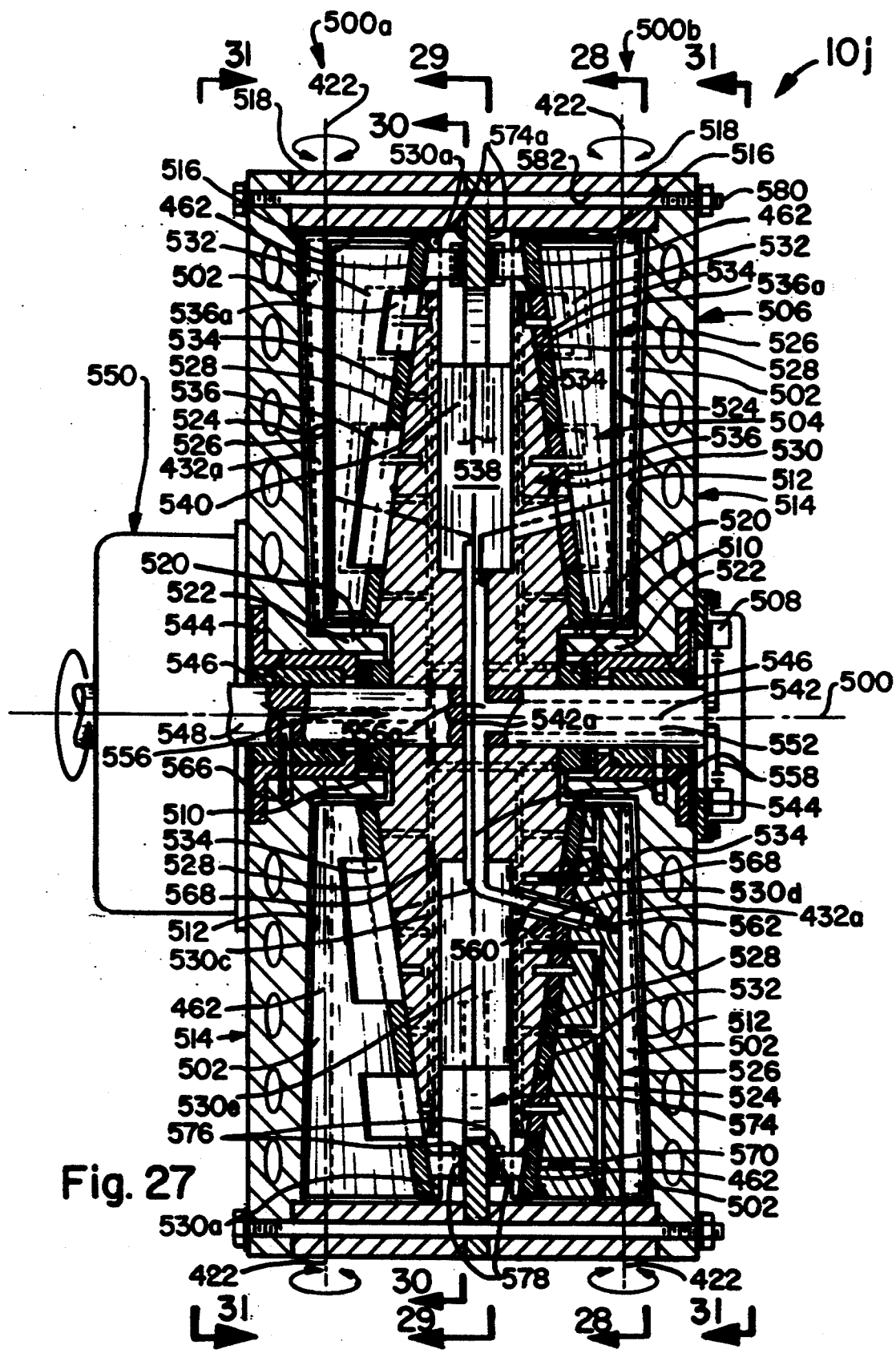
FIG. 27 is a cross-sectional view of a ninth embodiment of two opposite rows of axially located combustion chambers, the rotor assembly, the stator assembly, the piston assisting means assembly, the shaft supporting means and the ignition or alternatively fuel injection means of an internal combustion engine, constructed in accordance with the present invention.
Figure 28:
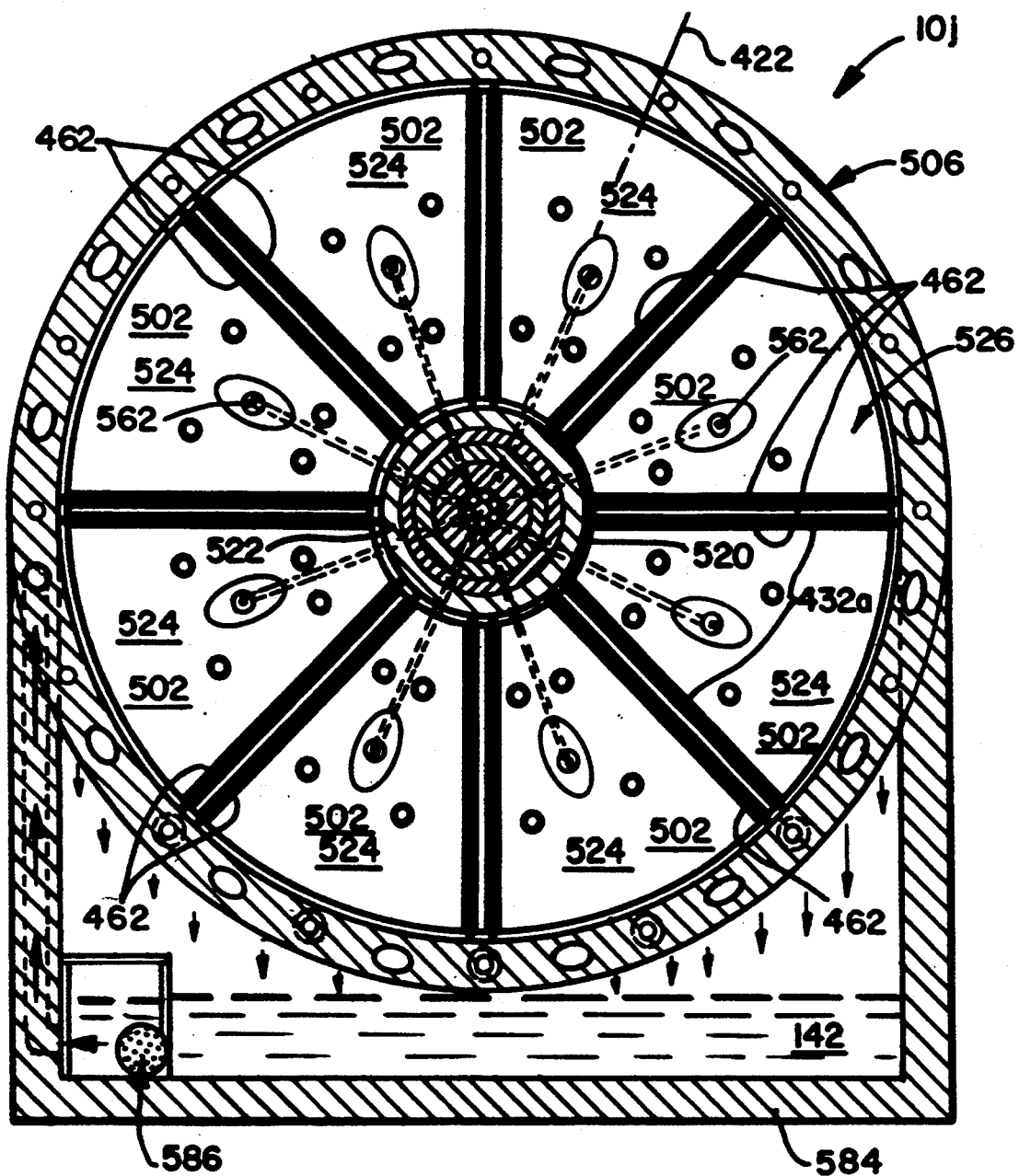
FIG. 28 is a cross-sectional elevation view of the ninth embodiment of the internal combustion engine depicted in FIG. 27, taken substantially along the line 28—28 in FIG. 27, constructed in accordance with the present invention.
Figure 29:
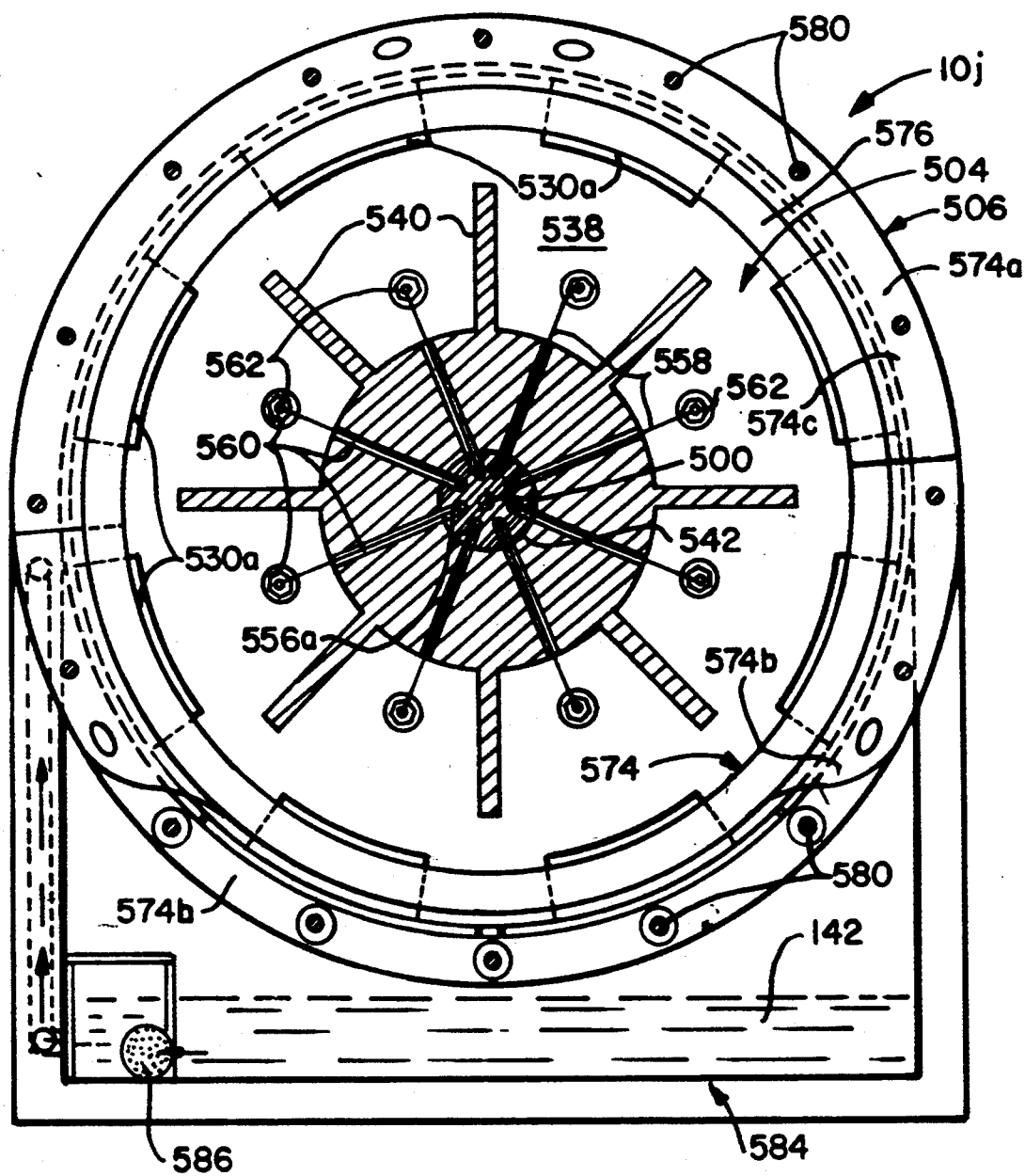
FIG. 29 is a cross-sectional elevation view of the ninth embodiment of the internal combustion engine depicted in FIG. 27, taken substantially along the line 29—29 in FIG. 27, constructed in accordance with the present invention.
Figure 30:
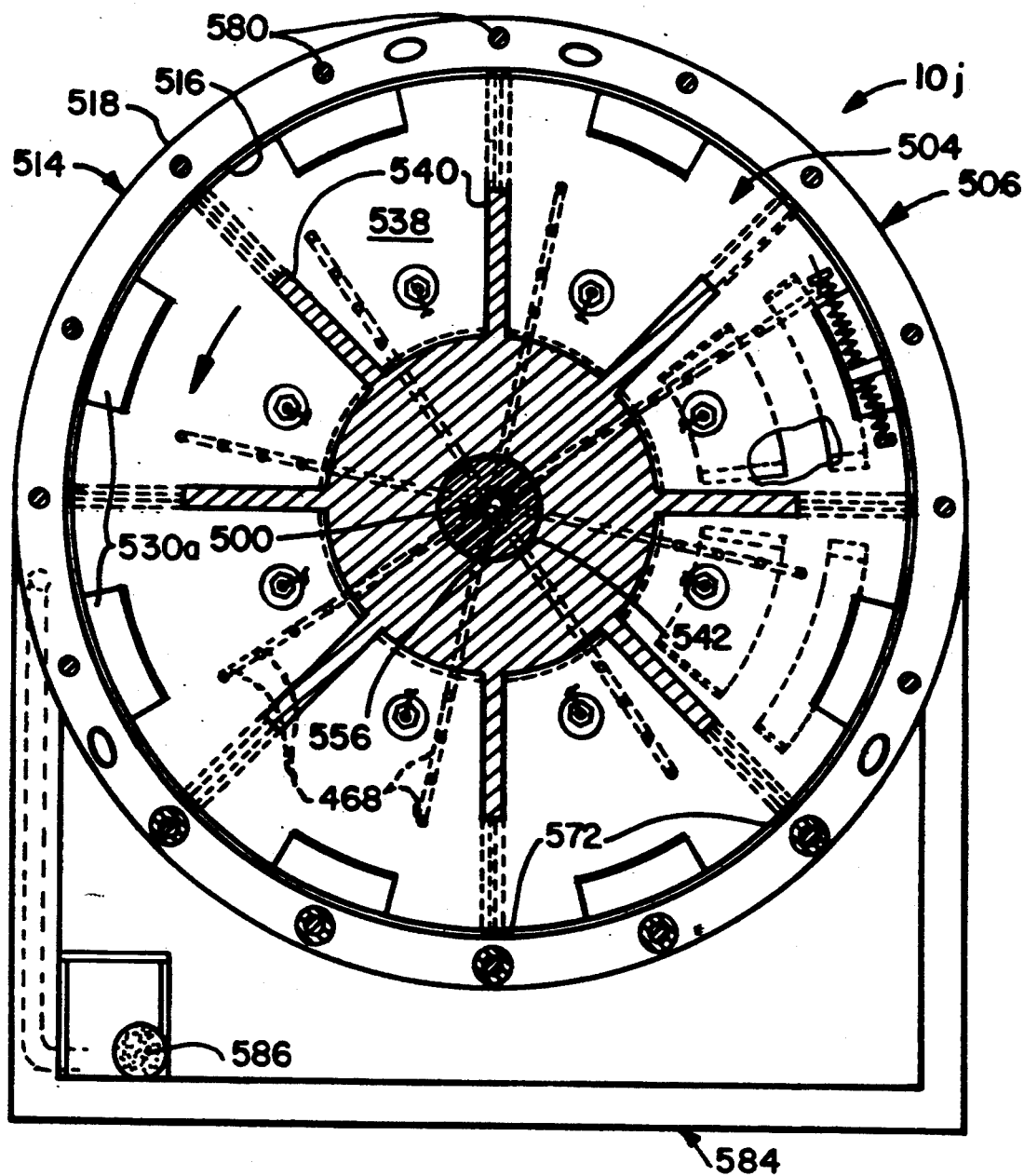
FIG. 30 is a cross-sectional elevation view of the ninth embodiment of the internal combustion engine depicted in FIG. 27, taken substantially along the line 30—30 in FIG. 27, constructed in accordance with the present invention.
Figure 30:
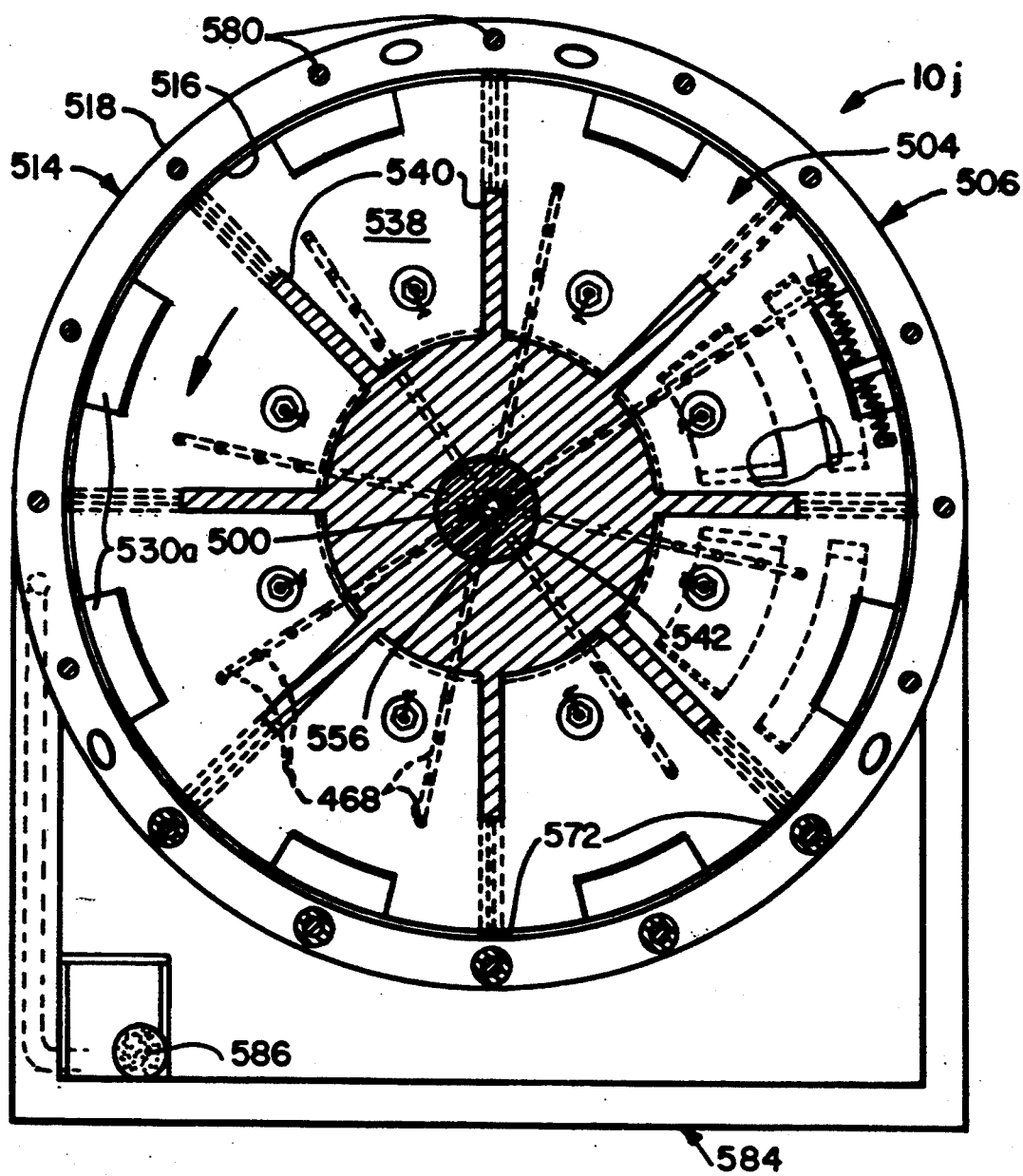

Continuing with the description of the rotary internal combustion engine reference for this purpose will be had to FIGS. 23 and 23A of the drawing. FIG. 23 is an isometric view of a seventh embodiment of the oscillating piston denoted with the general numeral 420. FIG. 23A is a top view taken along line 23A—23A in FIG. 23. Oscillating piston 420 is a conical segment which is mounted with its center axis 422 perpendicular to the engine's center axis and with focal point 424 being on the center of the rotating rotor, which is the center of the rotary internal combustion engine, in a way typical of the one shown in FIG. 27 of the drawing. The conical segment type oscillating piston 420 which is formed with a focal point 424 at an angle 426 is defined between a small curved end 428, a large curved end 430, an inner conical smooth surface 432, an outer conical smooth surface 434 and the flat horizontal surfaces 436, 438 which are preferably located 180 degrees apart from each other. The small end surface 428 of the conical segment 420 is shaped or curved with a radius 440 and its center is at the focal point of the cone 424. The large end 430 of the conical type segment oscillating piston 420 is shaped or curved with a radius 442 and its center is at the focal point of the cone 424. An opening 446, preferably located at the center of the conical smooth surface segment 432, extends through the entire thickness 448 of the piston into the outer conical smooth surface 434 which is constructed in a similar way as the opening 48k of the oscillating piston 48 shown in FIGS. 4, 4A and 4B of the drawing. The end surfaces 428, 430 and the flat horizontal surfaces 436, 438 of the oscillating piston 420 are provided with grooves 420a for sealing means (not shown).

Figure 24:
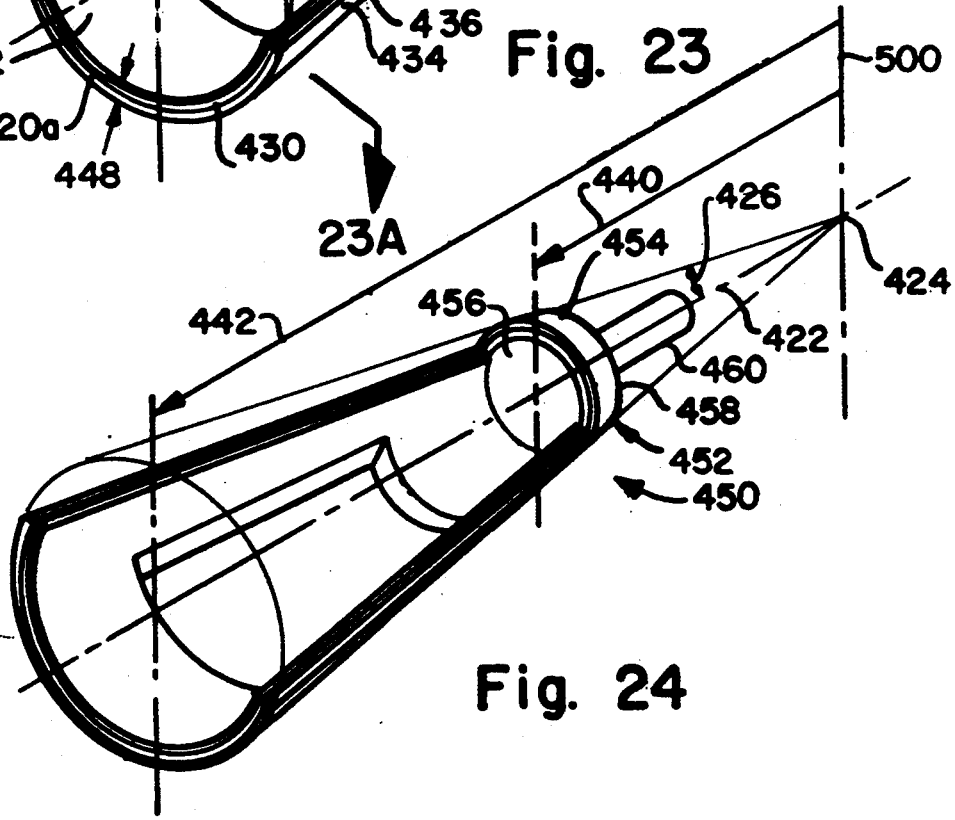
FIG. 24 is an isometric view of an eighth fourth embodiment of the oscillating piston of an internal combustion engine, constructed in accordance with the present invention.

Reference will be had now to FIG. 24 of the drawing. FIG. 24 is an isometric view of the eighth embodiment of the oscillating piston denoted by the general numeral 450. Oscillating piston 450 is a conical type segment constructed in accordance with the present invention in a manner similar to the construction of oscillating piston 520 shown in FIG. 23 of the drawing, except that the small end 452 is covered with the part 454. Part 454 of the oscillating piston 450 is integral to the piston, has an inner curved or cylindrical surface 456 formed with a radius 440 and with its center at the focal point of the cone 424, and has an outer flat surface 458 on which is fixedly attached the shaft 460 which is used as a piston oscillating assisting means.

Figure 25:
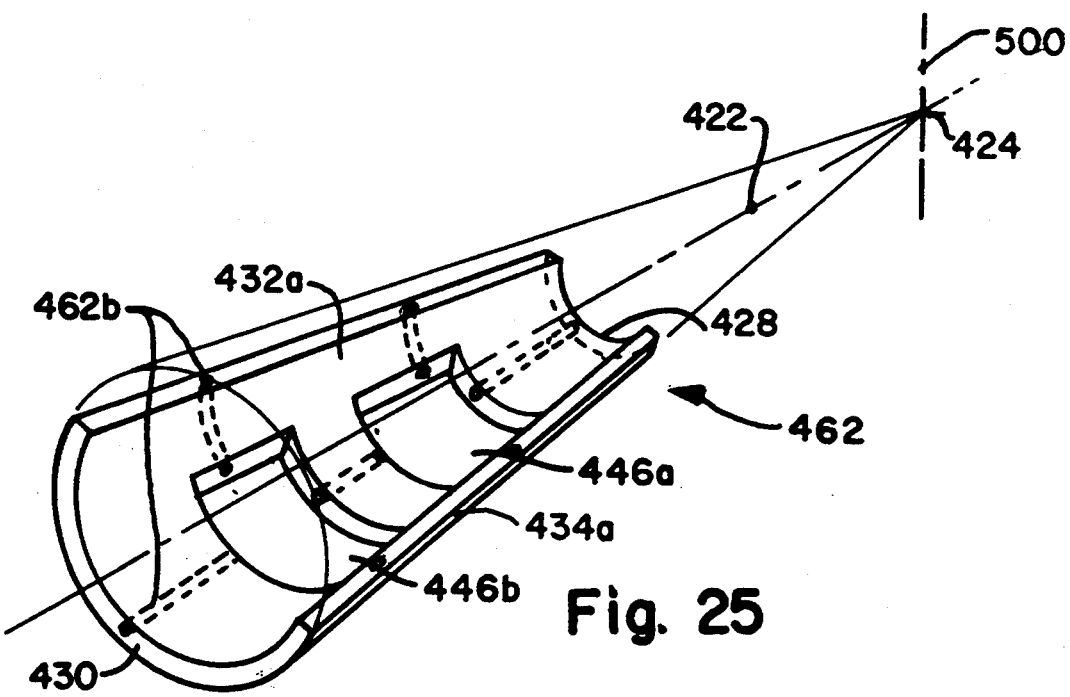
FIG. 25 is an isometric view of a ninth embodiment of the oscillating piston of an internal combustion engine, constructed in accordance with the present invention.

Continuing with the description of the rotary internal combustion engine, for this purpose reference will be had to FIG. 25 of the drawing. FIG. 25 is an isometric view of a ninth embodiment of the oscillating piston denoted with the numeral 462. Oscillating piston 462 is a conical type segment constructed in accordance with the present invention. Generally, the oscillating piston 462 is constructed in a manner similar to the oscillating piston 420 shown in FIGS. 23 and 23A of the drawing, with the exception that it is provided with two openings 446a and 446b.

Figure 26:
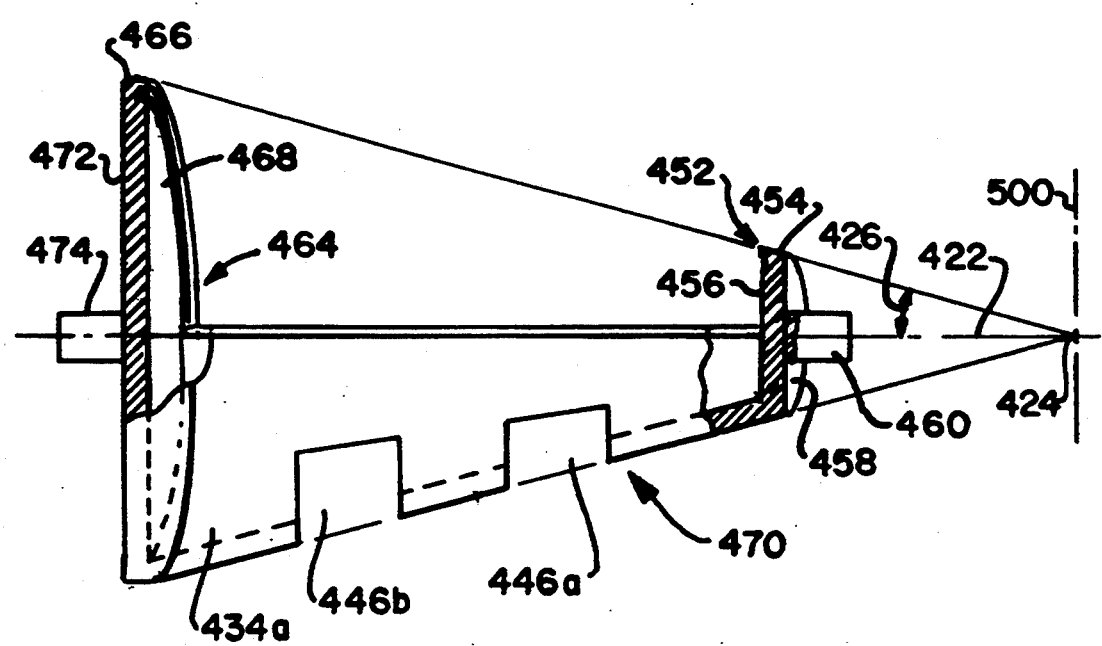
FIG. 26 is a side elevation view partially in section of a tenth embodiment of the oscillating piston of an internal combustion engine, constructed in accordance with the present invention.

Reference now will be had to FIG. 26 of the drawing. FIG. 26 is an elevational view partially in section of a tenth embodiment of the oscillating piston denoted by the reference numeral 470, constructed in accordance with the present invention. Oscillating piston 470 is a conical type segment which has both of its ends covered. The small end 452 of oscillating piston 470 is constructed in a manner similar to the end 464 shown in FIG. 24 of the drawing. The large end 474 of the oscillating piston 470 is covered with the part 466 that has an inner cylindrical surface 468 and an outer flat surface 472. The inner cylindrical surface 468 of part 466 is formed with a radius 442 which has its center at the focal point of the cone 424. On the outer flat surface 472 of part 466 is fixedly mounted the shaft 474 which has as its center the center axis of the cone 422, and is used to attach means which assist the oscillating piston 470 to oscillate between a first position and a second position.

Continuing with the description of the rotary internal combustion, for this purpose reference will be had to FIGS. 27, 28, 29, 30 and 31 of the drawing. There is depicted therein a ninth embodiment of the rotary interal combustion engine denoted by the general numeral 10j. This embodiment of the engine employs the conical shape segment oscillating pistons 466 shown in FIG. 25 with the oscillating axis 422 being perpendicular to the engine's rotating axis 500, and is constructed in accordance with the present invention. The rotary internal combustion engine 10j includes a plurality of variable compression ratio rotating combustion chambers 502, a multi-piston movable assembly 504, a multi-sector stationary assembly 506 with means 508 for effecting ignition or alternatively means for injecting fuel into the combustion chambers 502. The combustion chambers 502 are formed by the multi-sector stationary assembly 506 and multi-piston movable assembly 504. More specifically, the rotary internal combustion engine 10j, comprises two adjacent rows 500a and 500b of combustion chambers 502, located axially about the engine's center axis 500, and with the combustion chambers 502 being located peripherally about the engine's center axis 500. The combustion chambers 502 of rows 500a and 500b are preferably equal in number, and with each combustion chamber 502 of row 500a being located adjacent to the combustion chambers 502 of row 500b, for the purpose of offsetting the axial thrust forces generated from the combustible gases. Each of the rotating combustion chambers 502 is confined between the inner contoured peripheral surface 512 of the stator's side cylindrical member 514, the inner cylindrical surface 516 of the stator's outer peripheral cylindrical member 518, the outer cylindrical surface 520 of the stator's hub 522 which is part of the stator member 514, the outer flat surface 524 of rotor portion 526 shown in FIG. 34 of the drawing and portions of the inner cylindrical surface 432a of the conical oscillating pistons 462 shown in FIG. 25 which extends above the flat surface 524 of the rotary portion 526. Each of the oscillating pistons 462 is mounted movably in a space 534 provided by spacers 536 and 536a between the conical surface 528 of the rotating rotor frame 530 and the conical surface 532 of rotor portion 526 in such a way as to be able to move between a first position and a second position. The rotating rotor frame 530 which is partially divided by a peripheral space 538 and reinforced with members 540 is mounted with conventional means for mounting (not shown) on the engine's power output shaft 542. The power output shaft 542 in turn is supported for rotation on bearing assemblies 544 which are hosted in openings 546 of the stator's side members 514. The end 548 of the power output shaft 542 is connected to the power transmission unit 550 which effectively utilizes the rotating motion or power output of the rotary internal combustion engine 10*j*. Rotating motion is imparted to the movable assembly 504 by virtue of the forces generated during combustion in the combustion chambers 502 by the combustible gases acting upon the oscillating pistons 462 which project outwardly above the rotor of the movable assembly 504 in the area between the stationary assembly 506 and the movable assembly 504, when the combustion chambers are in the expansion stage. The rotating motion of the movable assembly 504 is transferred via the engine's rotatable shaft 542 to the power transmission unit 550 which is connected to the shaft's end 548. The other end 552 of rotor shaft 542 is connected to ignition means or alternatively injected fuel means 508. Rotating shaft 542 is a partial hollow member divided into two openings 556 and 556*a* by shaft portion 542*a*. Ignition wires or alternatively fuel lines 558 connected to the ignitors or alternatively fuel injection means 562 pass through the openings 560 of rotor frame 530 and opening 556 of rotor shaft 542 to connect with the distribution center 508. The second opening 556*a* of the shaft 542 is connected to the opening 566 of the stator member 514 and is used to transfer anti-friction fluid means 142 to the opening 568 of the rotating rotor 530 and through connected opening 570 of the rotating portion 526 effectively lubricates the conical segment oscillating pistons 462. The anti-friction fluid means 142 is provided to oscillating pistons 462, further advancing through the openings 462*b* (not shown) of the piston 462 into the space, between the movable assembly 504 and the stationary assembly 506, and with the assistance of the piston rings 572 is applied evenly on the inner smooth contoured peripheral surfaces 512 of stator member 514, on the inner cylindrical surfaces 516 of peripheral members 518, and on the outer cylindrical surfaces 520 of stators hub 522. Continuing with the description of the embodiment 10*j* of the rotary internal combustion engine constructed in accordance with the present invention, between the cylindrical member 518 and the stator assembly 506 there is a cylindrical member 574 divided into two segments 574*b* and 574*c* for installation purposes. On both sides 574*a* of member 574 are fixedly mounted cam type means 576 which are utilized by the piston assistance means 578 that are mounted on oscillating pistons 462 and project through the openings 530*a* of rotor 530 in order to assist the oscillating pistons 462 in their oscillating movement, between a first position and a second position. The stator assembly 506 is held together by means for mounting such as bolts 580 which pass through openings 582 of cylindrical members 514, 518 and 574. In the lower part 584 of the rotary internal combustion engine 10*j*, which is used to store the continuous recirculating anti-friction fluid means 142, there is a conventional type fluid pump 586. Stored anti-friction fluid 142, which is pumped by the fluid pump 586 through the opening 566 of the stator's member 514, is distributed throughout the inner part of the rotary internal combustion engine 10*j*, to lubricate all friction affected parts, and thereafter drains back for storage in the lower part 584 of the engine 10*j* through thickness reduction member 574*b* provided in the lower part of the cylindrical member 574. The rotor frame 530 may consist of two sections 530*c* and 530*d* divided along line 530*e* and fixedly restrained by means for fastening (not shown) without departing from the essence of the invention.

Figure 31:
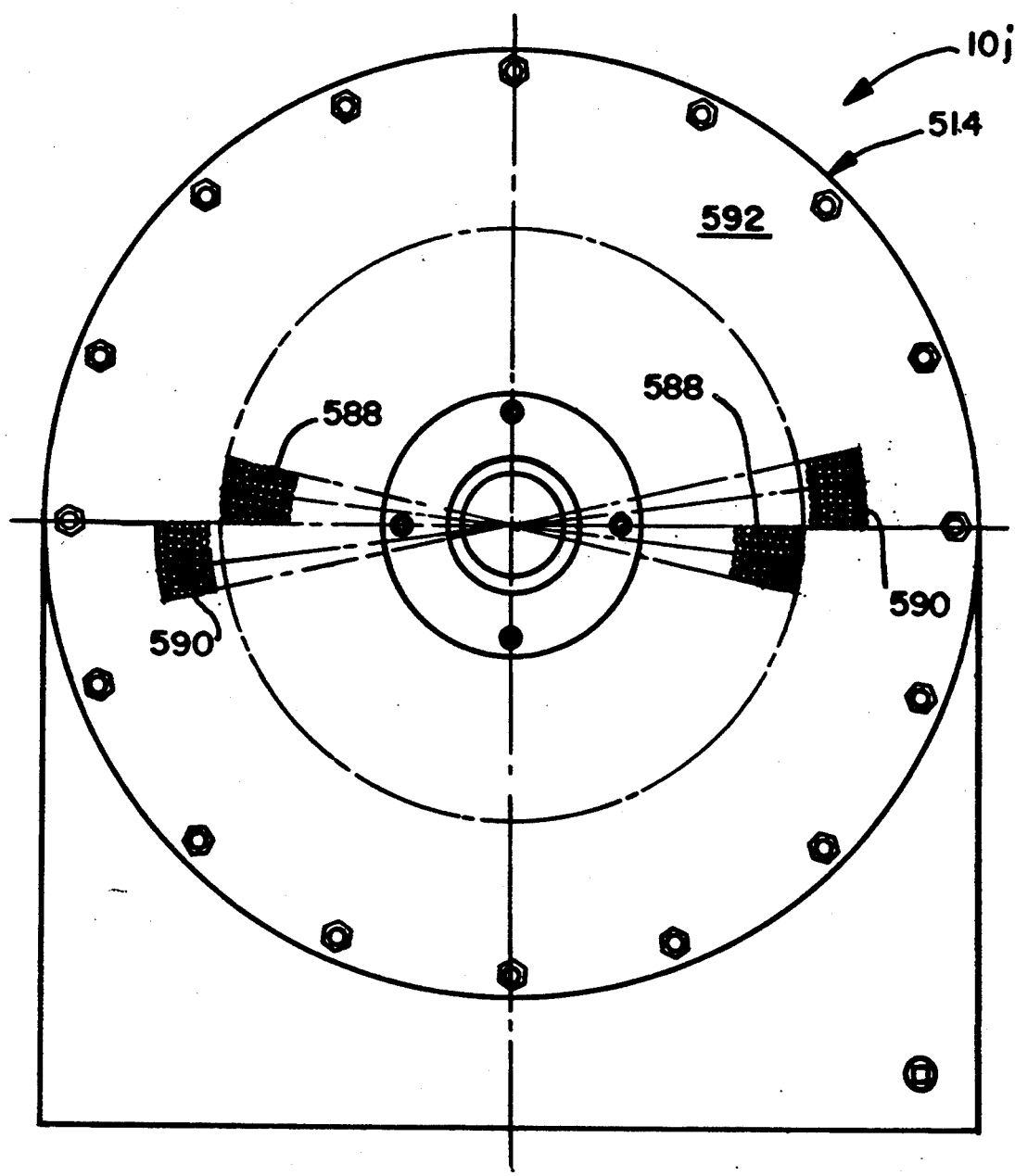
FIG. 31 is an outer elevation view of the ninth embodiment of the internal combustion engine, depicted in FIG. 27, taken substantially along the line 31—31 in FIG. 27, constructed in accordance with the present invention.

Continuing with the description of the rotary internal combustion engine 10*j*, reference is made to FIG. 31 of the drawing. To this end the stator's cylindrical member 514 is provided with gas intake perforations 588 and gas exhaust perforations 590 which extend from the external surfaces 592 through to the internal contoured surfaces 512, with inlet and outlet gas throttles (not shown), similar to the ones used in FIG. 1 and shown in FIGS. 7 and 8 of the drawing.

Figure 32:
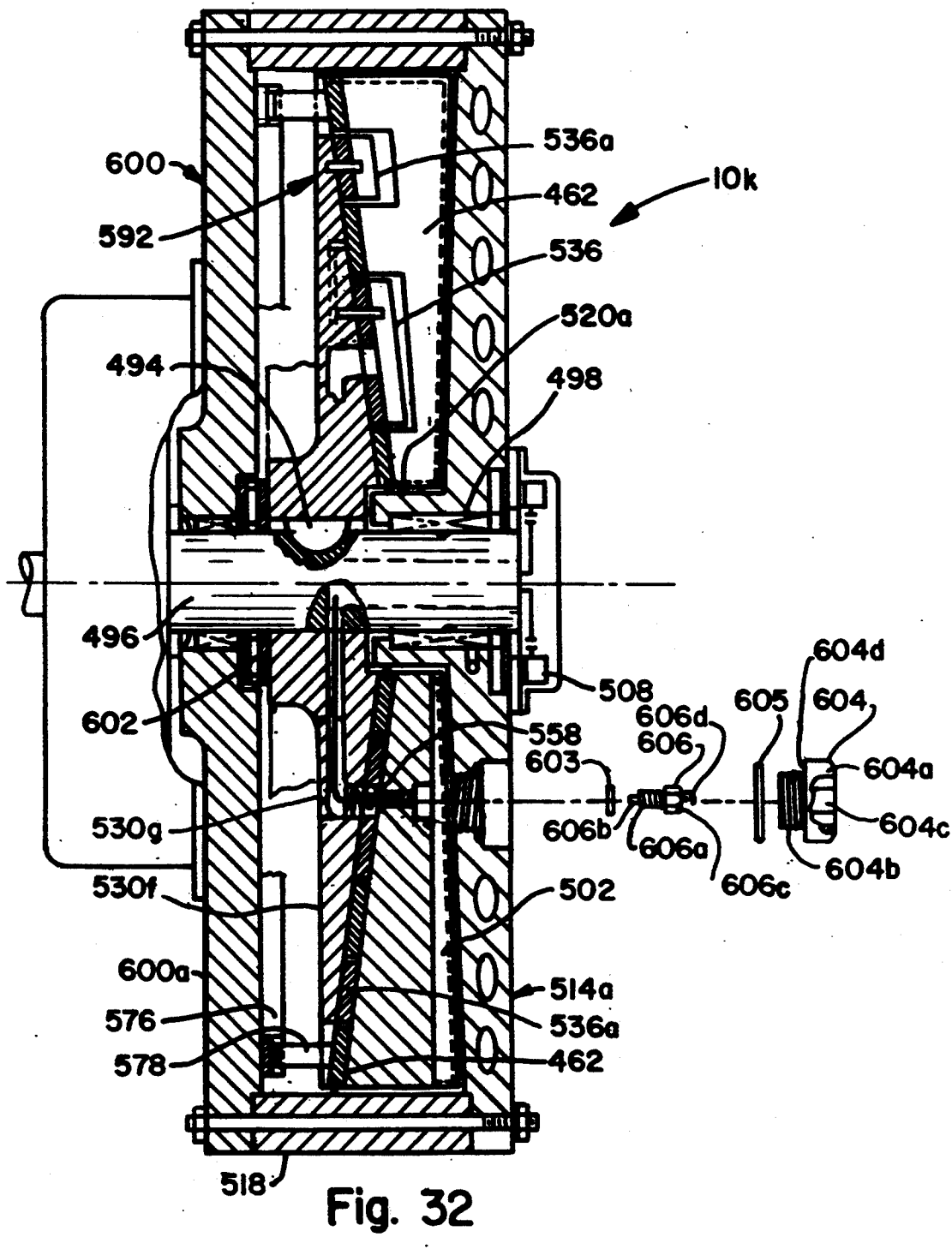
FIG. 32 is a cross-sectional view of a tenth embodiment of a single row of axially located combustion chambers, the rotor assembly, the stator assembly and the piston assist mechanism of an internal combustion engine, constructed in accordance with the present invention.

Continuing with the description of the rotary internal combustion engine, reference for this purpose will be had to FIGS. 32 of the drawing. There is depicted therein a tenth embodiment of the rotary internal combustion engine denoted with the general numeral 10*k*, constructed in accordance with the present invention. Rotary internal combustion engine 10*k* comprises a single row with peripherally located conical segment type pistons 462 constructed in a similar manner to the rotary internal combustion engine 10*j* shown in FIG. 27 of the drawing. Pistons 462 are mounted movably on the rotating rotor 592 which in turn is mounted by mounting means 594 on rotor shaft 496. The rotating shaft 496 is supported for rotation in bearing means 498 located in the stator assembly 600. Thrust bearing means 602 located on shaft 496, on the opposite sides of the combustion chamber 502, and between the rotor assembly 492 and stator assembly 600, are positioned to absorb the thrust forces generated during combustion. A portion of threaded plug 604 of the stationary assembly 600, preferably in the area of the inlet perforation portion, is removable for the purpose of accessing the ignition or alternatively fuel injection means 606. The ignition or alternatively fuel injection means 606 is made with its threaded part 606*a* opposite to the electric discharge contacts 606*d* in such a way as to be able to be removed and installed by using the hexagonal part 606*c* from the combustion chamber side of the rotary internal combustion engine. Contact is made to the electric current line or alternatively fuel supply line 558 through the end 606*b* of the ignition or alternatively fuel injection means 606.

Figure 33:
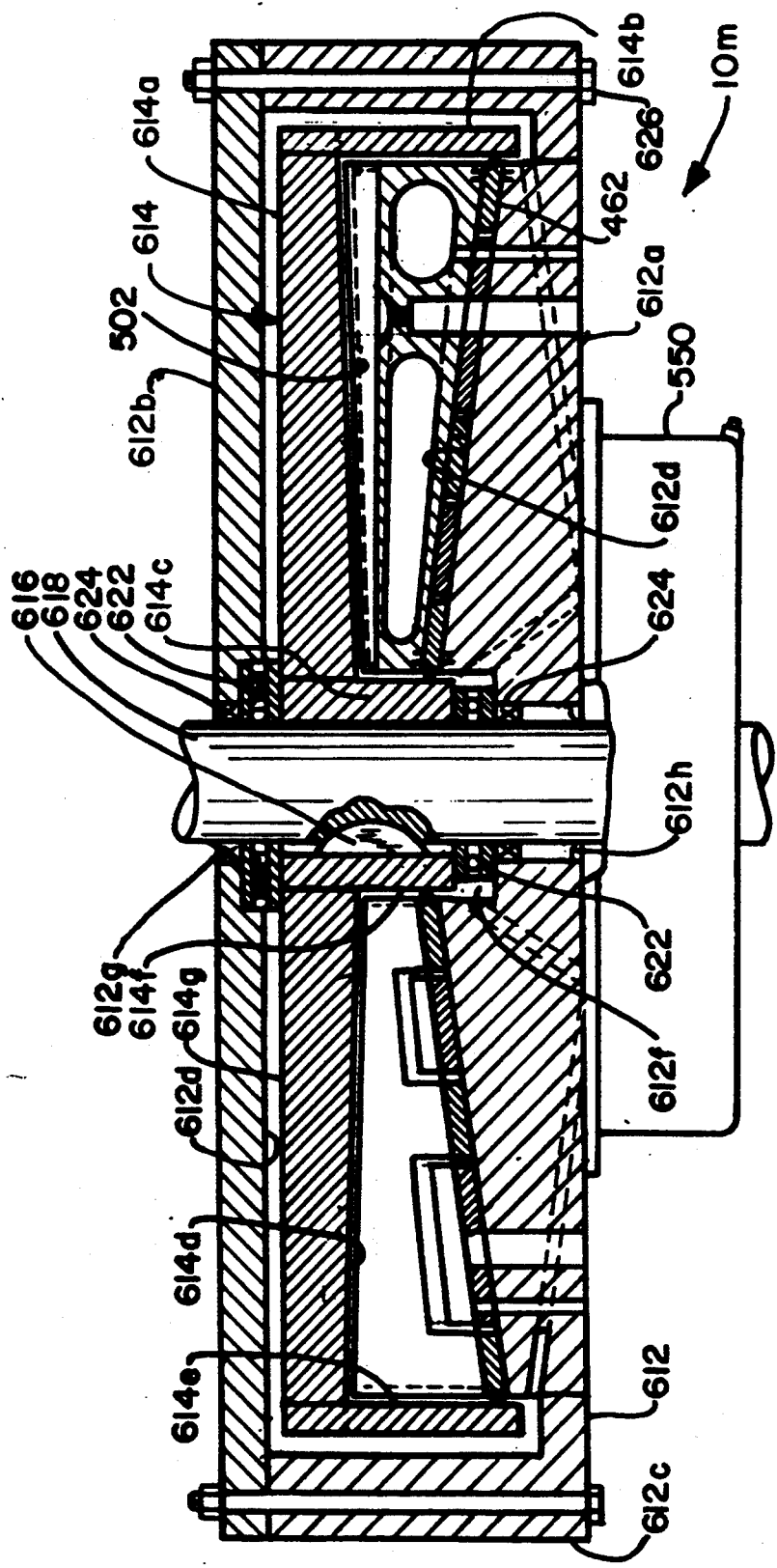
FIG. 33 is a cross-sectional view of an eleventh embodiment of a single row of axially located combustion chambers, the rotor assembly and the stator assembly of an internal combustion engine, constructed in accordance with the present invention.

Continuing the description of the rotary internal combustion engine, for this purpose reference will be had to FIG. 33 of the drawing. FIG. 33 is an eleventh embodiment of the rotary internal combustion engine denoted by the general numeral 10*m*, constructed in accordance with the present invention. Rotary internal combustion engine 10*m* is of a type wherein the conical segment oscillating pistons 462 are mounted on the stator assembly 612. The combustion chambers 502 are formed between the inner flat surface 524 of rotor member 526 shown in FIG. 34 of the drawing, the inner contoured surface 614*d* of rotor member 614*a*, the inner cylindrical surface 614*e* of cylindrical member 614*b* and the outer cylindrical surface 614*f* of rotor member 614*c*. The rotating rotor 614 which is comprised of the rotor members 614*a*, 614*b* and 614*c* mounted fixedly by conventional mounting means 616 on rotor shaft 618 can be also one unit without departing from the essence of the invention. The stator assembly 612 is comprised of a cylindrical member 612a that has the inner cylindrical surfaces 612d on which are mounted the oscillating pistons 562, the peripheral cylindrical member 612c and the cylindrical member 612b. The stator's members 612a and 612b can be constructed as one unit without departing from the essence of the invention. Thrust bearings 620, which are mounted between the inner side 612d of stator member 612b and the outer side 614g of rotor member 614a and in the cylindrical opening 612, are used to absorb the thrust forces generated during combustion. A second set of bearing means 624 which are used to support for rotation the rotor shaft 620 are mounted in openings 612g and 612h of the stator members 612a and 612b. The stator assembly 612 is restrained fixedly together with mounting means 626.

The description of the fourth embodiment of the rotor portion 526 will now be completed. For this purpose reference will be had to FIG. 34 and FIG. 34A of the drawing. Rotor portion 526 is a conical segment that is comprised of a flat surface 524 provided with openings for mounting means and an opening to accept ignition or alternatively fuel means, an outer conical surface 532 formed with an angle 426 and its focal point 424 provided with grooves 532g for conventional sealing means, an inner cylindrical surface 524c formed with a radius 526r and its center at the focal point of the cone 424. An outer cylindrical surface 524a is formed with a radius 526R and with its center at the focal point of the cone 424 and the side ends 524b where the conical surface 532 and flat surface intersect.

Figure 34:
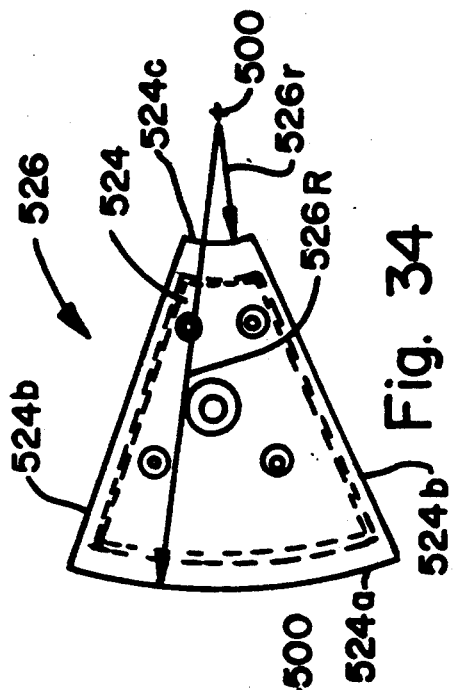
FIG. 34 is a top view of the fourth embodiment of the rotor portion of an internal combustion engine, constructed in accordance with the present invention.
Figure 34A:
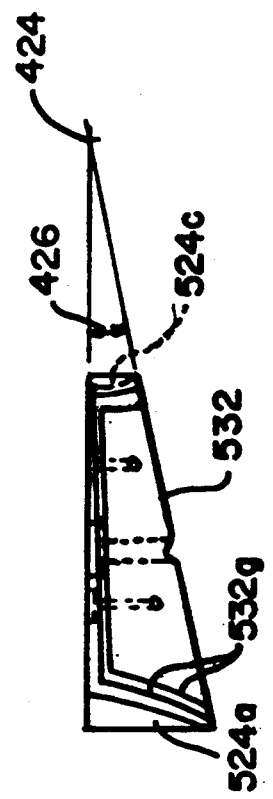
FIG. 34A is an elevational view of the fourth embodiment of the rotor portion of the internal combustion engine, constructed in accordance with the present invention.
Figure 35:
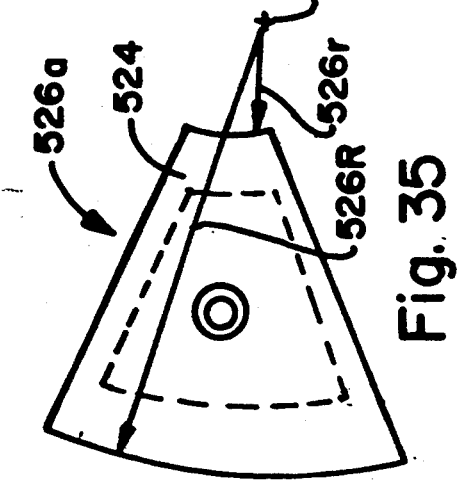
FIG. 35 is top view of the fifth embodiment of the rotor portion of an internal combustion engine, constructed in accordance with the present invention.
Figure 35A:
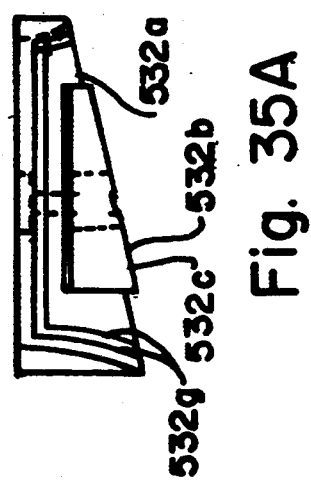
FIG. 35A is an elevational view of the fifth embodiment of the rotor portion of the internal combustion engine, constructed in accordance with the present invention.

Continuing with a description now of the FIG. 35 and the FIG. 35a of the drawing, there is depicted therein the fifth embodiment of the rotor portion 526a constructed in a similar manner as the rotor portion 526 shown in FIG. 34 of the drawing and in accordance with the present invention, except that a part of the conical surface 532a of rotor portion 526a is covered with an extented conical segment 532b that serves as a conventional rotor spacer.

Figure 36:
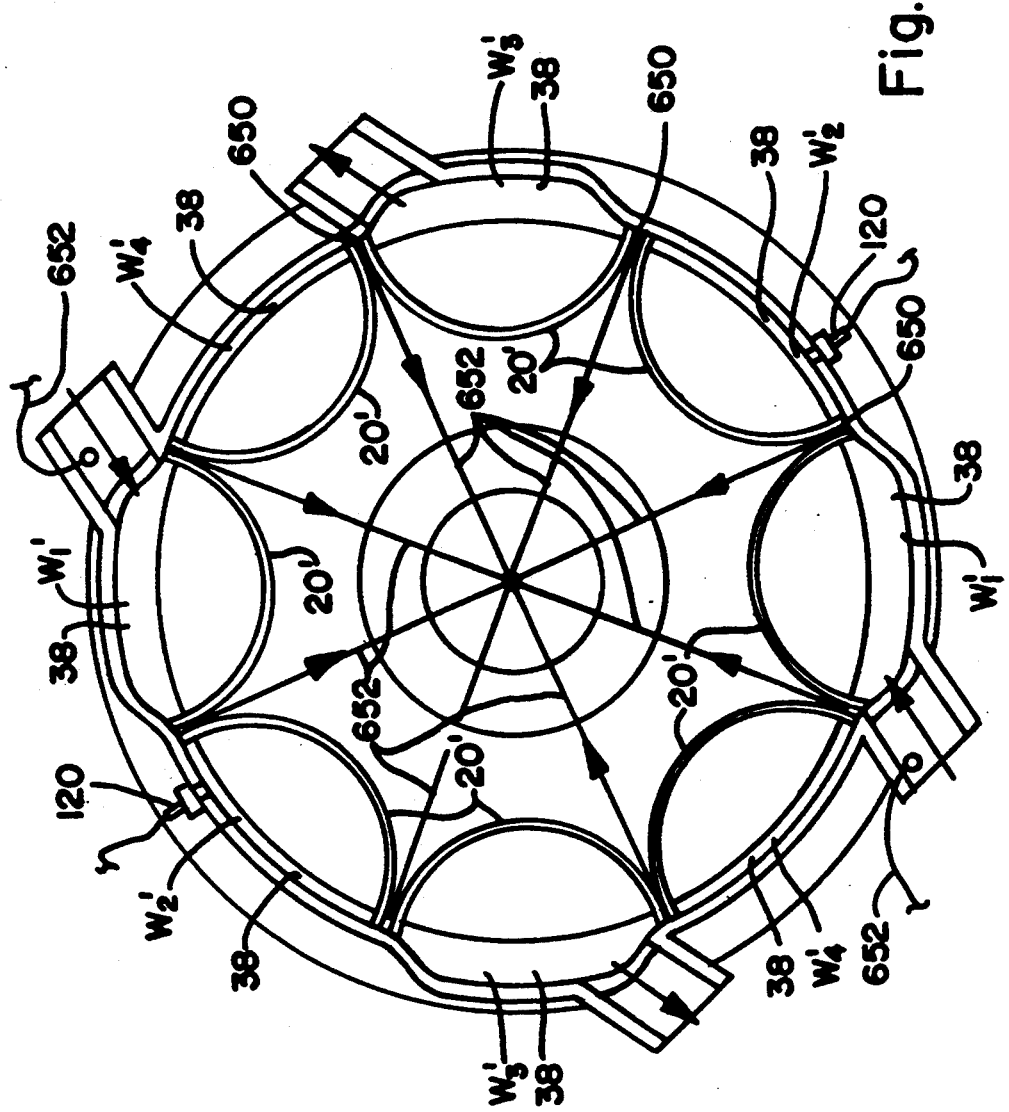
FIG. 36 is a schematic view of the venting openings located between the oscillating pistons of an internal combustion engine, constructed in accordance with the present invention.

Turning now to FIG. 36 which is the last figure of the drawing, there is depicted therein a schematic representation of venting openings 650 located in between oscillating piston assemblies of the rotary internal combustion engine, constructed in accordance with the present invention. Venting openings 650 are connected through tunnels 652 to the engine's inlet manifold.

While several embodiments of my invention have been shown, it will be appreciated that still other modifications thereof, some of which have been alluded to hereinabove, may still be readily made thereto by those skilled in the art. I, therefore, intend by the appended claims to cover the modifications which fall within the true spirit and scope of my invention.

What is claimed is:

1. In a rotary internal combustion engine having rotor means mounted for rotation on a rotor axis means supported with anti-friction means in a stator means, combustion chamber means formed between the rotor means and the stator means, piston assisting means, intake fluid flow control means, exhaust fluid flow control means, ignition means located in the combustion chamber means, oscillating piston means mounted for oscillation on the rotor means so as to project above the rotor means in the area of the combustion chamber means and supported for movement therewithin in response to the forces generated by the gases created when combustion takes place in the combustion chamber means acting thereon and operative as a consequence of the movement thereof to impart circular movement of the rotor means and to in turn transfer this movement to the rotor axis means, the improvement of a rotary internal combustion engine having oscillating piston means used for converting forces generated by the combustion gases in the combustion chamber means to continuous circular motion, said rotary internal combustion engine including:

a. a rotor rotatably mounted for rotation on a rotor shaft comprising:

i. a partially hollow rotatable rotor shaft having mounting means supported for rotation on both ends thereof in anti-friction bearing means, said anti-friction bearing means being supported in openings provided in side member means of the stator means, said rotor shaft including a rotor shaft portion having two axial openings, a first end of said rotor shaft having a radially located opening connected through an axial opening to an opening in the rotor means for distribution of anti-friction fluid, said first end of said rotor shaft further including means for mounting a flywheel to said first end of said rotor shall a second end of said rotor shaft having an axially located opening connected to a plurality of radially located openings extending therethrough for purposes of routing the ignition means therethrough, and means for mounting ignition distribution means to said second end of said rotor shaft;

ii. a rotor frame rotatably defining a rotor axis with a center opening provided with means to accept said mounting means, said mounting means being operable to mount fixedly said rotor shaft therein, said rotor frame including two flat end surfaces extending parallel to each other and being equally disposed about the center opening of said rotor axis, said rotor frame further including an outer surface having a plurality of cylindrical surface rotor frame portions formed with a radius having the center thereof at the rotor axis, said plurality of rotor frame portions being connected to an equal number of inverted smooth cylindrical surface portions each provided with grooves operable for receiving sealing means therewithin and with openings operable for receiving fastening means therein and with openings for purposes of routing the ignition means therethrough to the center opening of said rotor frame to connect with the radially located openings of said second end of said rotor shaft and with openings for receiving said anti-friction bearing means therein leading to the center opening of said rotor frame so as to therein connect with the radially located opening of said first end of said rotor shaft, said rotor frame also having cooperatively associated therewith the piston assisting means, said inverted smooth cylindrical surface portions being slidably mounted for oscillating movement between a first position and a second position, the oscillating piston means being retained in a space provided therein by means of cylindrical portion spacer means positioned between said inverted cylindrical surface portions of said rotor frame and said inner cylindrical surface rotor frame portions;

iii. a plurality of cylindrical segment spacer means, each having a thickness greater than that of the oscillating piston means, said plurality of cylindrical segment spacer means being confined between an inner cylindrical surface spacer portion formed with a radius equal to that of said inner cylindrical surface frame portions, said plurality of cylindrical segment spacer means including an outer smooth cylindrical surface portion formed with a radius equal to that of each of said inverted smooth cylindrical surface portions of said rotor frame, each of said plurality of spacer means having a peripheral width smaller than that of the peripheral width of a main opening located in the oscillating piston means and having an axial length smaller than that of the axial length of the main opening located in the oscillating piston means, said plurality of cylindrical segment spacer means also including opening means formed therethrough for receiving the ignition means therein and openings for receiving the anti-friction means therein and openings for passing fastening means therethrough and openings for receiving the piston assisting means;

iv. a plurality of rotor portion means each having two ends and an inner smooth cylindrical surface having grooves formed therein for receiving sealing means, each said inner smooth cylindrical surface of said plurality of rotor portion means being formed with a radius equal to that of said inner cylindrical surface portion of said spacer means, each of said plurality of rotor portion means including an outer smooth cylindrical surface portion formed with a radius equal to that of said cylindrical surface rotor frame portion, said plurality of rotor portion means also including opening means for receiving fastening means therein together with a threaded opening for receiving the ignition means extending through said outer smooth cylindrical surface portion to said inner smooth cylindrical surface and with a threaded opening for mounting therein the ignition means in either direction;

v. a plurality of cylindrical segment oscillating pistons each mounted for oscillation between said inner smooth cylindrical surface of said rotor portion means and said inverted smooth cylindrical surface portions of said rotor frame, said plurality of cylindrical segment oscillating pistons each having a thickness slightly smaller than the thickness of each of said plurality of cylindrical segment spacer means and each being confined between two concentric smooth cylindrical surfaces, said plurality of oscillating pistons each having four end surfaces grooved for receiving therein sealing means, and having two of the ends thereof extending parallel to each other and so as to be positioned vertical to the axis of said oscillating piston, and having two other end surfaces thereof extending parallel to each other and positioned parallel to the axis of said oscillating piston, each of said plurality of oscillating pistons having an opening formed through said concentric smooth cylindrical surfaces between the four inner side surfaces thereof and also having openings for receiving the anti-friction means therein extending to the four end surfaces thereof such that the center axis of oscillation for each of said plurality of cylindrical segment oscillating pistons lies at the center of a cord measured relative to the rotor means and the stator means of the rotary internal combustion engine;

vi. a plurality of sealing means supported in grooves formed in said four end surfaces of said cylindrical segment oscillating pistons;

vii. a plurality of sealing means supported in grooves formed in each of said inner cylindrical surface segments of said plurality of said rotor portion means;

viii. a plurality of sealing means supported in grooves formed in each of said inverted smooth cylindrical surface portions of said rotor frame;

ix. a plurality of assisting springs provided for each of said cylindrical segment oscillating pistons and mounted in a space formed in between said inner cylindrical surface segments of said plurality of said rotor portion means, said inverted smooth cylindrical surface portions of said rotor frame, said inner side surfaces of the opening provided in each of said cylindrical segment oscillating pistons that are parallel to the rotor axis and said inner side surfaces that are parallel to said cylindrical segment spacer means; and b. the stator means with means to support said rotor means for rotation comprising:

i. a stator contoured member having a center axis, a mid-periphery and an inner smooth contoured surface divided equally into a number of sectors corresponding to intake, compression, expansion, exhaust, such that half of said sectors corresponding to intake and expansion are located above said mid-periphery of said stator contoured member and with the other half of said sectors corresponding to compression and exhaust being located below said mid-periphery of said stator contoured member, each of said sectors having a first end and a second end and a main arc having both ends connected to two relatively small arc sections, each of said small arc sections having their second end connected to a straight segment that is a portion of a straight part shared with two continuous ones of said sectors, said sector corresponding to intake having perforations located in a first end thereof for effecting fluid intake, said sector corresponding to exhaust having perforations located in a second end thereof for effecting fluid exhaust, the surface above the perforations of said sector corresponding to intake being smooth for receiving a secondary throttle, the surface above the perforations of said sector corresponding to exhaust being smooth for receiving a primary outlet throttle, said staler contoured means being provided with opening means for mounting therein two side sharer members, and with opening means receiving therein cooling and with groove means on both ends thereof for receiving therein sealing means;

ii. a secondary inlet throttle operative with retractable means and being located above the perforations of said sector corresponding to intake of said stator contoured member in a cavity provided in an inlet manifold, said inlet manifold being mounted by means of mounting means on said stator contoured member, said secondary inlet throttle being slidably restrained by restraining means so as to be capable of a variable sliding movement in such a manner as to regulate the volume of combustible fluids trapped in said sector corresponding to intake;

iii. a primary outlet throttle operative with retractable means and being located above the perforations of said sector corresponding to exhaust of said staler contoured member in a cavity provided in an outlet manifold, said outlet manifold being mounted by means of mounting means on said stator contoured member, said primary outlet throttle being slidably restrained by restraining means so as to be capable of a variable sliding movement in such a manner as to regulate the volume of combusted fluids trapped in said sector corresponding to exhaust;

iv. a first side member having an inner smooth flat surface perpendicular to the center axis of the rotary internal combustion engine and an opening to the center thereof for receiving anti-friction bearing means therein and a tunnel for transporting anti-friction fluid to the center opening, said first side member further having multiple openings around the periphery thereof used for receiving therein mounting means for restraining therein said staler contoured member, and internal cavities for cooling means, and threaded openings for mounting the piston assisting means and a threaded opening for mounting a flywheel housing means;

v. a second side member having an inner smooth flat surface perpendicular to the center axis of the rotary internal combustion engine and an opening to the center thereof for receiving anti-friction bearing means therein and a tunnel transporting anti-friction fluid to the center opening, said second side member having multiple openings around the periphery thereof used for receiving therein mounting means for restraining therein said stator contoured member, and internal cavities for cooling means and threaded opening means for mounting the piston assisting means and a threaded opening for mounting an ignition distribution means;

vi. a multi-contact ignition unit mounted on said second end of said rotor shaft and having multiple electrically insulated electrodes extending through said partially hollow rotor shaft to contact a multiple ignition means;

vii. an oil pan mounted externally of said staler means by means of mounting means;

viii. contoured member means mounted by means of mounting means on each of said first and second side members and cooperative with said inner contoured surface of said stator contoured member for engagement with piston assisting means; and ix. said piston assisting means being mounted by means of mounting means on each end of each of said plurality of cylindrical segment oscillating pistons for engagement with said contoured member means for movement thereon.

2. In the rotary internal combustion engine as set forth in claim 1 wherein each of said plurality of cylindrical segment oscillating pistons comprises a cylindrical segment having a single through opening.

3. In the rotary internal combustion engine as set forth in claim 1 wherein each of said plurality of cylindrical segment oscillating pistons comprises a cylindrical segment having multiple through openings.

4. In the rotary internal combustion engine as set forth in claim 1 wherein each of said plurality of cylindrical segment oscillating pistons comprises a cylindrical segment formed with two oscillating piston sections.

5. In the rotary internal combustion engine as set forth in claim 1 wherein each of said plurality of cylindrical segment oscillating pistons comprises eight cylindrical segments formed as a single unit that are restrained on said rotor such that two of said cylindrical segments are located between said inverted smooth cylindrical surface sections of said rotor frame and said rotor portion means.

6. In the rotary internal combustion engine as set forth in claim 1 wherein each of said plurality of cylindrical segment oscillating pistons comprises a hollow member including an outer portion having three cylindrical segments, an inner portion having a cylindrical segment with two outer side cuts cooperative with mounting means located on said inverted smooth cylindrical surface portions of said rotating rotor frame.

7. In the rotary internal combustion engine as set forth in claim 1 wherein each of said plurality of cylindrical segment oscillating pistons comprises a hollow member including an outer portion having three cylindrical segments, and an inner portion formed from two opposing ones of said cylindrical segments each having a cut facing inwards cooperative with mounting means located on said inverted smooth cylindrical surface portions of said rotating rotor frame.

8. In the rotary internal combustion engine as set forth in claim 1 wherein said plurality of rotor portion means include a cylindrical segment having an inner cylindrical surface, an outer cylindrical surface and two end flat surfaces extending parallel to each other and perpendicular to said cylindrical surfaces, said cylindrical segment including threaded opening means operable for mounting said ignition means therein and enlarged opening means for providing access to said ignition means and a concave surface for protecting said ignition means and continuous grooves at the ends of said inner cylindrical surface for receiving therein sealing means and threaded opening means for receiving mounting means.

9. In the rotary internal combustion engine as set forth in claim 1 wherein said plurality of rotor portion means includes a cylindrical segment having an outer cylindrical surface and two end flat surfaces extending parallel to each other and perpendicular to said outer cylindrical surface, said cylindrical segment including threaded opening means operable for mounting said ignition means therein and enlarged opening means for providing access to said ignition means, said cylindrical segment including an inner cylindrical surface having grooves at the ends thereof for receiving sealing means therein, a portion of said inner cylindrical surface being partially receded to reduce friction and a part of said inner cylindrical surface being covered with a member operative as a spacer.

10. In the rotary internal combustion engine as set forth in claim 1 wherein said plurality of rotor portion means include a cylindrical segment having an outer cylindrical surface and two end flat surfaces extending parallel to each other and perpendicular to the axis of said cylindrical surfaces, said cylindrical segment including threaded opening means operable for mounting said ignition means therein, and enlarged opening means for providing access to said ignition means and a grooved inner cylindrical surface for receiving sealing means therein and with a portion of said inner cylindrical surface being receded to minimize friction.

11. In the rotary internal combustion engine as set forth in claim 1 wherein said plurality of spacer means include a cylindrical segment having an outer cylindrical surface and an inner cylindrical surface and opening means operable for accessing said ignition means and opening means for accessing said piston assisting means and opening means operable as a guiding means and opening means operable as mounting means for said plurality of rotor portion means, and said cylindrical segment having two end surfaces extending perpendicular to the center axis of said plurality of spacer means with two other end surfaces thereof extending parallel to the center axis of said plurality of spacer means.

12. In the rotary internal combustion engine as set forth in claim 1 wherein said rotor frame includes a cylindrical type member having a center and two outer flat surfaces extending parallel to each other so as to be positioned perpendicular to the rotor axis and an inner cylindrical surface in the form of a hub with opening means operable for supporting anti-friction means therein, said cylindrical type member having two additional inner enlarged cylindrical surfaces with peripheral openings provided therein for providing access to said ignition means as well as for being operable to install said piston assisting means therein and with eight interconnected cylindrical surface segments being equally displaced about the rotor axis so as to thereby form an outer peripheral surface with four of said eight surfaces being equal and inverted in relation to the rotor axis and opening means provided to receive means for mounting said plurality of rotor portion means and with the remainder of the four outer interconnected cylindrical surface segments being formed with the same radius equally displaced about the rotor axis.

13. In the rotary internal combustion engine as set forth in claim 1 wherein said rotor frame includes a solid cylindrical member having a center and an outer smooth cylindrical surface interrupted with grooves and an inner cylindrical surface provided with mounting means and an inner enlarged cylindrical surface provided with openings for providing access to said ignition means and with openings for providing access to said piston assisting means and having two end fiat surfaces extending perpendicular to the rotor axis and being interrupted with grooves such that two grooves of said outer smooth cylindrical surface together with one groove of each of said end flat surfaces form continuous ring spaces for cooperatively associating therewith the oscillating piston means, the continuous ring spaces being provided with continuous grooves for receiving sealing means therein and opening means for receiving said ignition means therein and for connecting said inner cylindrical surface to said outer smooth cylindrical surface with a threaded portion operable for mourning said ignition means in either direction and opening means for receiving the anti-friction means therein and for connecting said inner cylindrical surface to the continuous ring spaces.

14. In the rotary internal combustion engine as set forth in claim 1 wherein said rotor frame includes portions projecting above said inverted smooth cylindrical surface portions functionable as spacers, said portions being formed as a single unit and having two end flat surfaces extending perpendicular to the rotor axis, each of said inverted smooth cylindrical surface portions having grooves for receiving sealing means therein and said portion projecting above said inverted smooth cylindrical surface portions being operable as a spacer with a portion of said inverted smooth cylindrical surface portions thereof receding below to reduce friction, said inverted smooth cylindrical surface portions being equally disposed about the rotor axis so as to thereby form an outer surface of singular form, and with a shaft type end thereof having an outer cylindrical surface with an inner axial large opening connected to a plurality of smaller openings leading to each receded portion of said inverted smooth cylindrical surface portions operable for receiving therein the anti-friction fluid and a second shaft type end thereof having an outer cylindrical surface with an inner large opening connected to a plurality of smaller openings leading to each projected portion of said inverted smooth cylindrical surface portions providing access to said ignition means.

15. In the rotary internal combustion engine as set forth in claim 1 wherein said stator contoured member has a center cylindrical opening operable for receiving said rotor shaft and an outer contoured peripheral surface provided for slideable engagement with the piston assisting means and two other outer end surfaces perpendicular to the center axis of said stator contoured member and opening means operable for receiving mounting means therein.

16. In the rotary internal combustion engine as set forth in claim 1 wherein the rotary internal combustion engine is mounted with its rotating axis in a vertical position and with an oil pan mounted by means of mounting means on said staler contoured member at the lower portion thereof and with said ignition means located at the top of the rotary internal combustion engine.

17. In the rotary internal combustion engine as set forth in claim 1 wherein the rotary, internal combustion engine includes a multi-piston rotor means and a stator means having multi-inlet manifolds and multi-outlet manifolds each having its respective fluid flow control throttle.

18. In the rotary internal combustion engine as set forth in claim 1 wherein each of said inlet manifolds includes a secondary fluid flow inlet throttle operative with a throttle control mechanism.

19. In the rotary internal combustion engine as set forth in claim 1 wherein each of said outlet manifolds includes a primary fluid flow outlet throttle operative with a throttle control mechanism.

20. In the rotary internal combustion engine as set forth in claim 1 wherein in the rotary internal combustion engine said ignition means is provided on said stator contoured member.

21. In the rotary internal combustion engine as set forth in claim 1 wherein said rotor frame includes openings provided in between each of said cylindrical segment oscillating pistons leading to said inlet manifolds.

22. In the rotary internal combustion engine as set forth in claim 1 wherein a portion of said side members of said stator means is removable for providing access to said ignition means.

23. In the rotary internal combustion engine as set forth in claim 1 wherein said ignition means is mounted through the combustion chamber means that includes an outer shell, an inner insulating shell that passes through said outer shell and an electrode that passes through said insulating shell, and said outer shell having a first end and a second end with said first end being threaded for purposes of mounting said ignition means and said second end formed with means operable by conventional tools to effect the installation of said ignition means and to effect the removal of said ignition means, said electrode having a first end projecting beyond said insulating shell for purposes of conducting electricity and a second electric discharge end projecting beyond said insulating shell for purposes of producing a timely spark.

24. In the rotary internal combustion engine as set forth in claim 1 wherein fuel injection means are mounted through the combustion chamber means that includes a first end and a second end said first end having a threaded portion operative as a fuel inlet, said second end having a fuel injection spray tip located opposite to said fuel inlet provided with means operative by convential tools to effect the installation thereof and to effect the removal thereof.

25. In the rotary internal combustion engine as set forth in claim 1 wherein insulated electric path means is connected to said ignition means through a continuous opening provided through said rotor means to connect to an electric current distribution center mounted at an end of said rotor shaft.

26. In the rotary internal combustion engine as set forth in claim 1 wherein fuel supply path means is connected to a fuel injector means through a continuous opening provided through said rotor means to connect to a fuel distribution center mounted at an end of said rotor shaft.

27. In the rotary internal combustion engine as set forth in claim 1 wherein said rotor means includes multiple inlet fuel ports that are connected to the inlet manifolds and multiple outlet fuel ports that are connected to the outlet manifolds.

28. In the rotary internal combustion engine as set forth in claim 1 wherein said stator means is formed as one unit.

29. In the rotary internal combustion engine as set forth in claim 1 wherein said rotor means is formed as one solid unit.

30. In the rotary internal combustion engine as set forth in claim 1 wherein said rotor means includes a multiple of four oscillating pistons.

31. In the rotary internal combustion engine as set forth in claim 1 wherein said stator means includes a plurality of oscillating pistons.

32. In the rotary internal combustion engine as set forth in claim 1 wherein said rotor means engages said oscillating pistons mounted on said stator means.

33. In the rotary internal combustion engine as set forth in claim 1 wherein each oscillating piston is provided with piston assisting means to assist said oscillating piston in its oscillating movement by engaging cam type means that are mounted on each inner side of said stator means.

34. In the rotary internal combustion engine as set forth in claim 1 wherein a continuous lubrication path means is used to suppy lubricant to friction producing surfaces, said continuous lubrication path means comprising a lower part of the rotary internal combustion engine from which a single opening originates connecting to a single opening and through a bearing assembly and through an opening that connects to multiple openings located in said rotor frame, each of the multiple openings leading into a space provided in said rotor means, and each of said oscillating pistons being provided with an opening leading into outer grooves of each of said oscillating pistons.

35. In an internal combustion engine having rotor means mounted for rotation on a rotor axis means supported by anti-friction means in a stator means, combustion chamber means formed between the rotor means and the stator means, piston assisting means, ignition means located in the combustion chamber means, intake fluid flow control means, exhaust fluid flow control means, oscillating piston means mounted for oscillation on the stator means so as to project inwards in the area of the combustion chamber means, rotor portion means projecting above a mid-periphery in the area of the combustion chamber means for receiving the forces generated by the gases created when combustion takes place in the combustion chamber means acting thereon and operative as a consequence to impart circular movement of the rotor means and to in turn transfer that movement to the rotor axis means, said internal combustion engine including:

a. a rotor rotatably mounted for rotation on a rotor shaft comprising:
    i. a rotatable rotor shaft having rotor mounting means and suported for rotation on both ends thereof in anti-friction bearing means, said anti-friction bearing means being supported in openings provided in the internal combustion engine, said rotor shaft including a first end provided with means for mounting a flywheel and a second end with means for mounting ignition distribution means;
    ii. a rotor frame rotatably defining a rotor axis with a center opening provided with means to accept mounting means, said mounting means being operable to mount said rotor shaft fixedly thereon, said rotor frame including two flat end surfaces extending parallel to each other and being equally disposed about said rotor axis, said rotor frame further including a mid-periphery and a contoured outer smooth peripheral surface divided equally into a number of sectors corresponding to intake, compression, expansion and exhaust such that half of said sectors corresponding to compression and exhaust are located above said mid-periphery of said rotor frame and with the other half of said sectors corresponding to intake and expansion located below said mid-periphery of said rotor frame, each sector having a first end and a second end comprised of a main arc having both ends connected to two relatively small arc sections and each of said small arc sections having their second end connected to a straight segment that is a portion of a straight pan shared with two continuous ones of said sectors; and
  b. stator means provided with means to support said rotor means for rotation comprising:
    i. a stator member having a center axis and an inner cylindrical surface comprised of at least one surface segment cooperatively associated with a continuous second smaller in size smooth cylindrical surface segment that has its center axis parallel to the center axis of said stator member, and said second smooth cylindrical surface of said stator member extending outwardly beyond said inner cylindrical surface of said stator member, said at least one surface segment having an opening therein and threaded openings for receiving mounting means and continuous grooves to receive sealing means therein and opening means for receiving guiding means;

ii. a plurality of cylindrical segment spacer means, each having a thickness greater than that of the oscillating piston means, said plurality of cylindrical segment spacer means being confined in between a portion of said rotor and said second cylindrical surface of said stator member;

iii. a plurality of rotor portion means each having two ends and an inner cylindrical surface formed with a radius equal to that of said inner cylindrical surface of said stator member and an outer cylindrical surface formed with a radius equal to that of said plurality of cylindrical segment spacer means, said plurality of rotor portion means being grooved to receive sealing means therein and having openings for receiving intake fluid flow control means and having openings for receiving exhaust fluid flow control means and having enlarged openings for receiving exhaust fluids and having openings for receiving the ignition means and having openings operable for mounting said plurality of rotor portion means on said stator member and with said two ends extending perpendicular to said inner cylindrical surface and parallel to each other, iv. a plurality of cylindrical segment oscillating piston means having a center axis, each of said plurality of cylindrical sement oscillating piston means being mounted for oscillation between an outer smooth cylindrical surface of said plurality of rotor portion means and an inner smooth cylindrical surface confined between two concentric smooth cylindrical surfaces and having four end surfaces grooved to receive therein sealing means extending perpendicular to said cylindrical surfaces with two of said four end surfaces being parallel to the center axis of said plurality of cylindrical segment oscillating piston means and parallel to each other and the other two end fiat surfaces being perpendicular to the center axis of said plurality of cylindrical segment oscillating piston means and perpendicular to each other, — v. a first side member having an inner smooth fiat surface perpendicular to the rotor axis means of the internal combustion engine and having an opening at the center thereof for receiving anti-friction bearing means therein and multiple openings around the periphery thereof for receiving therein mounting means;

vi. a second side member having an inner smooth fiat surface perpendicular to the rotor axis means of the internal combustion engine and having an opening at the center thereof for receiving anti-friction bearing means therein and multiple openings around the periphery thereof for receiving therein mounting means;

vii. a plurality of sealing means supported in grooves formed in each of said plurality of rotor portion means;

viii. a plurality of sealing means supported in ,grooves formed in each of the second smaller in size cylindrical surfaces of said stator member, ix. a plurality of sealing means supported in grooves formed in said four end surfaces of said cylindrical segment oscillating piston means; and x. an oil pan mounted in the lower aprt of the internal combustion engine.

36. In an internal combustion engine having a rotor rotatably mounted for rotation on a rotatable power output shaft by means of mounting means such as to extend through an opening provided in the center of a rotor frame, said power output shaft in turn being supported on both ends by a bearing assembly means supported in opening means provided in two opposing side menbers of a stator, opposing rows of conical oscillating piston means being mounted on said rotatably mounted rotor with the center axis thereof extending perpendicular to the center axis of the internal combustion engine between said rotor frame and in a space provided with spacer means in a portion of said rotor, said rotor being restrained on said rotor frame by means of mounting means, both sides of said rotor frame whereon said conical oscillating piston means are mounted are formed with a plurality of smooth inverted conical surface portions and flat conical surface portions that interconnect with the ends of said plurality of inverted conical surface portions, said rotor frame being divided by a peripheral space so as to therby provide three additional surfaces with two thereof being circular and being positioned opposite to said plurality of inverted conical surfaces and the other thereof being cylindrical, opening means for receiving anti-friction fluid means therein being provided radially in the center of said rotor frame leading therethrough into said plurality of smooth inverted conical surface portions, opening means provided radially in the center of said rotor frame for receiving an ignition wire means therein for passage through said rotor frame to said plurality of smooth inverted conical surface portions, said power output shaft having an end connected to a power transmission unit provided with a center opening that leads to two peripheral openings, one connected to a radially located opening in the center of said rotor frame and one connected to a radially located opening leading to the center of one of said side members of said stator of the internal combustion engine for receiving anti-friction fluid, a second end of said power output shaft being connected to means for effecting ignition and having a center opening leading to multiple radial openings for routing said ignition wire means therethrough, combustion chamber means being formed in between the outer side surfaces of said rotor and inner contoured surfaces of said side members of said stator and the inner cylindrical surfaces of two outer peripheral cylindrical members each being part of one of said side members of said stator and the outer cylindrical surfaces of an inner cylindrical hub means each being part of one of said side members of said stator, said stator further including a cylindrical member mounted by mounting means in between said side members of said stator and having fixedly supported on each side thereof contoured type cam means operable to slidably engage a piston assisting means, each of said side members of said stator having opening means formed therein for receiving bearing assembly means and having opening means for mounting means located in the outer periphery thereof and perforation opening means leading therefrom to an inner contoured surface of each first end of an intake sector of each of said side members of said stator and perforation opening means leading therefrom to an inner contoured surface of each second end of an exhaust sector of each of said side members of said stator, the internal combustion engine being provided with anti-friction storage space located in the lower portion therof wherein pump means are used to distribute anti-friction fluid to friction producing surfaces.

37. In the internal combustion engine as set forth in claim 36 wherein said conical oscillating piston means comprises a conical segment with a single through opening.

38. In the internal combustion engine as set forth in claim 36 wherein said conical oscillating piston means comprises a conical segment with multiple through openings.

39. In the internal combustion engine as set forth in claim 36 wherein said conical oscillating piston means comprises a conical segment having one end cooperatively associated with a cylindrical part having an inwardly extending cylindrical surface, and an outwardly extending flat surface fixedly attached to a shaft cooperatively associated with said piston assisting means.

40. In the internal combustion engine as set forth in claim 36 wherein said conical oscillating piston means comprises a conical segment having both ends cooperatively associated with cylindrical parts each having an inwardly extending cylindrical surface and an outwardly extending flat surface fixedly attached to a shaft cooperatively associated with said piston assisting means.

41. In the internal combustion engine as set forth in claim 36 wherein said rotor includes a conical segment having an outer flat surface and two end cylindrical surfaces extending perpendicular to said outer flat surface, an inner grooved conical surface, opening means to receive mounting means therein, and threaded opening means for mounting an ignition means therein.

42. In the internal combustion engine as set forth in claim 36 wherein said rotor includes a conical segment having an outer flat surface and two end cylindrical surfaces perpendicular to said outer flat surface, an inner grooved conical surface, opening means to receive mounting means therein, and threaded opening means for mounting an ignition means therein, said conical segment having a portion covered with an extended conical segment operable as a spacer and with another portion being receded to minimize friction.

43. In the internal combustion engine as set forth in claim 36 wherein at least one row of said conical oscillating piston means is located on the periphery of said rotor.

44. In the internal combustion engine as set forth in claim 36 wherein said power output shaft on which said rotor is mounted for rotation has formed as one unit at least one side with a contoured peripheral surface, an inner cylindrical hub with an outer smooth cylindrical surface and an outer cylindrical hub with an inner smooth cylindrical surface.

45. In the internal combustion engine as set forth in claim 36 wherein said stator is provided with gas inlet port means, gas outlet means, means for mounting manifold means, opening means for mounting a rotor shaft bearing assembly means, opening means located in the outer periphery of said stator to accept mounting means, opening means for oil supply, opening means for oil drainage and threaded opening means.

* * * * *